United States Patent
Turner et al.

(10) Patent No.: US 11,762,546 B2
(45) Date of Patent: Sep. 19, 2023

(54) DEVICES, METHODS, AND USER INTERFACES FOR CONVEYING PROXIMITY-BASED AND CONTACT-BASED INPUT EVENTS

(71) Applicant: Apple Inc., Cupertino, CA (US)

(72) Inventors: Michael T. Turner, San Jose, CA (US); Raleigh J. Ledet, Lafayette, LA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/145,168

(22) Filed: Jan. 8, 2021

(65) Prior Publication Data

US 2021/0132762 A1    May 6, 2021

Related U.S. Application Data

(63) Continuation of application No. 16/425,828, filed on May 29, 2019, now Pat. No. 10,921,975.

(60) Provisional application No. 62/679,956, filed on Jun. 3, 2018.

(51) Int. Cl.
  *G06F 3/048*   (2013.01)
  *G06F 3/0487*   (2013.01)
  *G06F 3/0484*   (2022.01)

(52) U.S. Cl.
  CPC .......... *G06F 3/0487* (2013.01); *G06F 3/0484* (2013.01)

(58) Field of Classification Search
  None
  See application file for complete search history.

(56) References Cited

U.S. PATENT DOCUMENTS

| | | |
|---|---|---|
| 8,214,539 B1 | 7/2012 | Kulanko |
| 2008/0211766 A1 | 9/2008 | Westerman et al. |
| 2009/0066668 A1 | 3/2009 | Kim et al. |
| 2009/0225037 A1 | 9/2009 | Williamson et al. |
| 2009/0228901 A1 | 9/2009 | Beaver et al. |

(Continued)

FOREIGN PATENT DOCUMENTS

| | | |
|---|---|---|
| EP | 2 096 524 A2 | 9/2009 |
| KR | 2013-0115037 A | 10/2013 |
| WO | WO 2012/087939 A1 | 6/2012 |

OTHER PUBLICATIONS

Office Action, dated Apr. 23, 2020, received in U.S. Appl. No. 16/425,828, 12 pages.

(Continued)

*Primary Examiner* — Thanh T Vu
(74) *Attorney, Agent, or Firm* — Morgan, Lewis & Bockius LLP

(57) ABSTRACT

An electronic device, with a display and one or more input devices separate from the display, displays, on the display, a user interface for an application. The device receives, at the one or more input devices separate from the display, user input events. The device generates a plurality of separate event streams in accordance with the user input events. The device merges information from the plurality of separate event streams to generate a stream of merged user input events. The device provides, to the application, information that describes the stream of merged user input events. The device displays, on the display, a response by the application that is based at least in part on the information that describes the stream of merged user input events.

36 Claims, 41 Drawing Sheets

(56) References Cited

U.S. PATENT DOCUMENTS

| | | |
|---|---|---|
| 2010/0235118 A1 | 9/2010 | Moore et al. |
| 2011/0175830 A1 | 7/2011 | Miyazawa et al. |
| 2011/0181526 A1* | 7/2011 | Shaffer .................. G06F 9/451 |
| | | 345/173 |
| 2012/0026077 A1 | 2/2012 | Hackborn |
| 2014/0055395 A1 | 2/2014 | Kim |
| 2014/0208260 A1 | 7/2014 | Kawahara et al. |
| 2015/0067513 A1* | 3/2015 | Zambetti .............. G06F 3/0488 |
| | | 715/716 |
| 2016/0062452 A1 | 3/2016 | Kim et al. |
| 2016/0350071 A1* | 12/2016 | Murillo .................. G06F 3/167 |
| 2017/0336884 A1* | 11/2017 | Pavlou .................... G06F 3/038 |
| 2019/0369829 A1 | 12/2019 | Turner et al. |

OTHER PUBLICATIONS

Notice of Allowance, dated Oct. 15, 2020, received in U.S. Appl. No. 16/425,828, 8 pages.

Invitation to Pay Additional Fees, dated Aug. 29, 2019, received in International Patent Application No. PCT/US2019/034846, which corresponds with U.S. Appl. No. 16/425,828, 39 pages.

ISR and Written Opinion, dated Oct. 21, 2019, received in International Patent Application No. PCT/US2019/034846, which corresponds with U.S. Appl. No. 16/425,828, 24 pages.

Office Action, dated Feb. 23, 2022, received in European Patent Application No. 19732177.1, which corresponds with U.S. Appl. No. 16/425,828, 5 pages.

Office Action, dated Oct. 28, 2022, received in European Patent Application No. 19732177.1, which corresponds with U.S. Appl. No. 16/425,828, 6 pages.

* cited by examiner

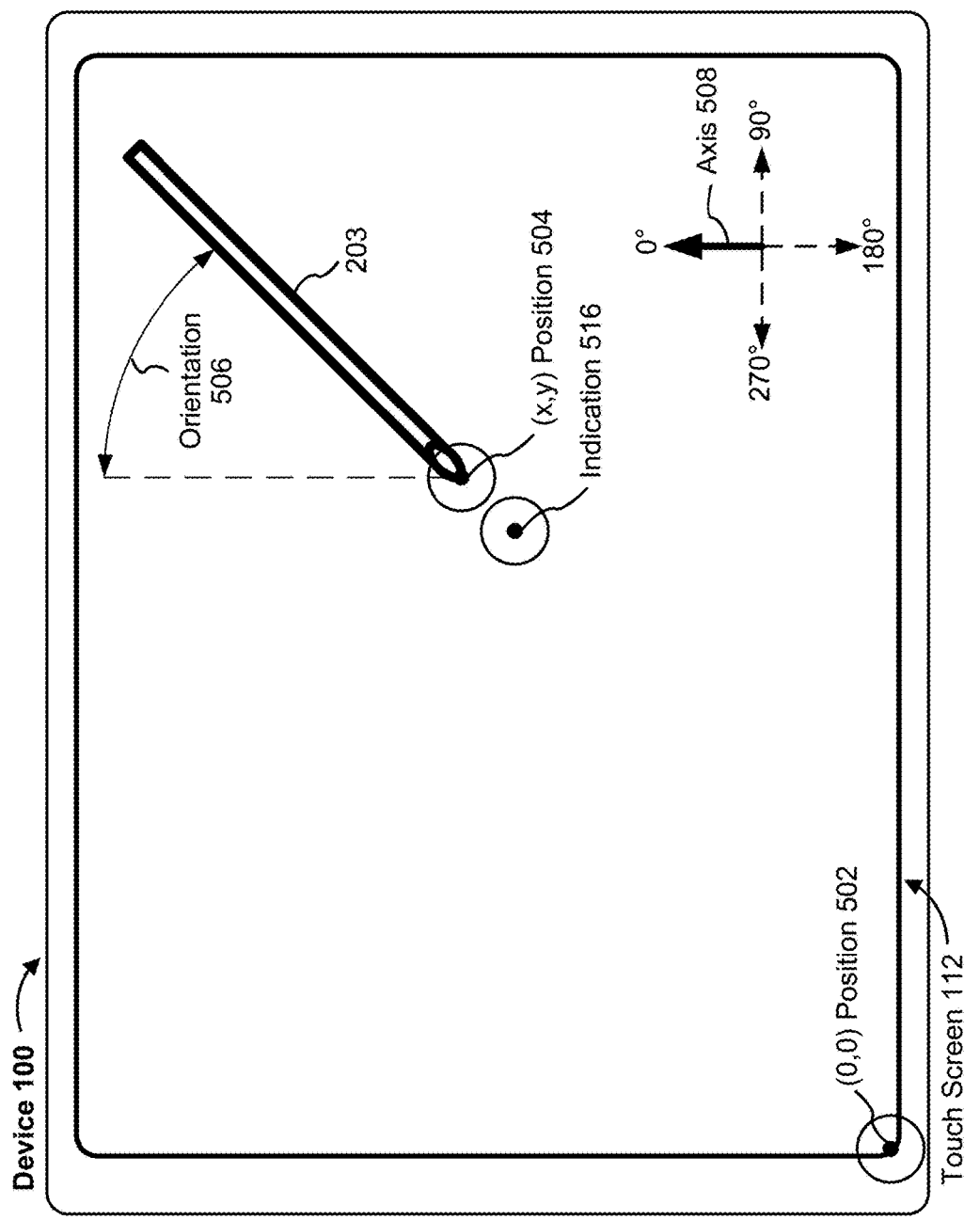
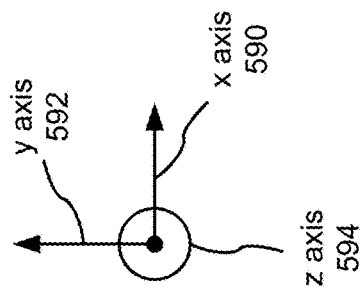
Figure 5A

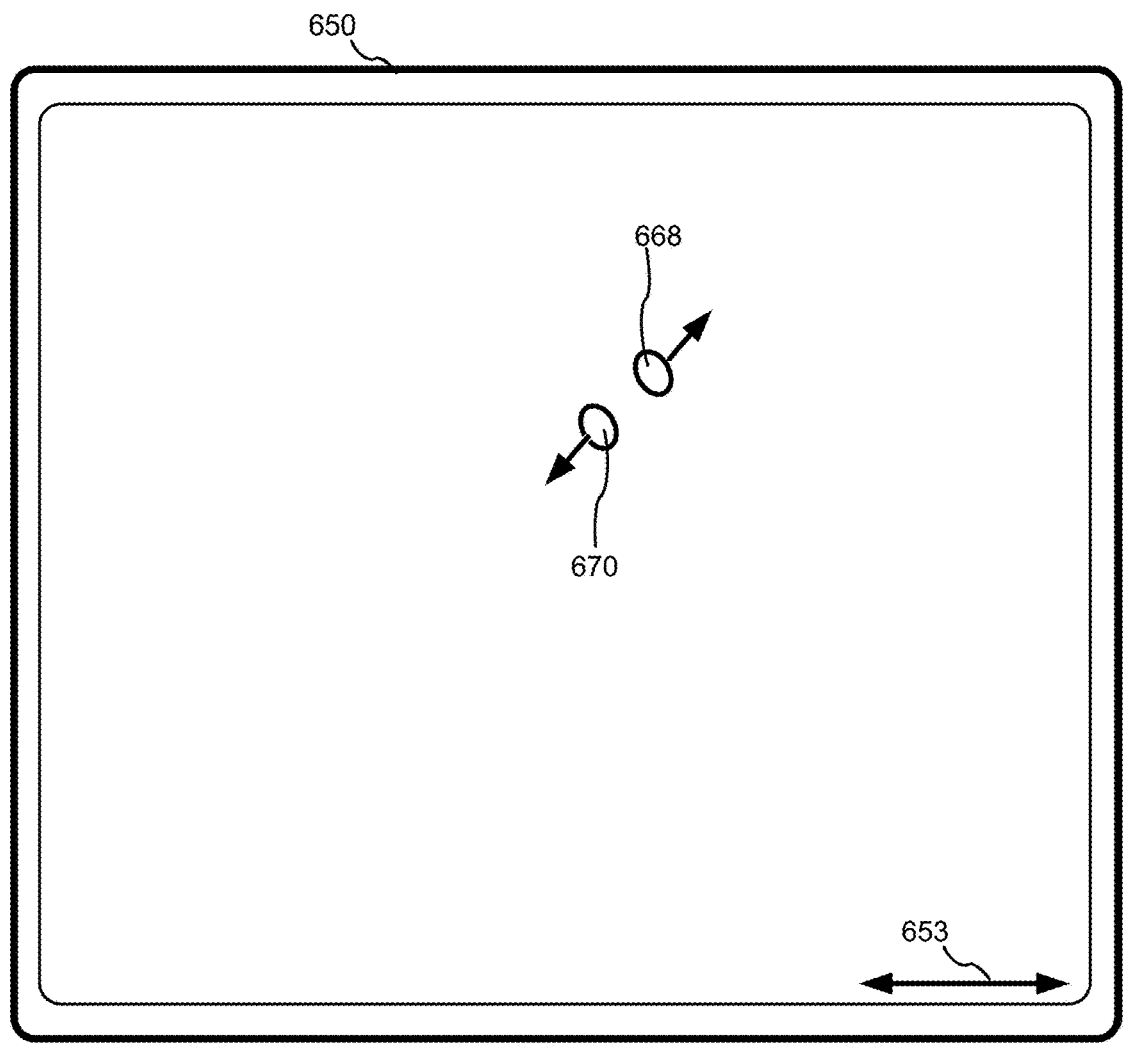
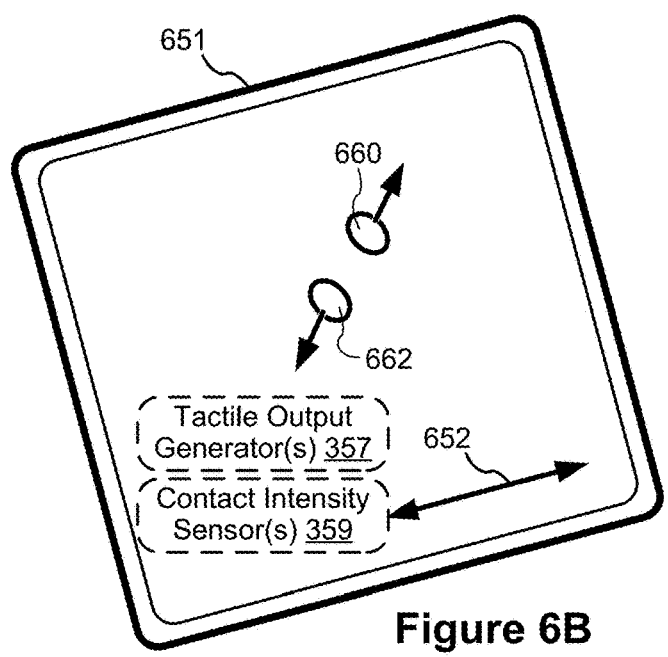
Figure 6B

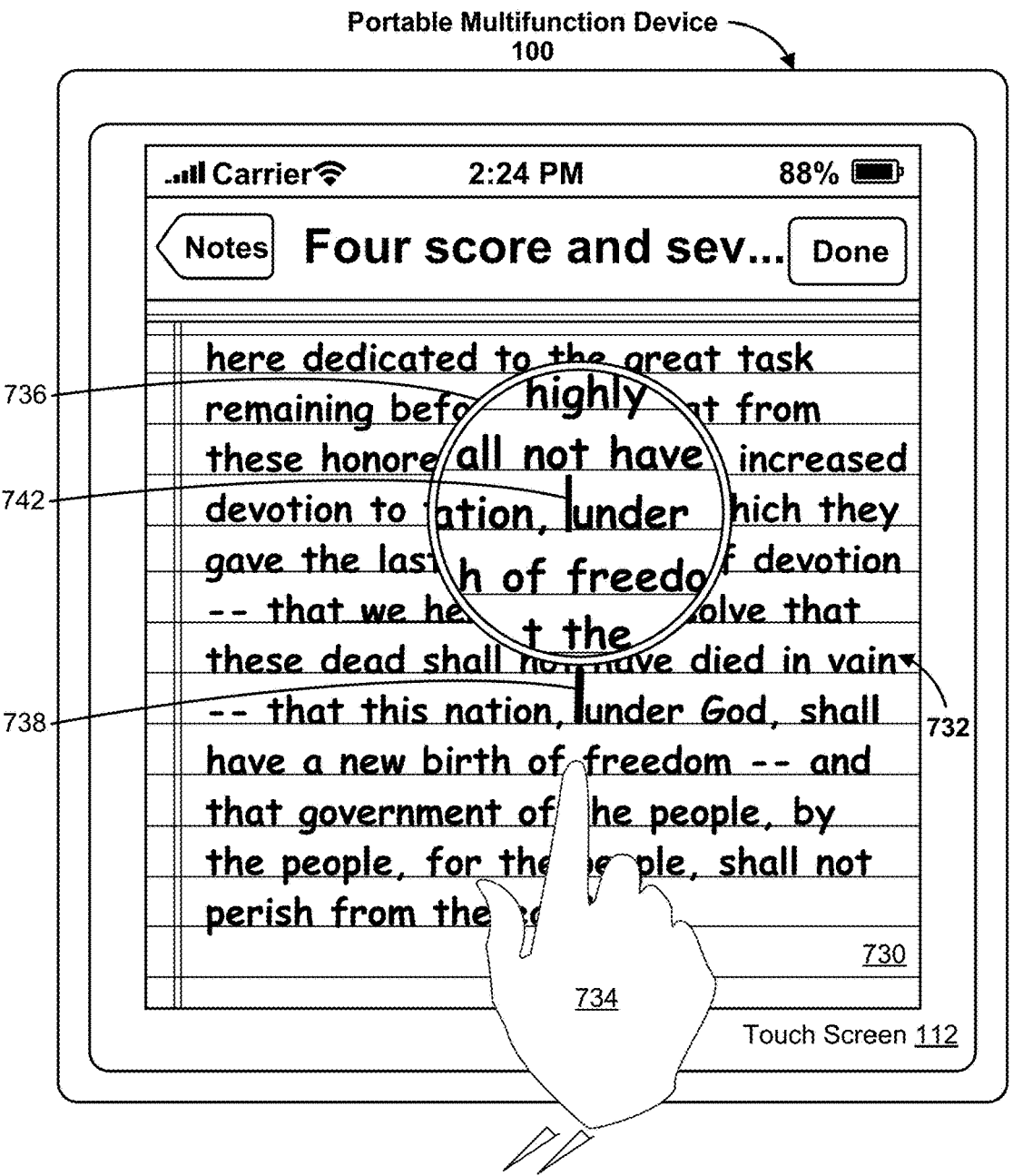
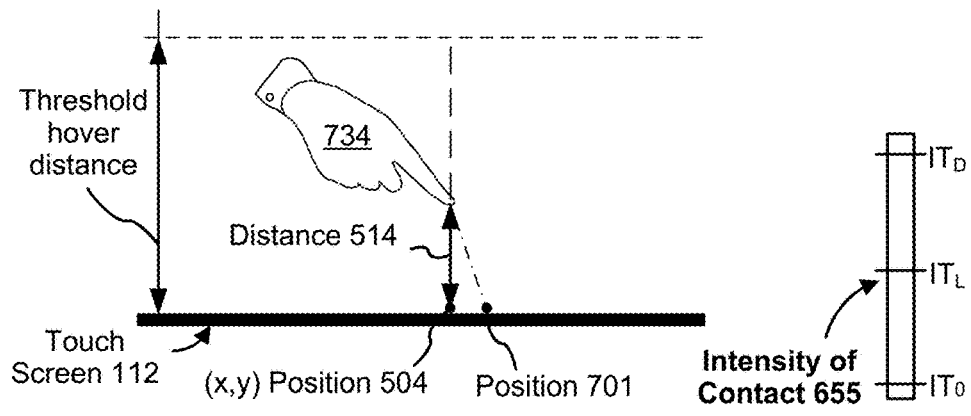
Figure 7C

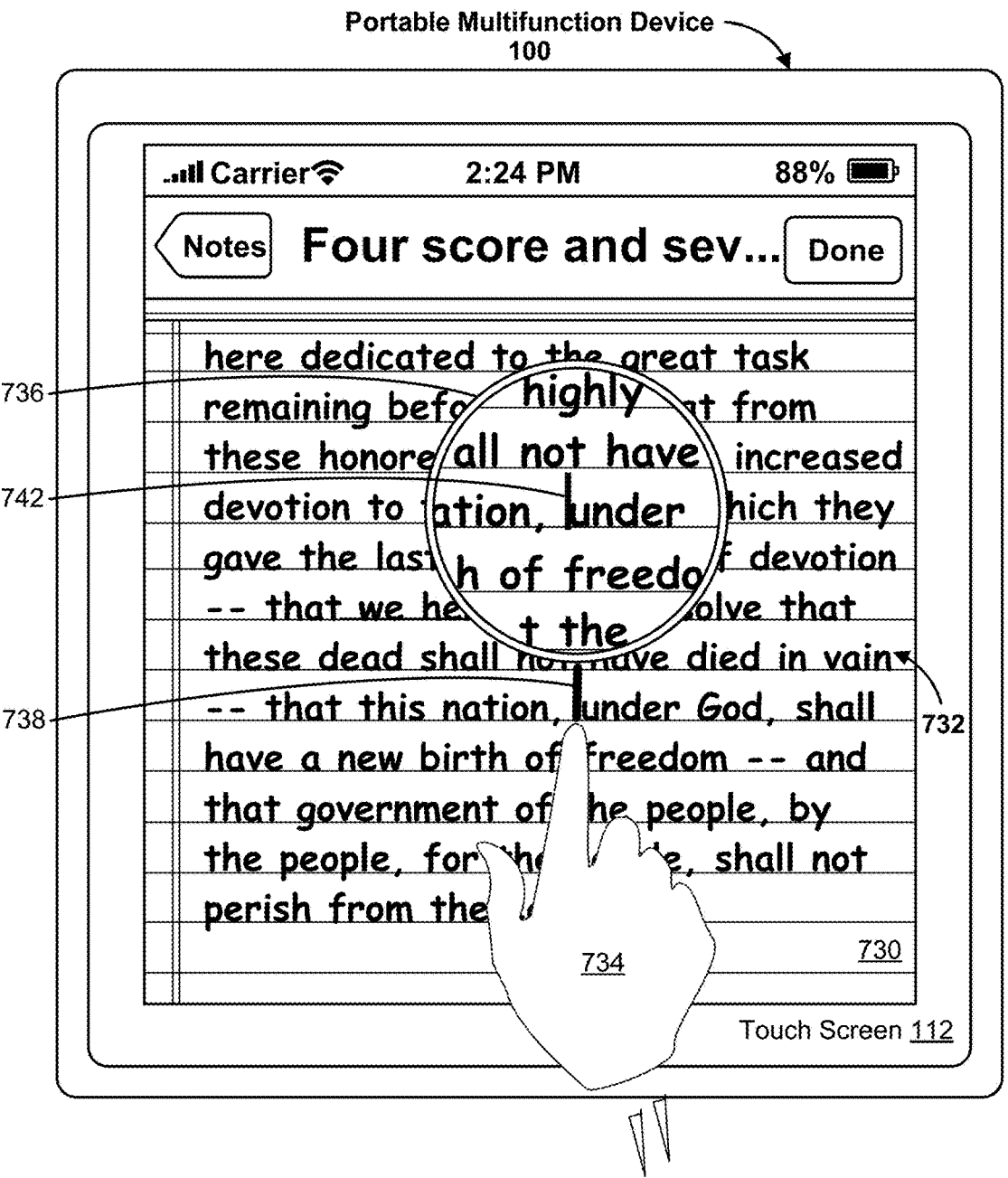
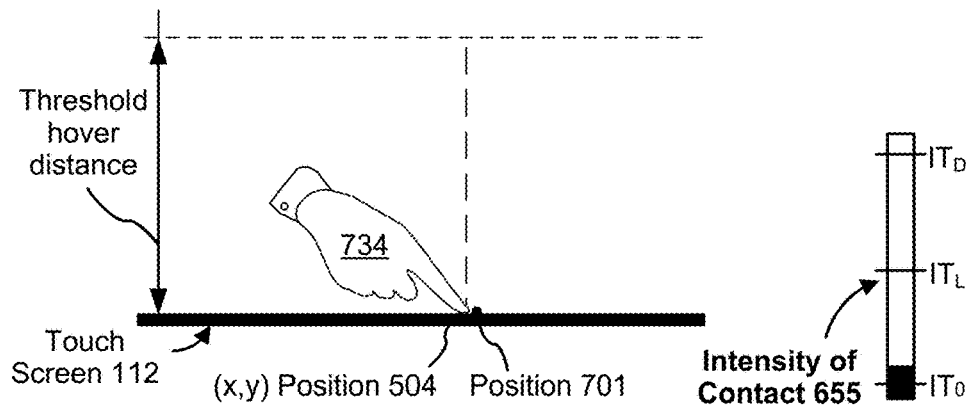
Figure 7D

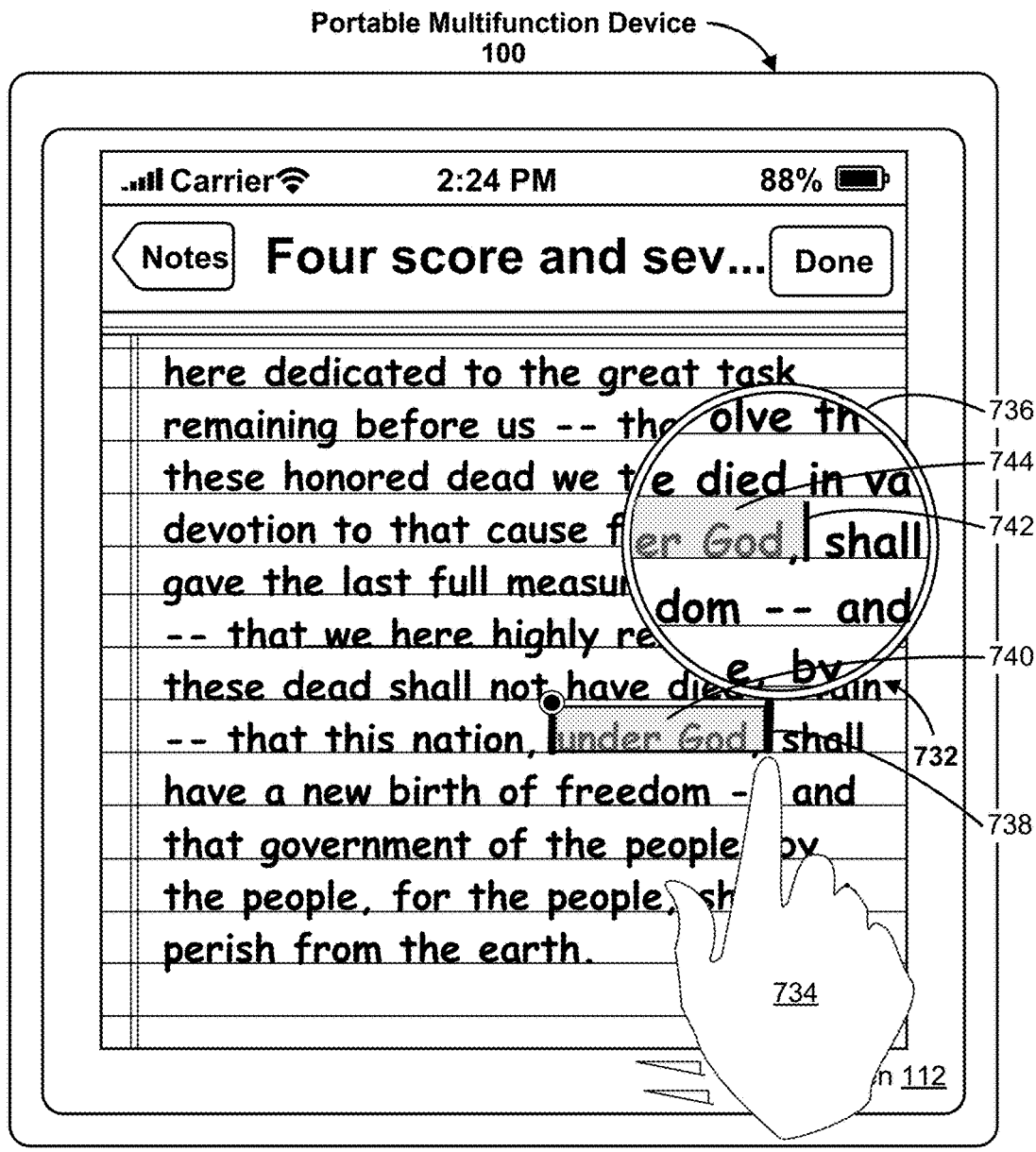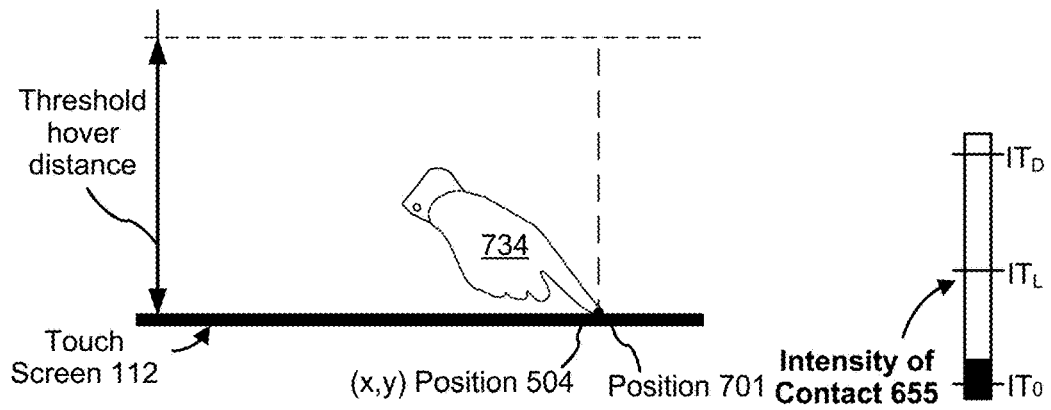
Figure 7E

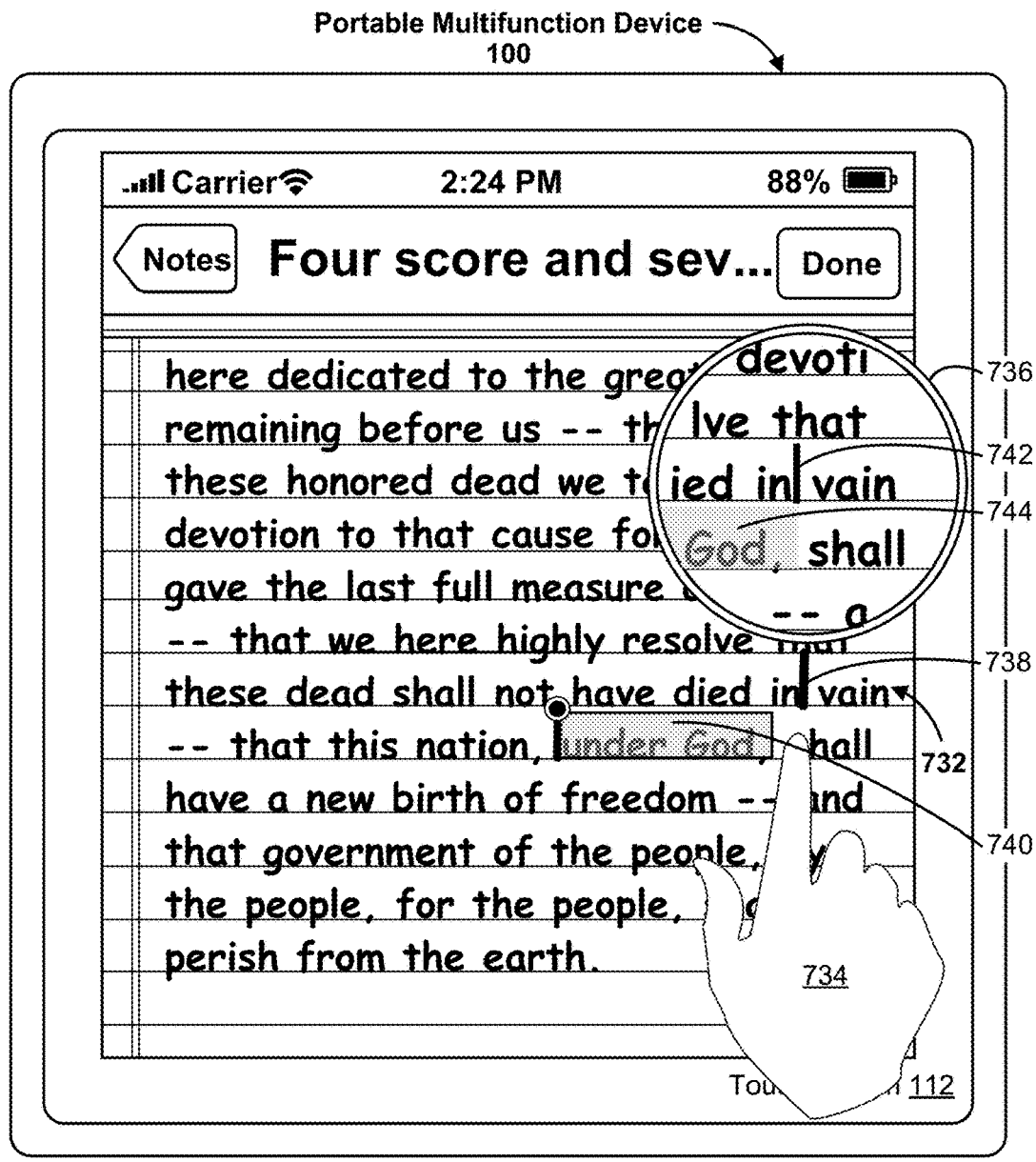
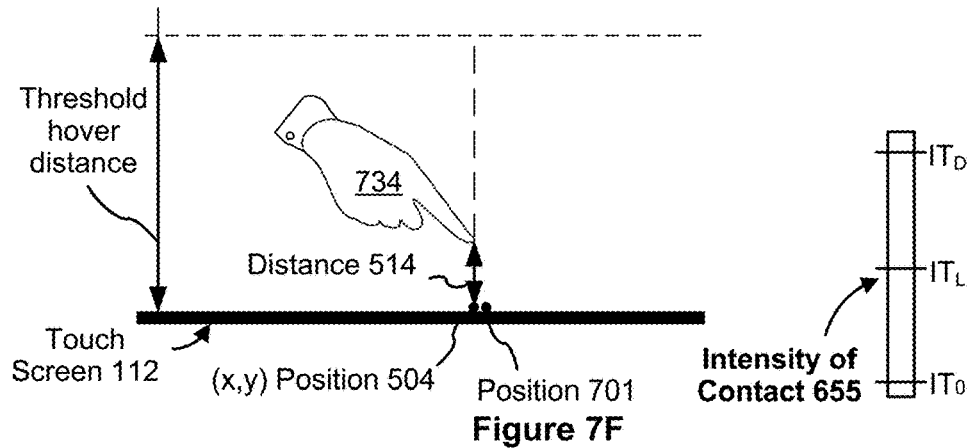
Figure 7F

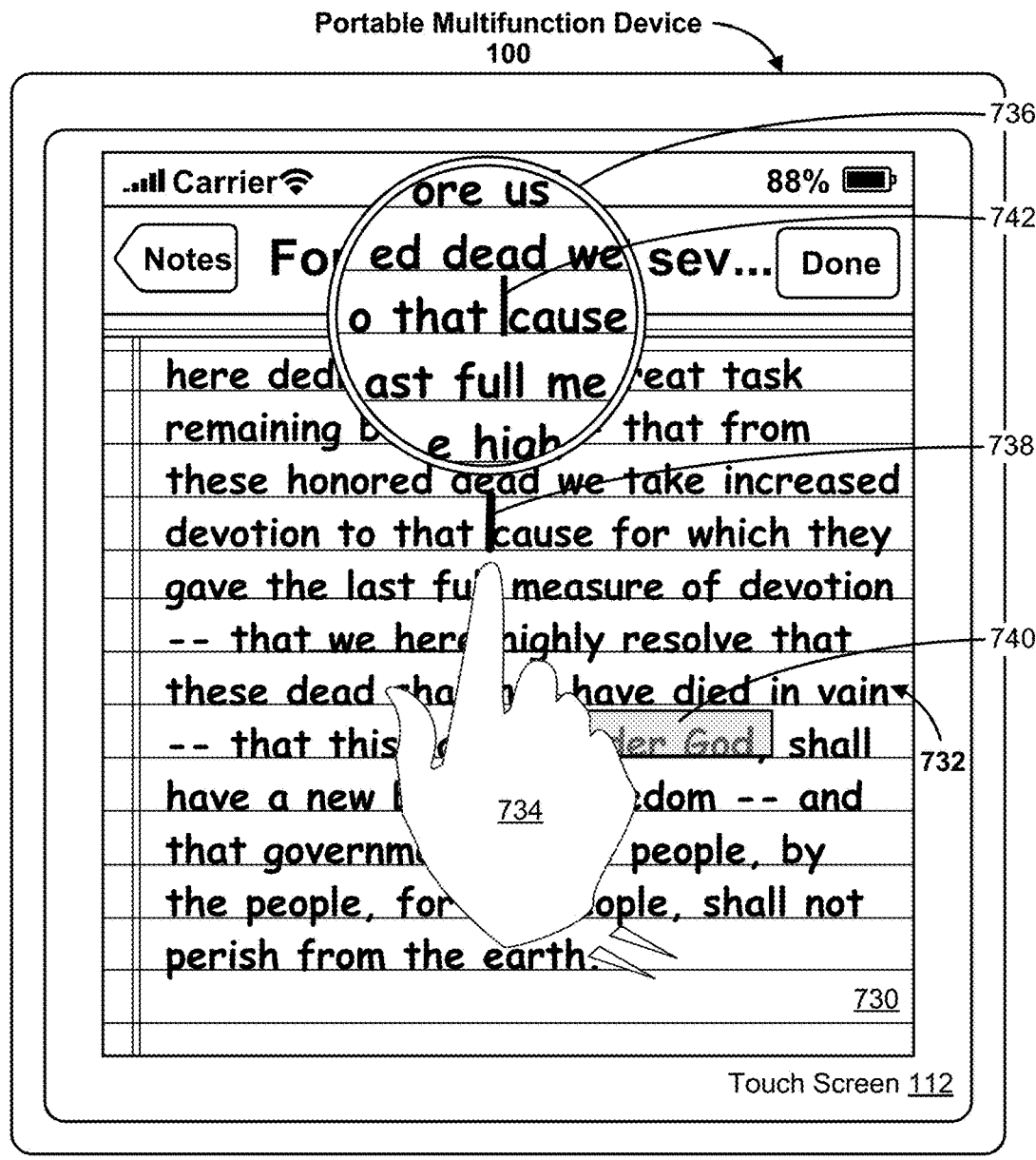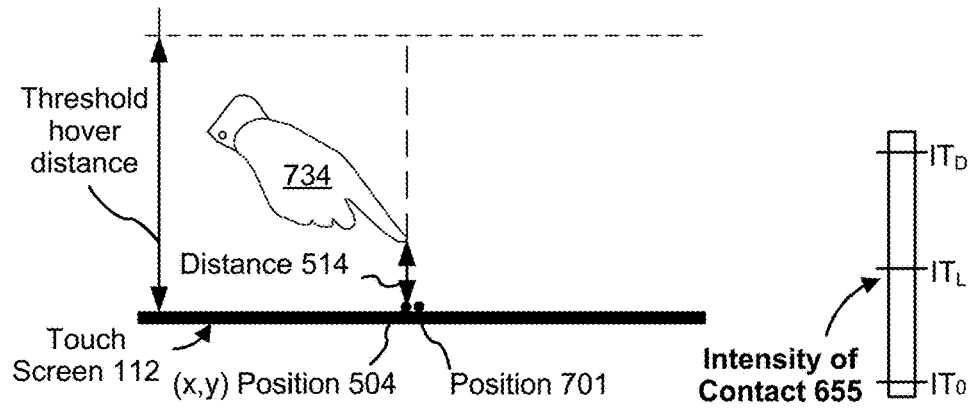
Figure 7G

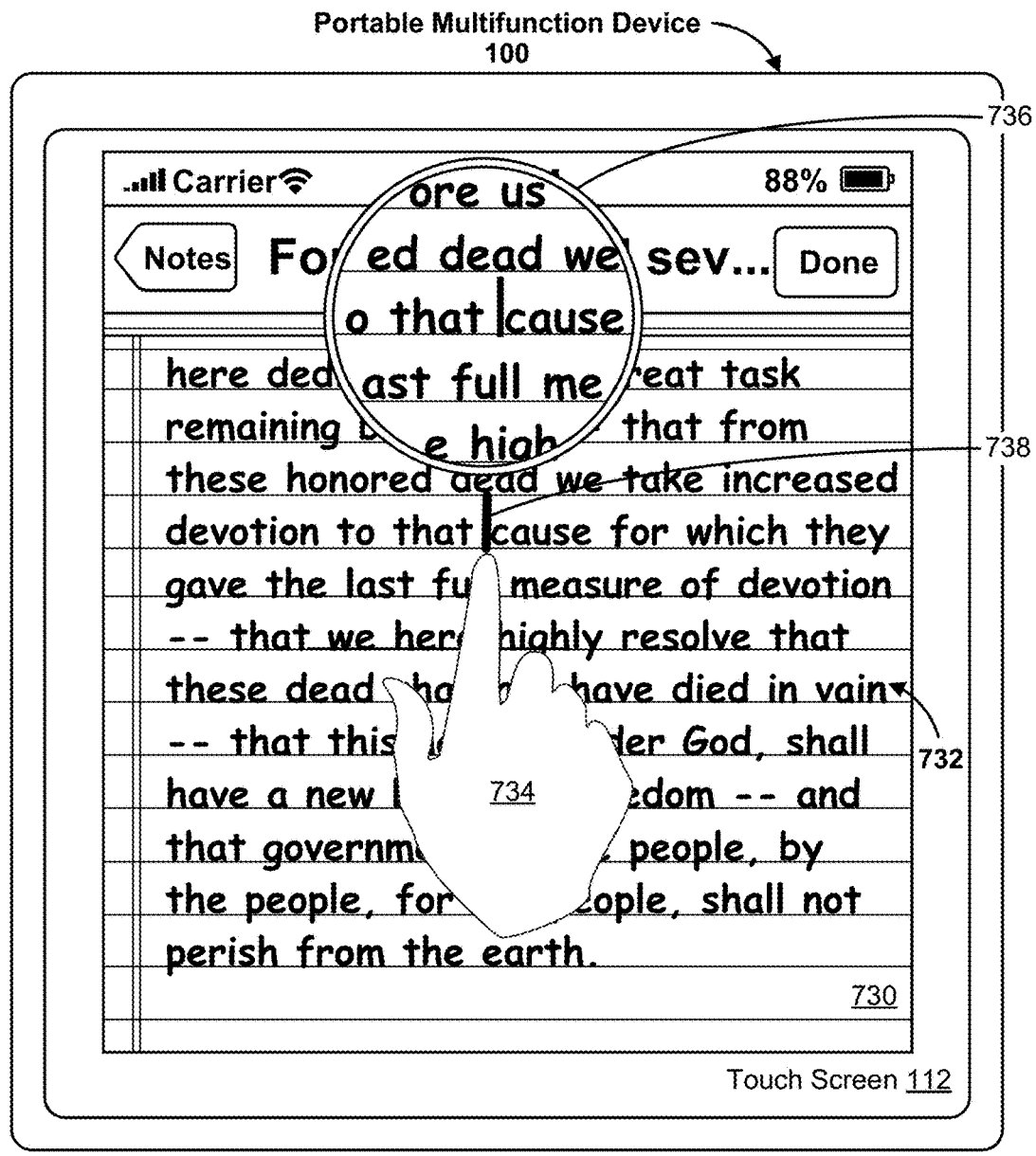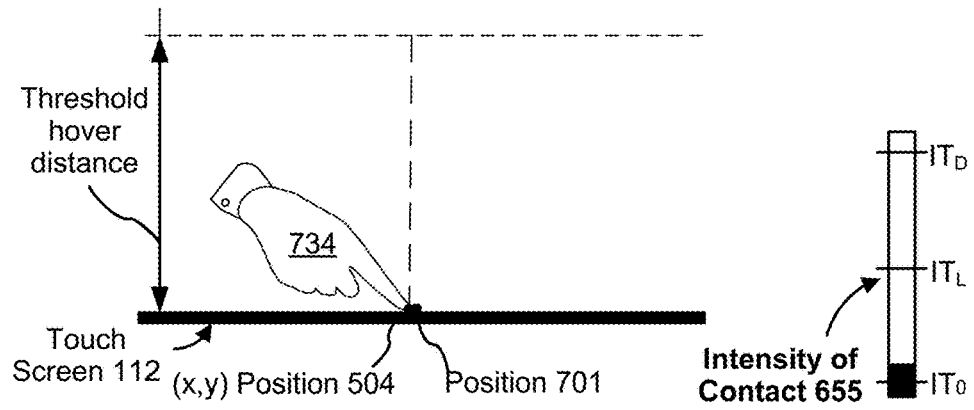
Figure 7H

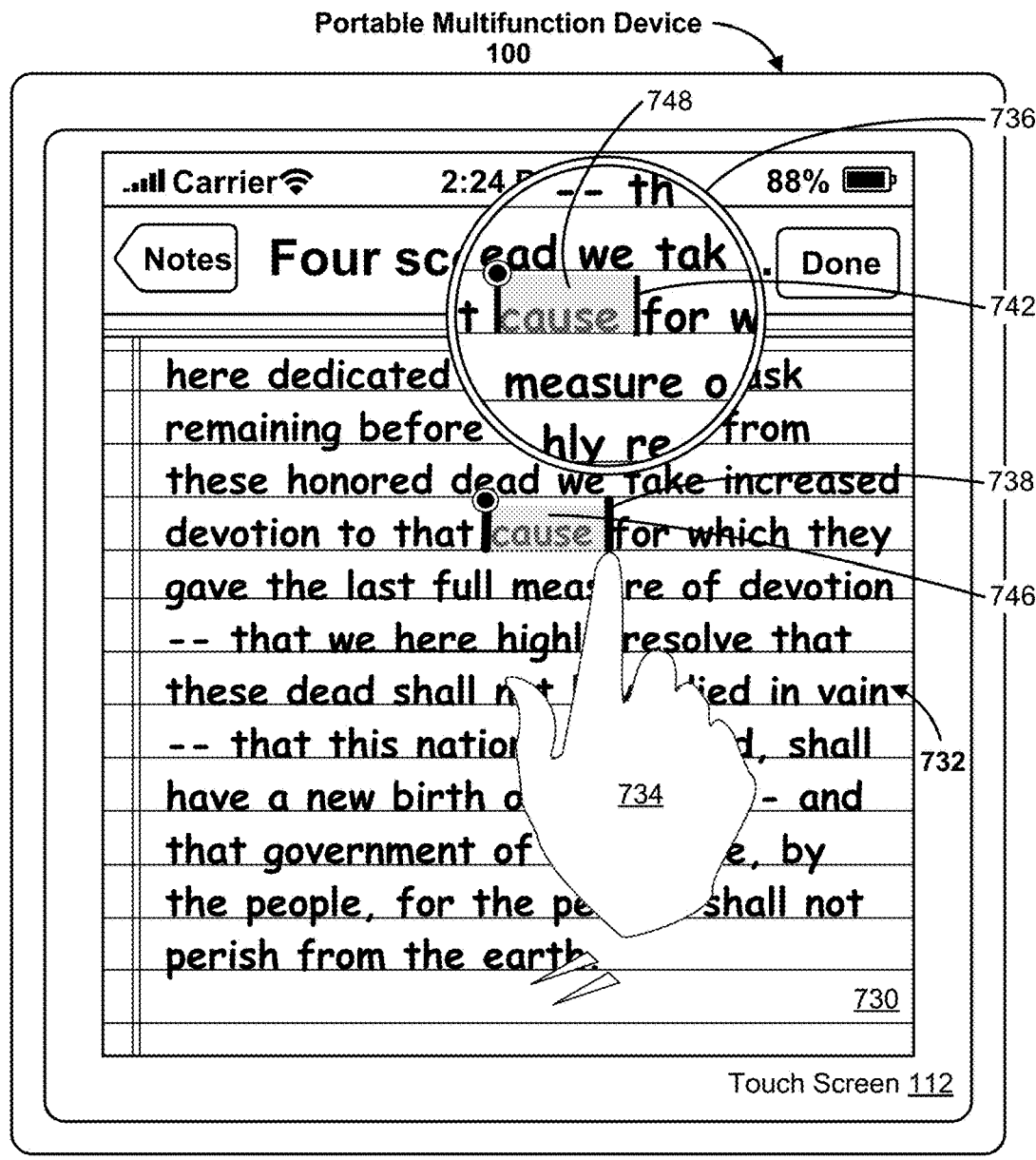
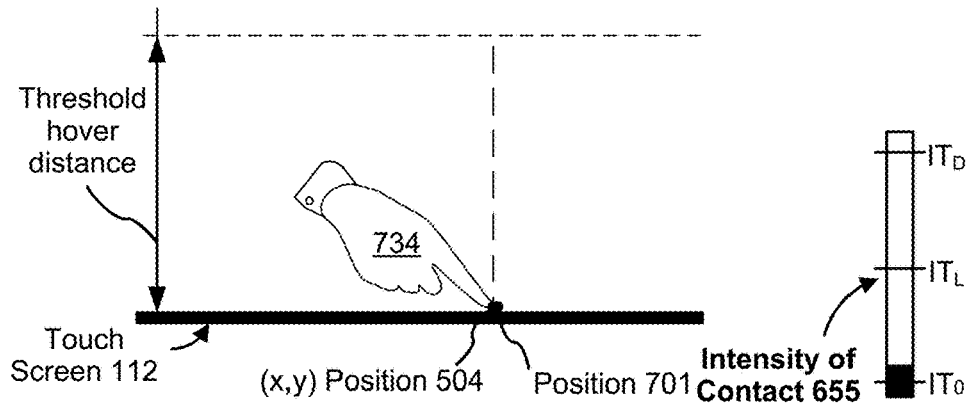
Figure 7I

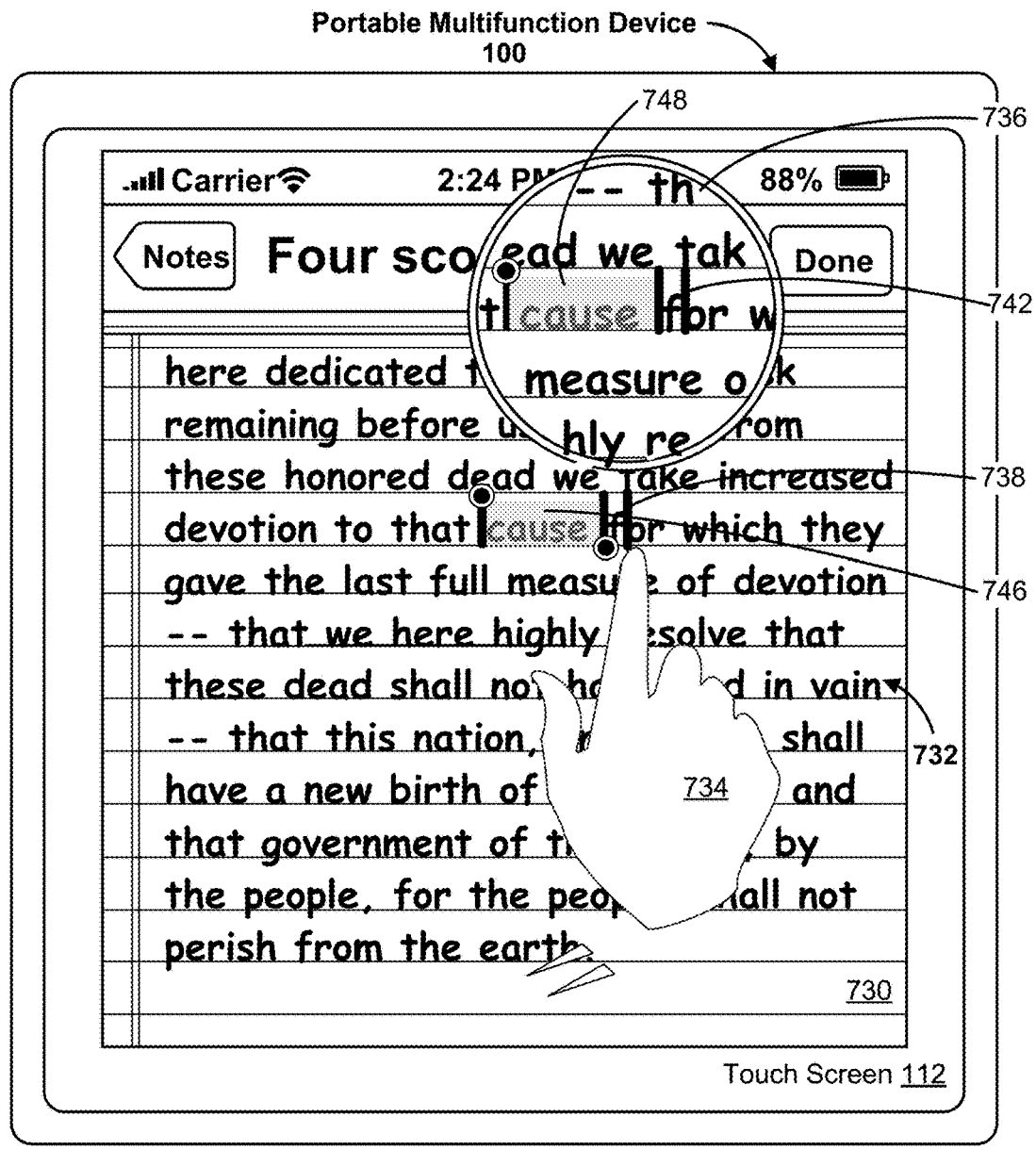
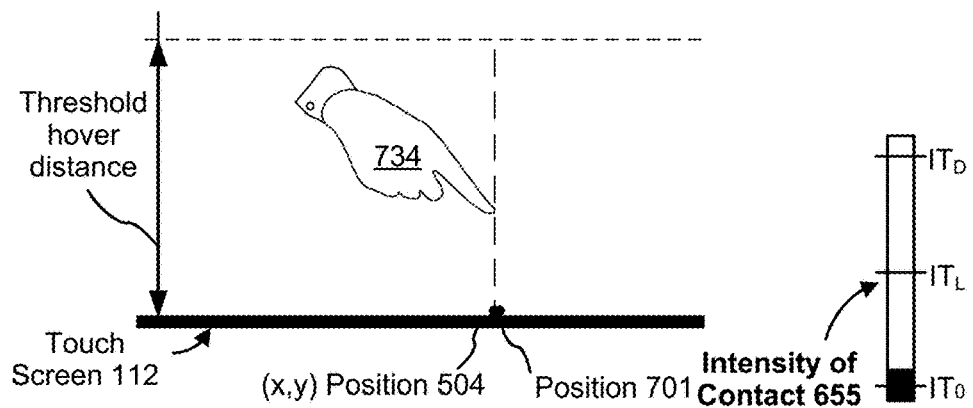
Figure 7J

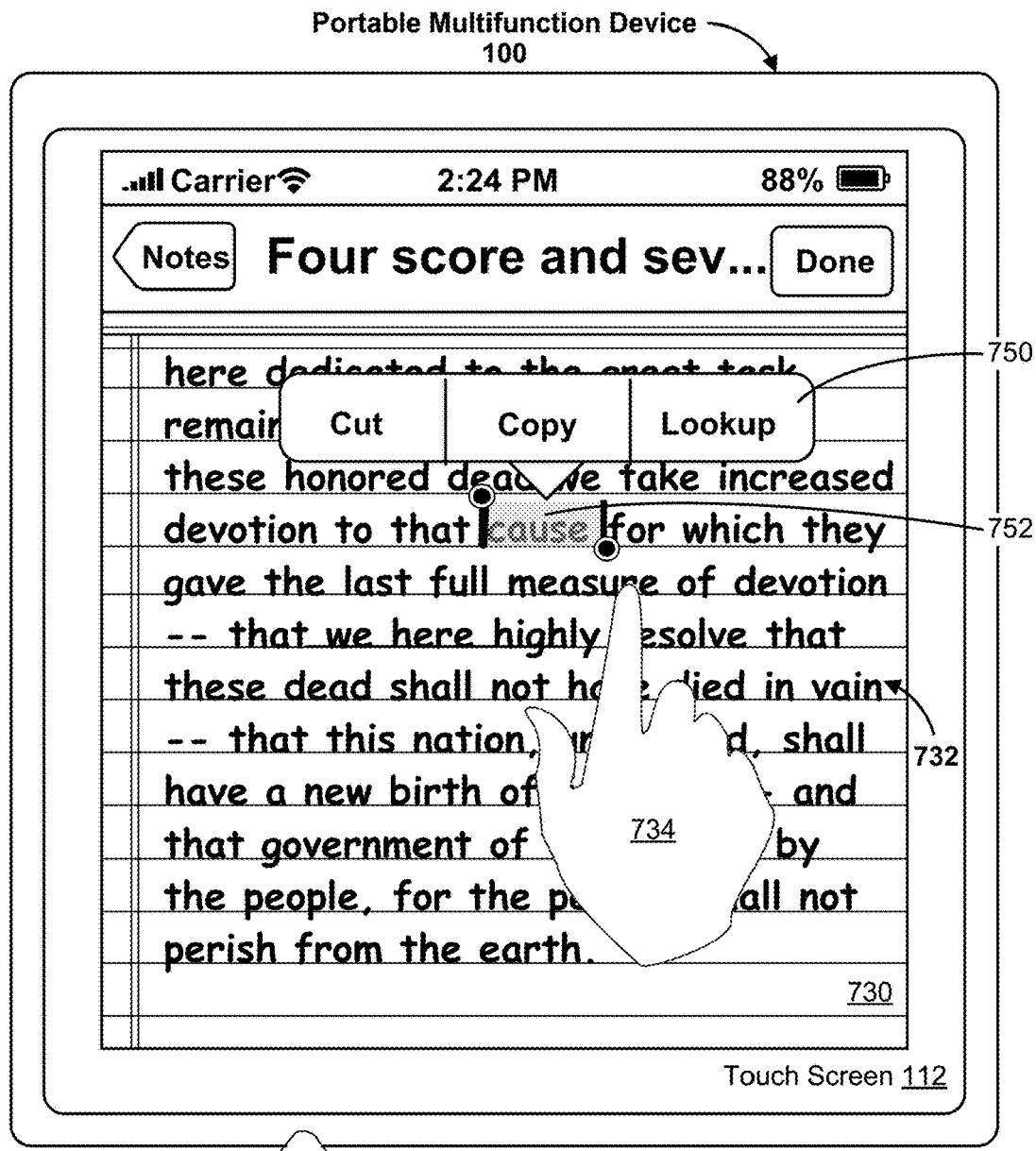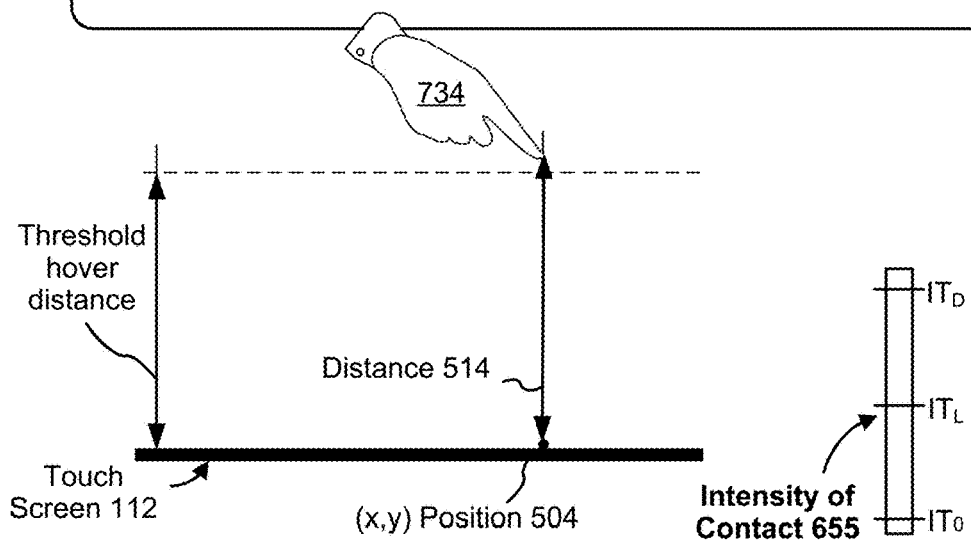
Figure 7K

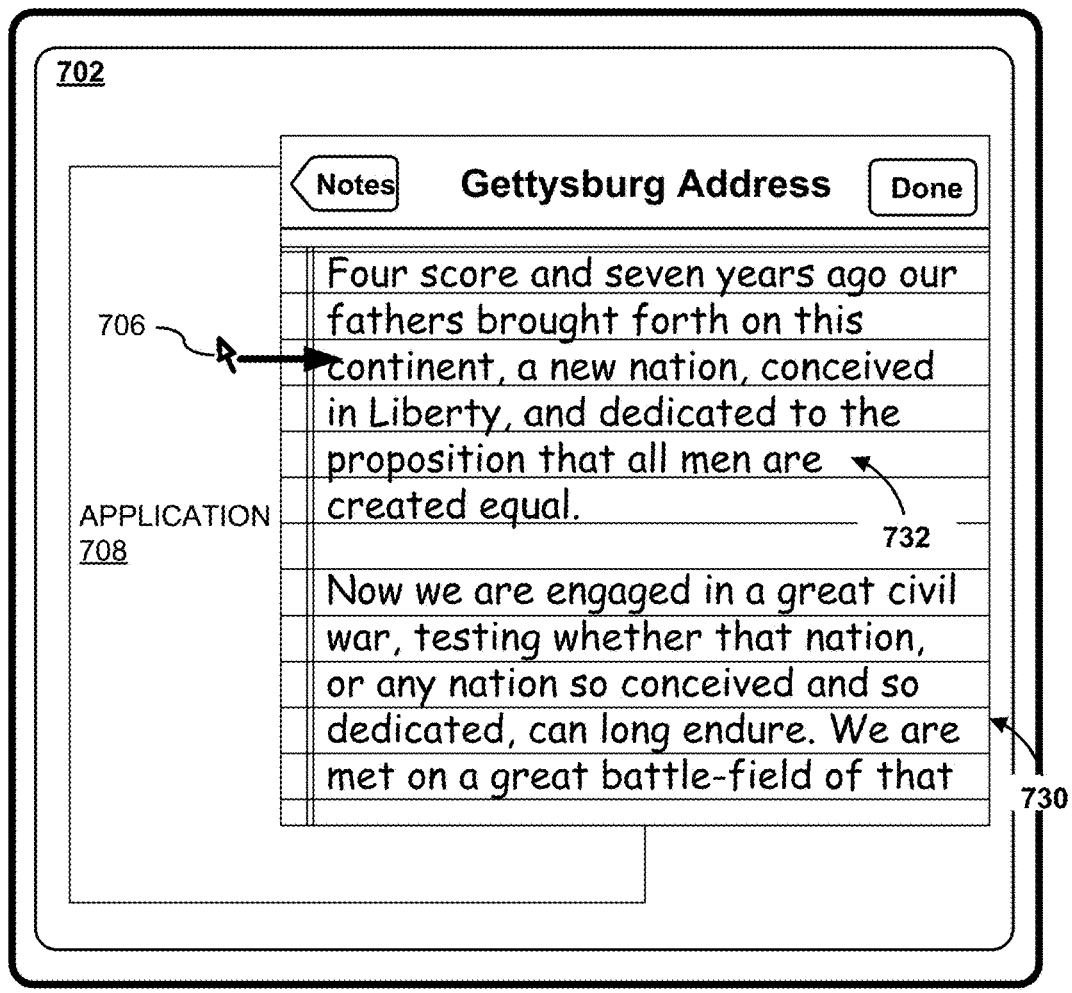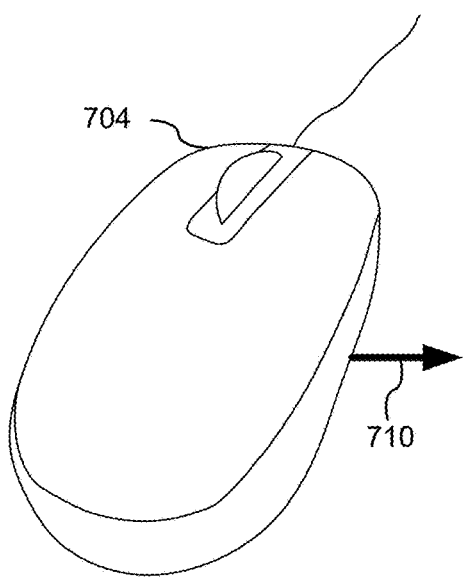
Figure 7L

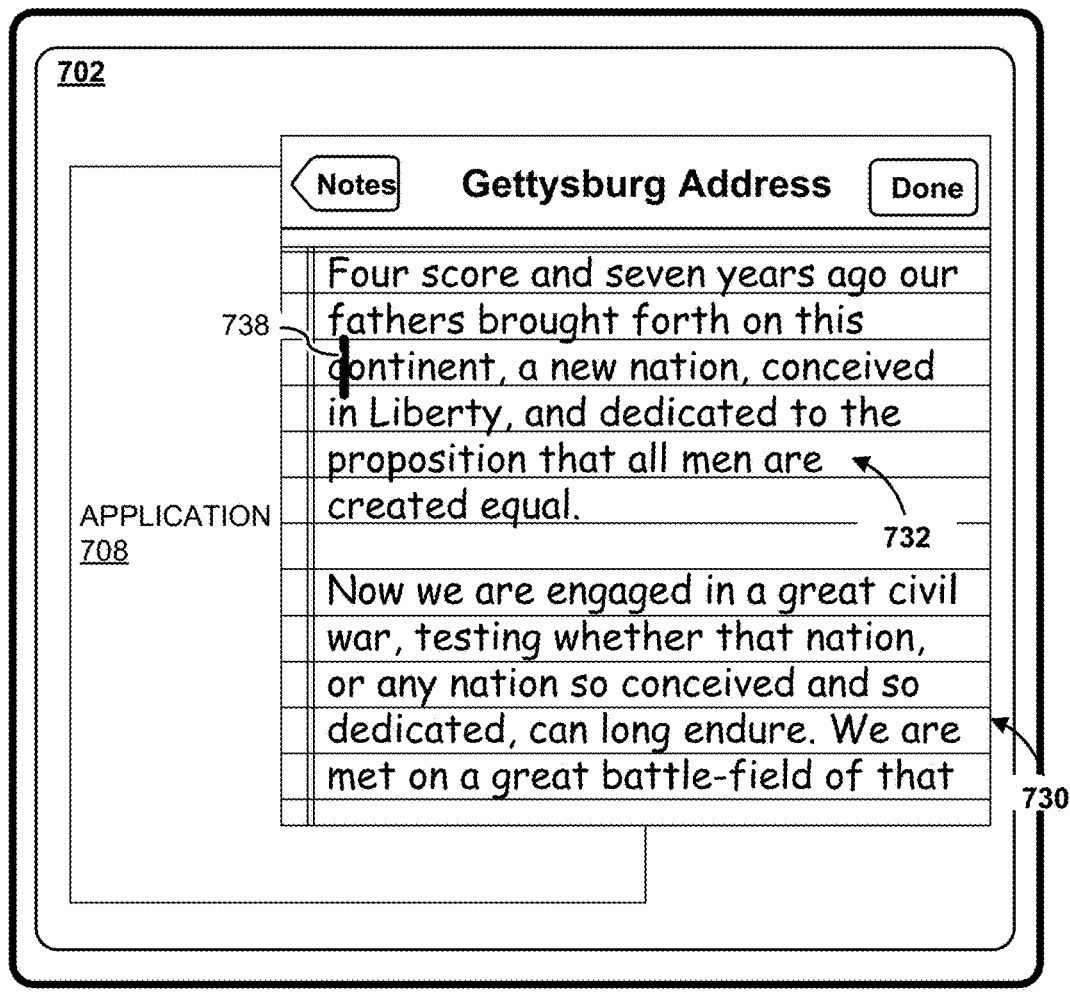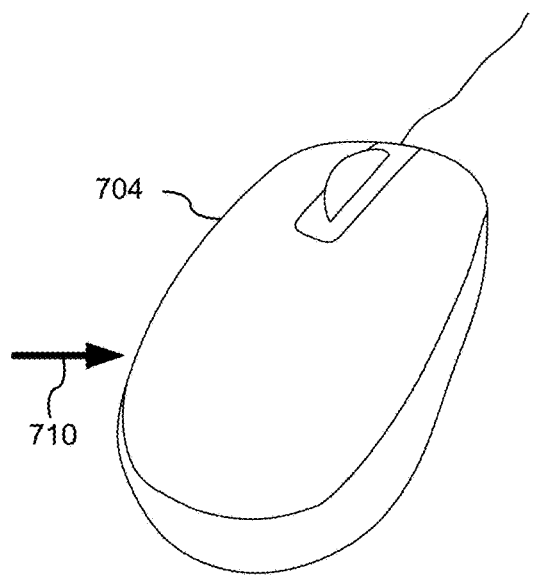
Figure 7M

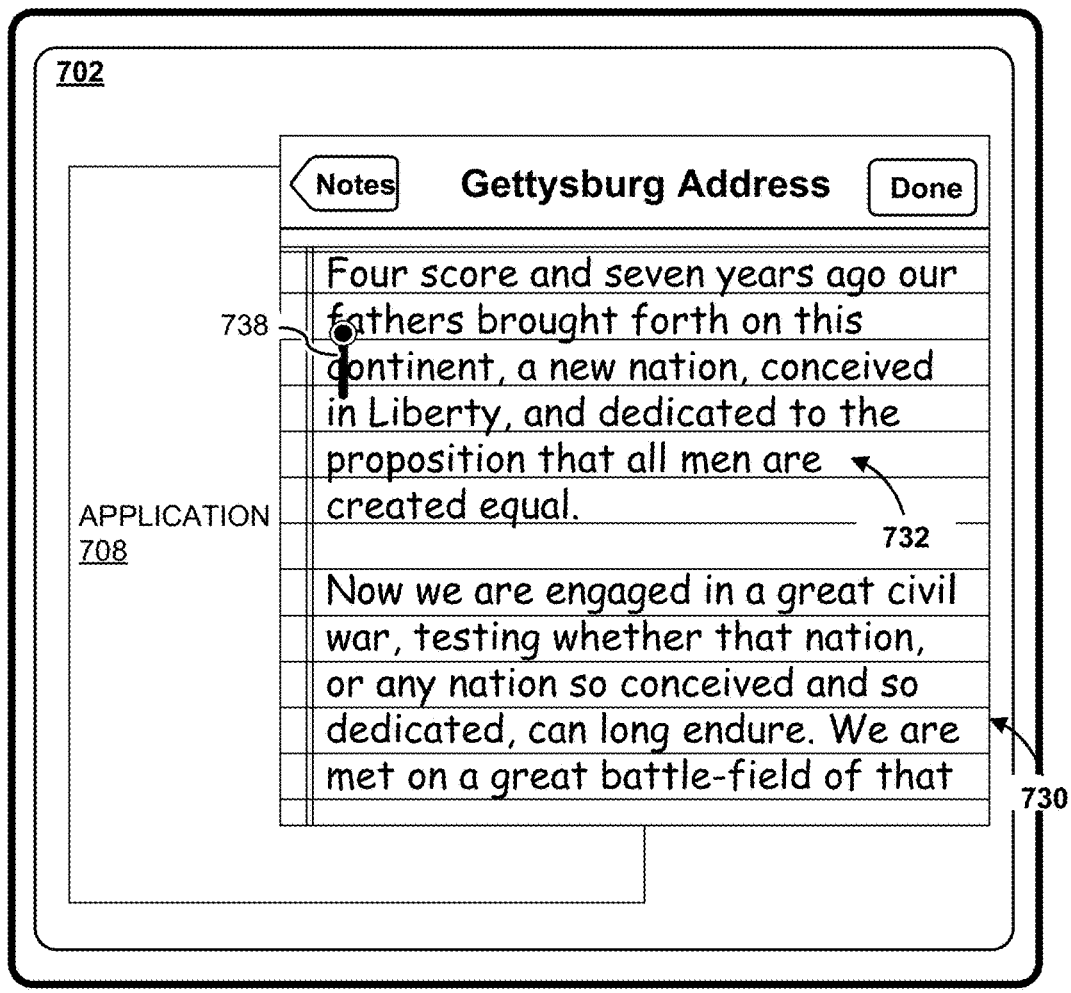
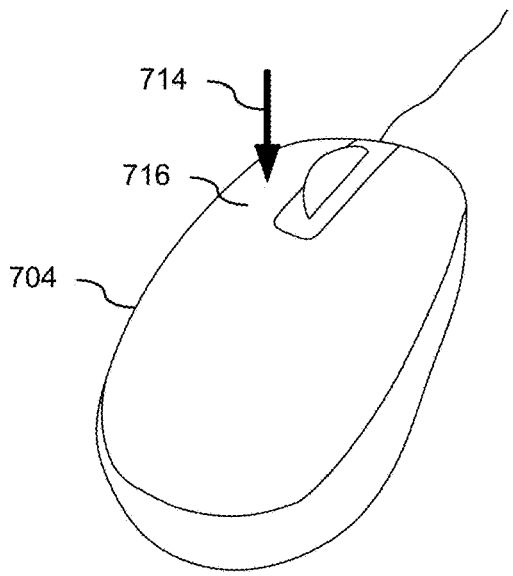
Figure 7N

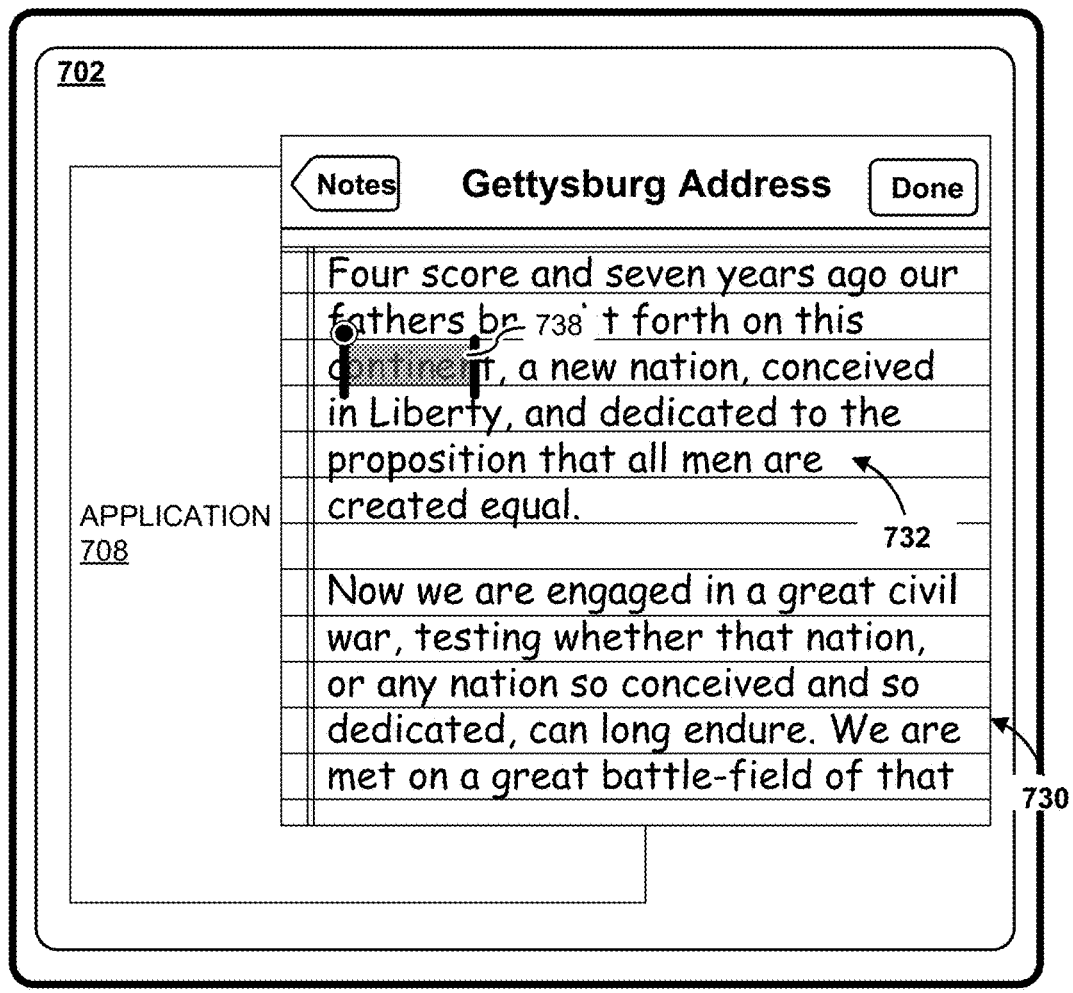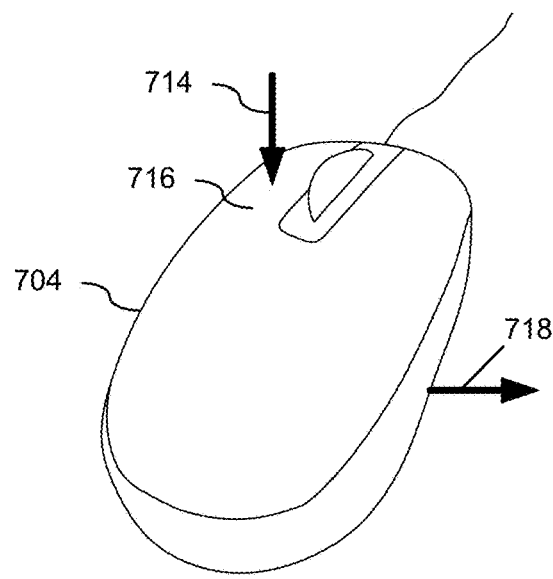
Figure 7O

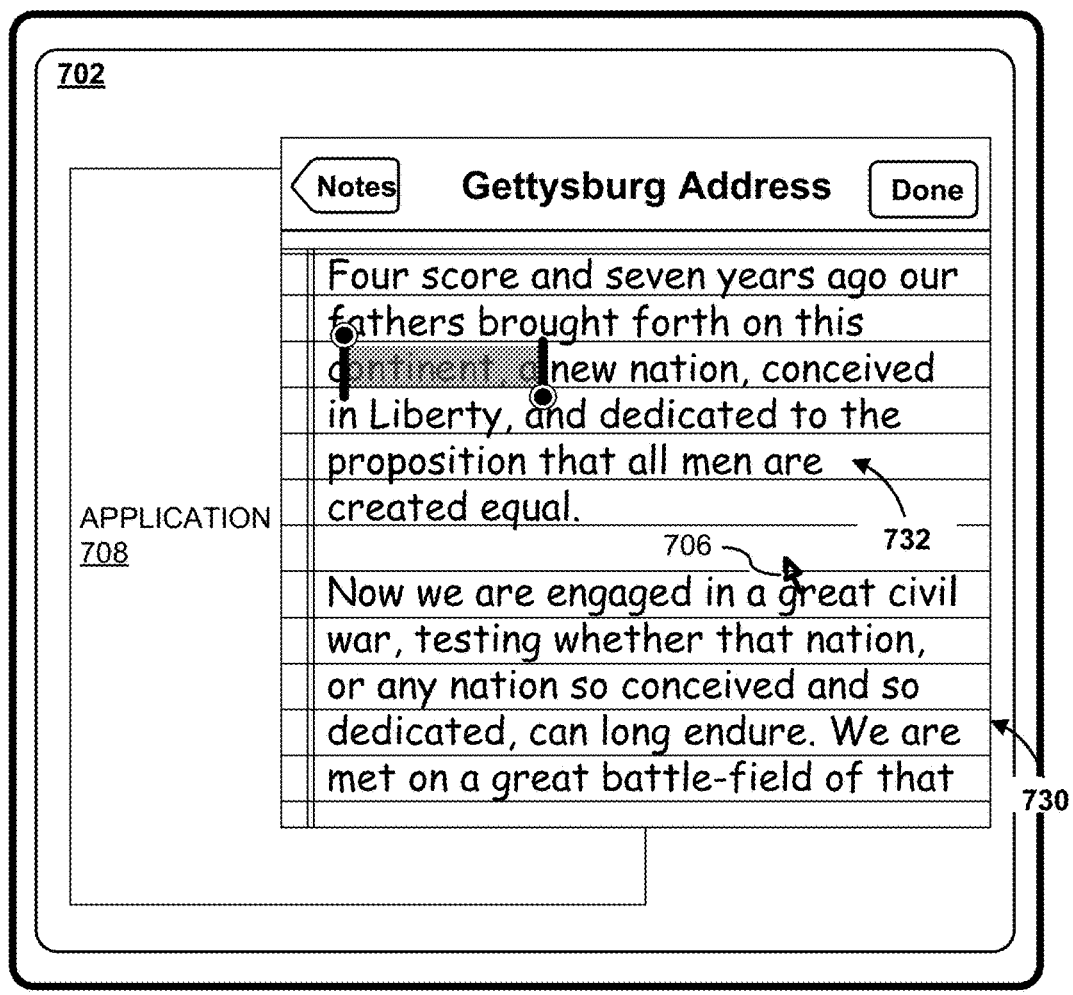
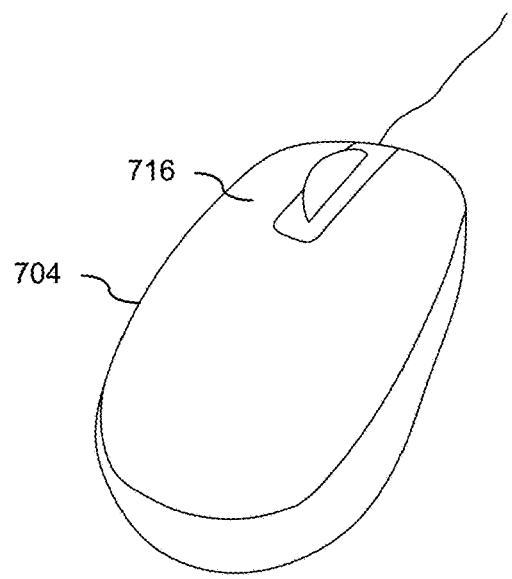
Figure 7P

1100

1102 At an electronic device with a display and an input device separate from the display, display, concurrently on the display, a user interface that includes a representation of a first application that includes a plurality of user interface objects and a pointer object

1104 The input device is selected from the group consisting of:
a mouse;
a scroll wheel;
a keyboard; and
a touchpad separate from the display

1106 While concurrently displaying the representation of the first application and the pointer object, receive, at the input device separate from the display, a user input event directed to a respective location in the user interface at which the pointer object is displayed

1108 In response to detecting the user input event, in accordance with a determination that the respective location in the user interface at which the pointer object is displayed is over the representation of the first application

1110 Generate a digitized event in accordance with the user input event, the digitized event including the location in the user interface at which the pointer object is displayed and transform the digitized event into a simulated touch event

1112 The digitized event comprises a pointer event paired with or having location information corresponding to the respective location in the user interface at which the pointer object is displayed

1114 The digitized event is generated from a pointer event paired with or having location information corresponding to the respective location in the user interface at which the pointer object is displayed (A)

Figure 11A

1108 In response to detecting the user input event, in accordance with a determination that the respective location in the user interface at which the pointer object is displayed is over the representation of the first application

1116 Provide, to the first application, information that describes the simulated touch event including information that describes locations of one or more simulated touches in the user interface 1118 The one or more simulated touches have a centroid at the respective location in the user interface at which the pointer object is displayed 1120 The simulated touch event includes a plurality of fields having information including location information corresponding to the respective location in the user interface, and a phase value selected from a set of predefined phase values that includes at least a first predefined phase value that indicates a beginning phase of a simulated touch and a second predefined phase value that indicates that the simulated touch event is an update of a prior simulated touch event 1122 The set of predefined phase values includes at least a third predefined phase value that indicates a hover phase, the hover phase indicating a simulated touch proximate to but not in contact with the display 1124 The input device includes a button.

The user input event includes a change in a state of the button.

In accordance with the change in the state of the button, the simulated touch event has the first predefined phase value that indicates a beginning phase of a simulated touch.

Figure 11B

1108 In response to detecting the user input event, in accordance with a determination that the respective location in the user interface at which the pointer object is displayed is over the representation of the first application

1126 Display, on the display, a change in the representation of the first application that is determined by the first application in response to the information that describes the simulated touch event

1128 The change in the state of the button includes an activation of the button

1130 While displaying the pointer object, receive, at the input device separate from the display, a second user input event that includes deactivation of the button.

In response to detecting the second user input event, provide, to the first application, information that describes a second simulated touch event having a phase value that indicates that the second simulated touch event corresponds to an end of the simulated touch event.

1132 While displaying the pointer object, receive, at the input device separate from the display, a third user input that moves the pointer object from the respective location to a third location on the display.

In response to detecting the third user input event, provide, to the first application, information that describes a third simulated touch event having the second predefined phase value that indicates that the third simulated touch event is an update of the simulated touch event.

Figure 11C

1134 While displaying the pointer object, receive, at the input device separate from the display, a fourth user input event directed to a third location at which the pointer object is displayed, the third location corresponding to a representation of a respective application distinct from the first application.

In response to detecting the fourth user input event:
in accordance with a determination that the respective application is configured to be executed in a first operating system framework, provide, to the respective application, information that describes a fourth simulated touch event including information that describes locations of one or more additional simulated touches; and
in accordance with a determination that the respective application is not configured to be executed in the first operating system framework, forgo provision, to the respective application, of information that describes a simulated touch event.

1136 The input device is a first input device.

The simulated touch event is a normalized touch event having a predefined event type and set of fields.

1138 Receive, at a second input device, a fifth user input event.

In response to detecting the fifth user input event, provide, to the first application, information that describes a fifth simulated touch event, the fifth simulated touch event being a normalized touch event having a same predefined event type and set of fields as the simulated touch event.

1140 The input device is a respective input device of a plurality of input devices separate from the display. The user input event is a first user input event of a plurality of user input events received from the plurality of input devices separate from the display.

1142 Generate a plurality of separate event streams in accordance with the plurality of user input events.

Merge information from the plurality of event streams to generate a stream of merged user input events, wherein the information that describes the simulated touch event includes information that describes the stream of merged user input events.

1202 At an electronic device with a display and one or more input devices separate from the display: display, on the display, a user interface for an application

1204 Receive, at the one or more input devices separate from the display, user input events

1206 Generate a plurality of separate event streams in accordance with the user input events

1208 Merge information from the plurality of separate event streams to generate a stream of merged user input events > 1210 The one or more input devices separate from the display include a first input device and a second input device distinct and separate from the first input device.
>
> The user input events include a first event received from the first input device and a second event received from the second input device.
>
> The stream of merged user input events comprises a user input event that includes information corresponding to the first event modified by information corresponding to the second event.

> 1212 The one or more input devices separate from the display include a first input device.
>
> The user input events include:
>     a first event received from the first input device, the first event corresponding to movement of a pointer on the display; and
>     a second event, distinct from the first event, corresponding to actuation of the first input device.
>
> The stream of merged user input events comprises a user input event that includes information corresponding to the first event and information corresponding to the second event.

1208 Merge information from the plurality of separate event streams to generate a stream of merged user input events (A)

---

1214 The stream of merged user input events comprises scroll events that include location information corresponding to a respective location in the user interface

1216 A respective scroll event includes a plurality of fields selected from the group consisting of:
- a field having a value indicating a first amount of scrolling;
- a field having a value indicating either a multiplier for the first amount of scrolling or a second amount of scrolling larger than the first amount of scrolling;
- a field having a value indicating the respective location in the user interface; and
- a field having a phase value selected from a set of predefined phase values that includes at least a first predefined phase value that indicates a beginning phase of the respective scroll event and a second predefined phase value that indicates that the respective scroll event is an update of a scroll event

1218 Each scroll event is a normalized event having a predefined event type and set of fields, wherein the scroll events are configured to be normalized from any of:
- a respective user input event received from a scroll wheel;
- a respective user input event corresponding to a first predefined gesture on a touch-sensitive display; and
- a respective user input event corresponding to a second predefined gesture, distinct from the first predefined gesture, on a touch-sensitive surface separate from a display.

---

1220 Provide, to the application, information that describes the stream of merged user input events (B)

Figure 12B

1222 Display, on the display, a response by the application that is based at least in part on the information that describes the stream of merged user input events

| 1224 The response by the application to the scroll events comprises panning at least a portion of the user interface |

| 1226 The display is a touch-sensitive display and the application is configured to pan at least the portion of the user interface in response to touch inputs from the touch-sensitive display as well as scroll events from the stream of merged user input events |

1302 At an electronic device with a display and an input device: display, on the display, a user interface for an application that includes a plurality of user interface objects

1303 The input device includes the touch-sensitive surface

1304 While displaying the user interface for the application, receive, at the input device, a user input

1306 In response to the user input:

1308 Provide to the application a first input event having a phase field with a first phase value, the first input event corresponding to an input proximate to but not in contact with a touch-sensitive surface

1310 The first input event corresponding to the user input proximate to but not in contact with the touch-sensitive surface is triggered by detecting an input within a predefined distance of the touch-sensitive surface

1312 The first input event and the second input event are provided to the application in a normalized touch event data structure that includes a phase field and an input identifier field.

The first input event and the second input event have a same value for the input identifier field.

1314 The first phase value indicates that the first input event corresponds to a beginning of an input proximate to but not in contact with the touch-sensitive surface (A)

Figure 13A

1338 The user interface for the application comprises a first view. The displaying includes displaying a second view. The first input event and second input event are directed to the first view of the first application.

1340 While displaying the first view and the second view, receive, at the input device, a second user input having a location that moves from a first location that corresponds to the first view to a second location that correspond to the second view.

In response to the second user input, generate a ninth input event having a respective phase field with a respective phase value, wherein the ninth input event includes information that corresponds to the second location.

In accordance with a determination that the respective phase value for the ninth input event is a hover phase indicating a touch proximate to but not in contact with the touch-sensitive surface, provide the ninth input event to an application associated with the second view.

In accordance with a determination that the respective phase value for the third input event is a touch phase indicating a touch in contact with the touch-sensitive surface, provide the ninth input event to an application associated with the first view.

1342 The displaying includes displaying, on the display, a pointer object. The second user input is received from an input device separate from the display. The second user input corresponds to movement of the pointer object from the first location that corresponds to the first view to the second location that corresponds to the second view.

1344 The display is a touch-sensitive display that includes the touch-sensitive surface, the touch-sensitive display being sensitive to contacts proximate to but not in contact with the touch-sensitive display. The second user input is received from the touch-sensitive display. The second user input corresponds to an input at the touch-sensitive display that moves from a location over the first location on the touch-sensitive display that corresponds to the first view to a location over the second location on the touch-sensitive display that corresponds to the second view.

1346 The second view is a respective view of the application

1348 The application is a first application. The first view is a respective view of the first application. The second view is a respective view of a second application distinct from the first application.

Figure 13E

DEVICES, METHODS, AND USER INTERFACES FOR CONVEYING PROXIMITY-BASED AND CONTACT-BASED INPUT EVENTS

RELATED APPLICATIONS

This application is a continuation of U.S. application Ser. No. 16/425,828, filed May 29, 2019, which claims priority to U.S. Provisional Application Ser. No. 62/679,956, filed Jun. 3, 2018, each of which is incorporated by reference herein in its entirety.

TECHNICAL FIELD

This relates generally to electronic devices with input devices, including but not limited to electronic devices with touch-sensitive surfaces that facilitate and convey user proximity-based and contact-based input events.

BACKGROUND

The use of touch-sensitive surfaces as input devices for computers and other electronic computing devices has increased significantly in recent years. Exemplary touch-sensitive surfaces include touchpads and touch screen displays. Such surfaces are widely used to manipulate user interface objects on a display.

Some touch-sensitive surfaces also include sensors that detect inputs provided by an object (e.g., stylus) that is not in direct contact with the touch-sensitive surface, but is in close proximity to the touch-sensitive surface. The proximity-based inputs provide an additional avenue for manipulating user interface objects on a display. However, contact-based inputs and proximity-based inputs often do not work together seamlessly and may interfere with each other and cause confusion and frustration for the user.

SUMMARY

Accordingly, there is a need for methods of facilitating contact-based and proximity-based user inputs as well as conveying input events based on contact and proximity to appropriate applications and views within such applications. Further, there is a need for methods of translating other user inputs (e.g., user inputs that are not based on contact with or proximity to a touch-sensitive surface, such as mouse or trackball-based inputs) into contact-based and proximity-based input events, so that applications that are expecting such input events can be made compatible with different operating systems and different peripheral input devices. Such methods and interfaces optionally complement or replace conventional methods for handling contact-based and proximity-based user inputs.

The above deficiencies and other problems associated with event handling for electronic devices are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. Executable instructions for performing these functions are, optionally, included in a non-transitory computer readable storage medium or other computer program product configured for execution by one or more processors.

In accordance with some embodiments, a method is performed at an electronic device with a display and an input device separate from the display. The method includes displaying, concurrently on the display, a user interface that includes: a representation of a first application that includes a plurality of user interface objects; and a pointer object. The method further includes, while concurrently displaying the representation of the first application and the pointer object, receiving, at the input device separate from the display, a user input event directed to a respective location in the user interface at which the pointer object is displayed. The method further includes: in response to detecting the user input event, in accordance with a determination that the respective location in the user interface at which the pointer object is displayed is over the representation of the first application: providing, to the first application, information that describes a simulated touch event including information that describes locations of one or more simulated touches in the user interface; and displaying, on the display, a change in the representation of the first application that is determined by the first application in response to the information that describes the simulated touch event.

In accordance with some embodiments, a method is performed at an electronic device with a display and one or more input devices separate from the display. The method includes displaying, on the display, a user interface for an application. The method further includes receiving, at the one or more input devices separate from the display, user input events. The method further includes generating a plurality of separate event streams in accordance with the user input events. The method further includes merging information from the plurality of separate event streams to generate a stream of merged user input events; providing, to the application, information that describes the stream of merged user input events; and displaying, on the display, a response by the application that is based at least in part on the information that describes the stream of merged user input events.

In accordance with some embodiments, a method is performed at an electronic device with a display and an input device. The method includes displaying, on the display, a user interface for an application that includes a plurality of user interface objects. The method further includes, while displaying the user interface for the application, receiving, at the input device, a user input. The method further includes, in response to the user input, providing to the application a first input event having a phase field with a first phase value, the first input event corresponding to an input proximate to but not in contact with a touch-sensitive surface. The method further includes, after providing the first input event, providing to the application a second input event having a phase field with a second phase value, the second input event corresponding to the user input being in contact with the touch-sensitive surface. The method further includes displaying, on the display, an update to the user interface for the application that is based at least in part on the first input event and the second input event.

In accordance with some embodiments, an electronic device includes a display, an input device (e.g., optionally a touch-sensitive surface), optionally one or more sensors to detect proximity of an input object above the touch-sensitive surface, optionally one or more sensors to detect intensities of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, an input device (e.g., optionally a touch-sensitive surface), optionally one or more sensors to detect proximity of an input object above the touch-sensitive surface, and optionally one or more sensors to detect intensities of contacts, cause the device to perform or cause performance of the operations of any of the methods described herein. In accordance with some embodiments, an electronic device includes: a display, an input device (e.g., optionally a touch-sensitive surface), optionally one or more sensors to detect proximity of an input object above the touch-sensitive surface, optionally one or more sensors to detect intensities of contacts, and means for performing or causing performance of the operations of any of the methods described herein. In accordance with some embodiments, an information processing apparatus, for use in an electronic device with a display an input device (e.g., optionally a touch-sensitive surface), optionally includes one or more sensors to detect proximity of an input object above the touch-sensitive surface, optionally includes one or more sensors to detect intensities of contacts, and includes means for performing or causing performance of the operations of any of the methods described herein.

Thus, electronic devices with displays, input devices (e.g., optionally a touch-sensitive surface), optional sensors to detect proximity of input objects above the touch-sensitive surfaces, and optional sensors to detect intensities of contacts are provided with improved methods facilitating proximity-based and contact-based user inputs and conveying input events based on such user inputs, thereby increasing the effectiveness and efficiency of such devices, and increasing user satisfaction with such devices. Such methods may complement or replace conventional methods for handling proximity-based and contact-based inputs.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 5A-5B illustrate a positional state of a stylus relative to a touch-sensitive surface in accordance with some embodiments

FIG. 6B illustrates an example user interface for a multifunction device with a touch-sensitive surface that is separate from the display in accordance with some embodiments.

FIGS. 11A-11D illustrate a flow chart for a method of providing simulated touch events to an application, in accordance with some embodiments.

FIGS. 12A-12C illustrate a flow chart for a method of merging input events from separate event streams and providing a merged input event to an application, in accordance with some embodiments.

FIGS. 13A-13E illustrate a flow chart for a method of providing hover-based input events to an application, in accordance with some embodiments.

DESCRIPTION OF EMBODIMENTS

Figure 1A:
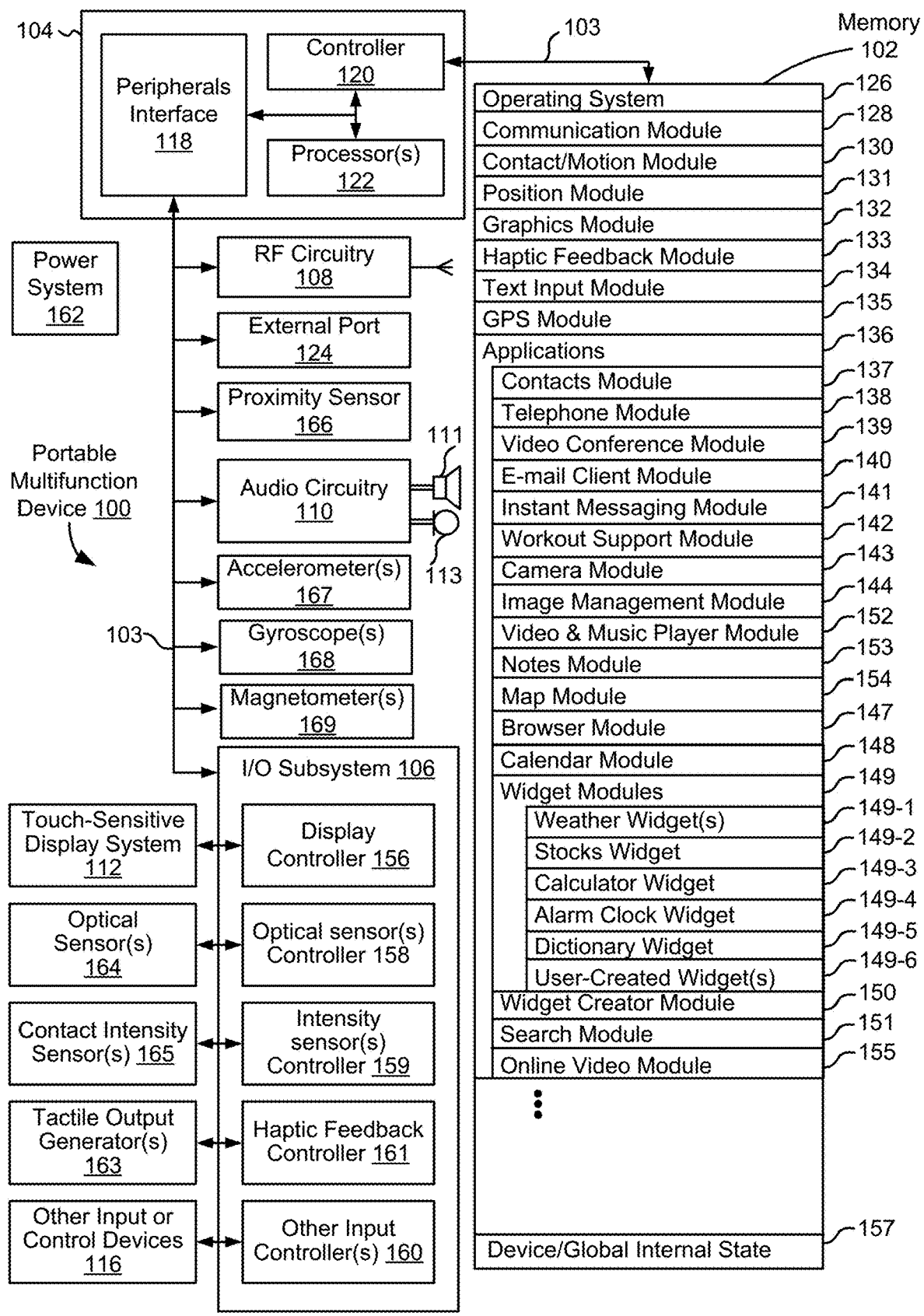
FIG. 1A is a block diagram illustrating a portable multifunction device with a touch-sensitive display in accordance with some embodiments.

Portable multifunction devices and laptop computers often use quite different input devices. For example, portable multifunction devices (e.g., smart phones) may include touch screens, whereas laptop computers may include or be coupled with physical keyboards, mice and/or touch-sensitive surfaces that are separate from displays. The result is that input events made available by a device's operating system to the device's applications are largely dependent on the types of the input devices that the device includes. For this reason, software applications are often developed for a specific type of device (e.g., a portable multifunction device with a touch screen) and do not easily port over to different operating systems. Instead, application developers must re-write their software for different operating systems that run on different types of devices.

Some embodiments, described herein, allow an application developed for a first operating system framework (e.g., a touch screen framework) to interpret input events from a second operating system framework (e.g., a framework in which user inputs are received at an input device that is separate from a display). To that end, input events are translated from devices separate from a display into simulated touch events, which the application is capable of interpreting. In some embodiments, the translation occurs at a second application that is native to the second operating system framework. The second application is an input event translator that acts as a host for the first application. In this manner, the second application acts as an added layer in an input/output processing stack.

Through the use of different gestures, devices with touch-sensitive displays (e.g., touch screens) are capable of interpreting a wide-range of user inputs. For example, a one- or two-finger swipe on a touch screen may be interpreted as a scroll gesture, whereas a two-finger pinch may be interpreted as a zoom gesture. Devices that include input devices separate from their displays (e.g., peripherals) are equally capable of disambiguating a wide-range of user inputs, but doing so involves additional challenges. For example, while disambiguation of gestures is often restricted to interpreting user inputs from a single input device (e.g., the touch screen), user inputs from one peripheral input device (e.g., a mouse, keyboard, or touchpad separate from the display) are often modified by user inputs from a different peripheral input device. For example, actuation of a mouse's scroll wheel may result in zooming when a "control" button on a separate keyboard is held down, and may result in scrolling when the "control" button on the keyboard is not held down.

The fact that a user input from one input device may be modified by a user input from a different user input device presents the problem of knowing when input events are related and should be interpreted together. Because touch screen devices rarely face this challenge, this problem is particularly acute for applications that have been developed for touch screens but that are nonetheless being executed on a device with one or more input devices separate from the display (e.g., as described above). Some embodiments, described herein, solve this problem by merging (e.g., de-multiplexing) input events from separate event streams into a single merged input event prior to providing the input events to the application. Thus, in some embodiments, the process of determining which input events are related is moved (e.g., delegated) from software applications (which may have been developed by third-parties) to a host or operating system, which is better situated for deciding which input events are related. The result of merging input events in this manner is that third-party applications interpret input events with greater consistency. For applications developed for touch screen frameworks, these embodiments increase cross-platform compatibility by solving a problem that developers for touch screen applications (i.e., applications configured to receive inputs from a touch screen) rarely have to consider in their native framework.

Some touch-sensitive surfaces are capable of detecting the proximity of an input object (e.g., a finger or a stylus) above the touch-sensitive surface. These so-called "hover" inputs can be used to manipulate user interface objects. However, hover inputs are generally treated as separate from other user inputs (e.g., contact-based user inputs) despite the fact that a hovering over a touch-sensitive surface could be viewed as part of the same gesture as a subsequent or prior contact. Treating proximity-based input events and contact-based input events as being from disparate user inputs results in user interfaces that are cumbersome and non-intuitive for the user.

Some embodiments solve this problem by providing hover input events in a normalized touch input event format having the same data structure as that which is used to represent contact-based touch events. These touch input events include a phase field that takes on a value describing, among other things, whether the input event is a hover event or a contact-based event (the phase value may also indicate whether the event is a change or an end of a previously-detected event). In some embodiments, hover input events that are related to contact-based input events are assigned the same input identifier, so when these events are provided to gesture recognizers, they can be interpreted as part of the same gesture. To aide cross-platform compatibility, as described above, some embodiments also provide simulated hover events based on user inputs from input devices that do not detect proximity of contacts above a touch-sensitive surface. For example, a mouse pointer entering a window may be interpreted as a hover event over that window, while a left-mouse click while the pointer is over the window may be interpreted as a contact in that window.

Figure 2:
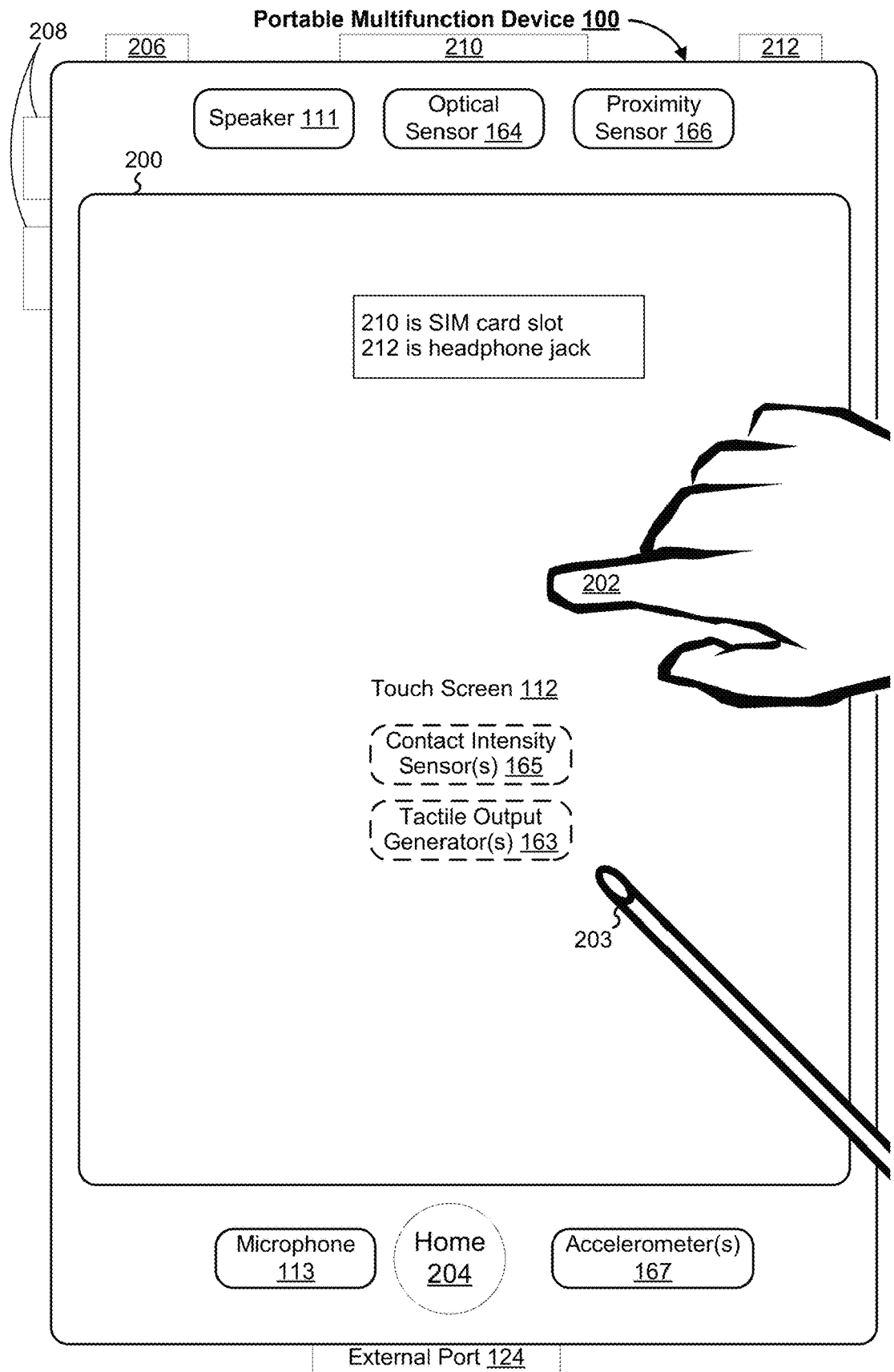
FIG. 2 illustrates a portable multifunction device having a touch screen in accordance with some embodiments.
Figure 3:
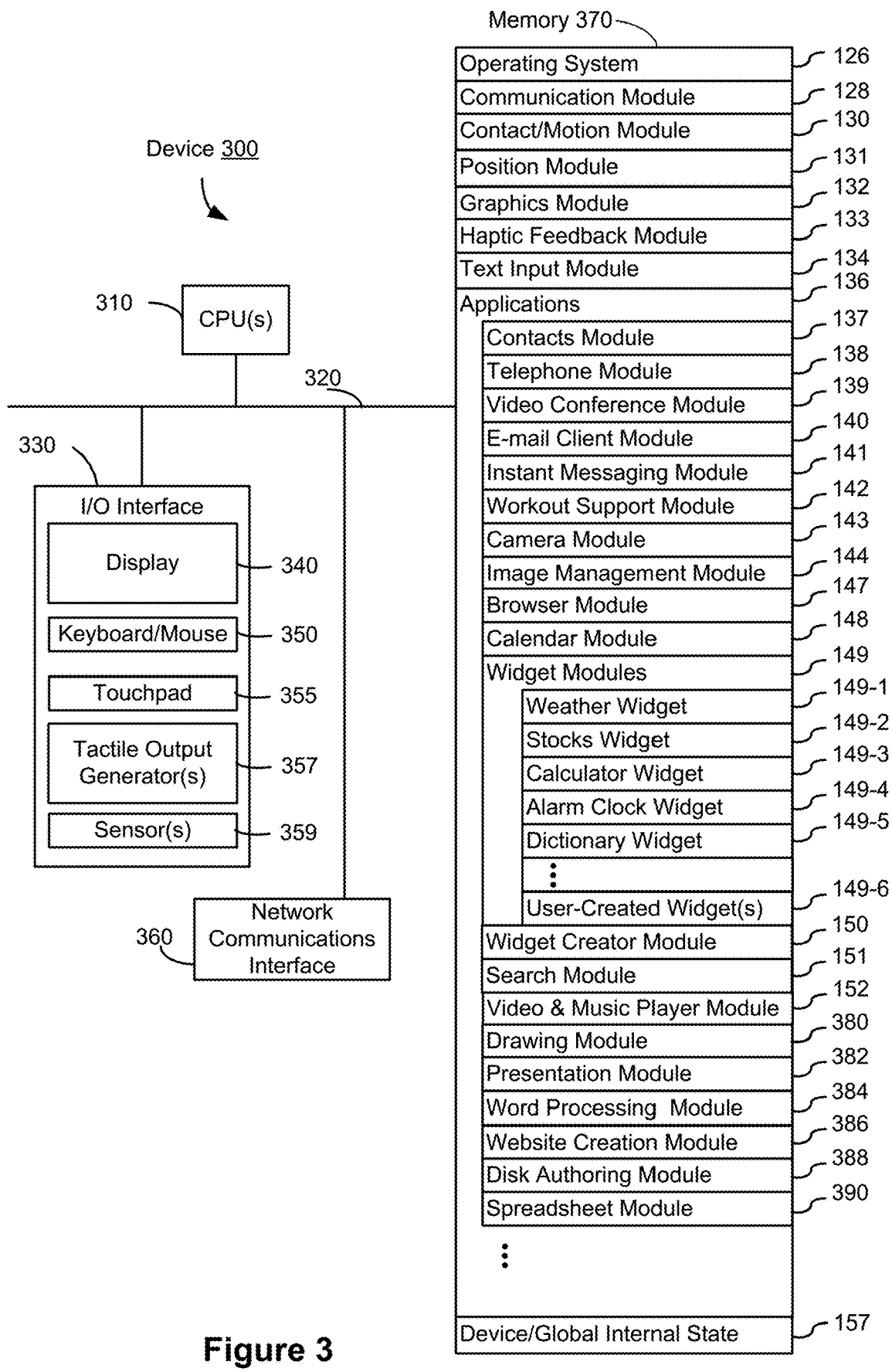
FIG. 3 is a block diagram of an example multifunction device with a display and a touch-sensitive surface in accordance with some embodiments.
Figure 4:
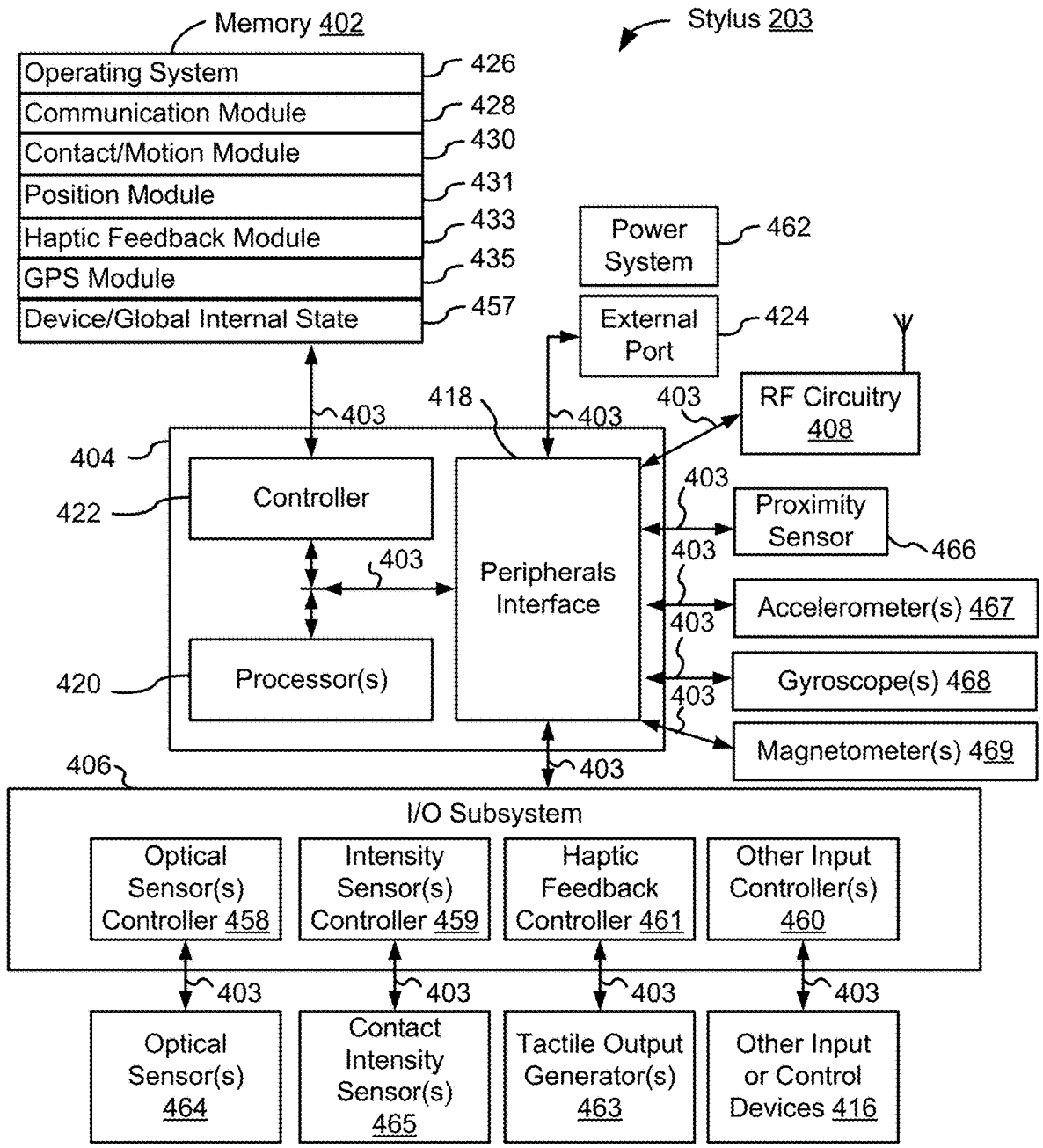
FIG. 4 is a block diagram of an exemplary electronic stylus in accordance with some embodiments.
Figure 5B:
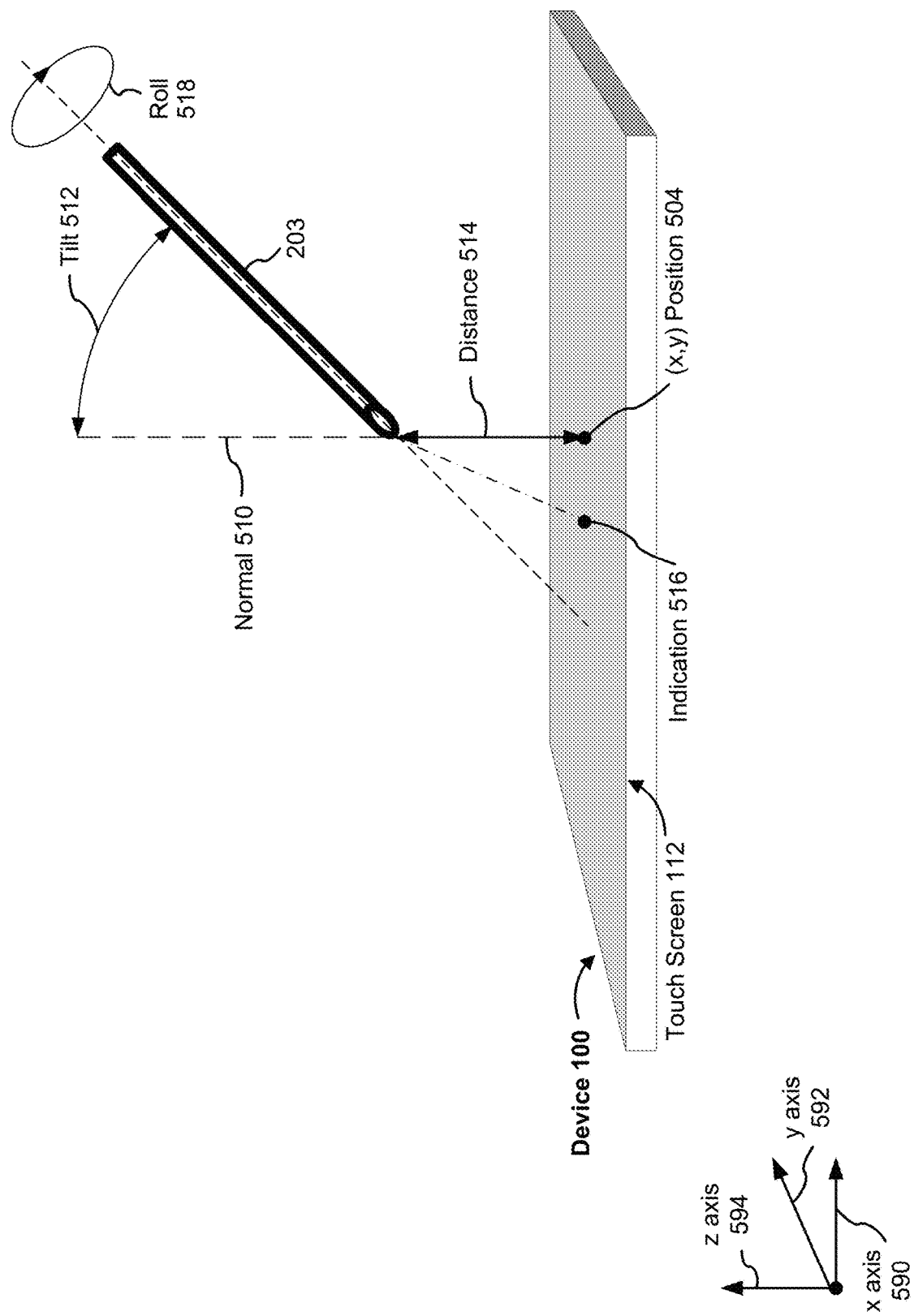
Figure 8:
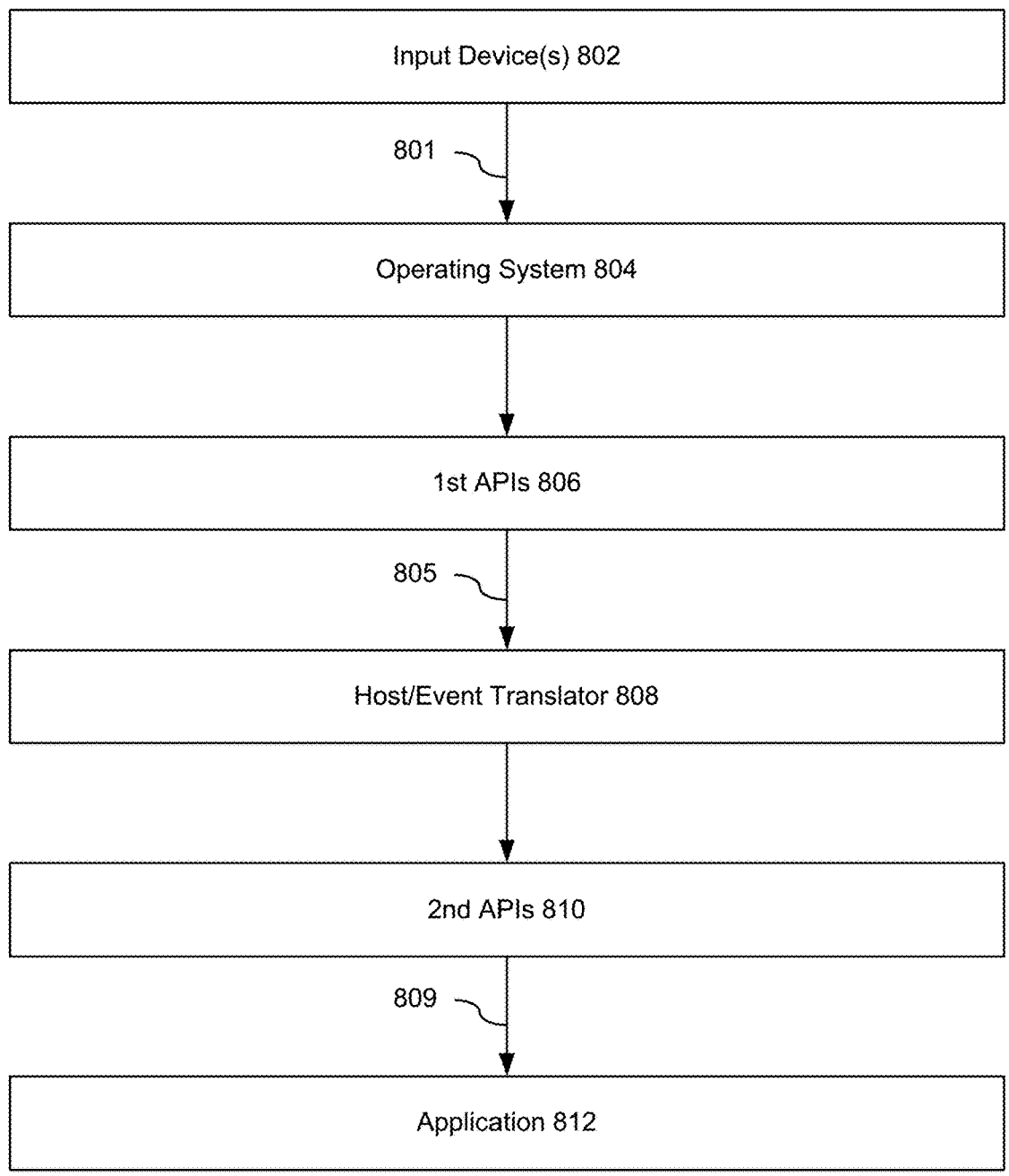
FIG. 8 is a diagram of an input/output processing stack of an exemplary device with a display and a separate input device, in accordance with some embodiments.
Figure 9B:
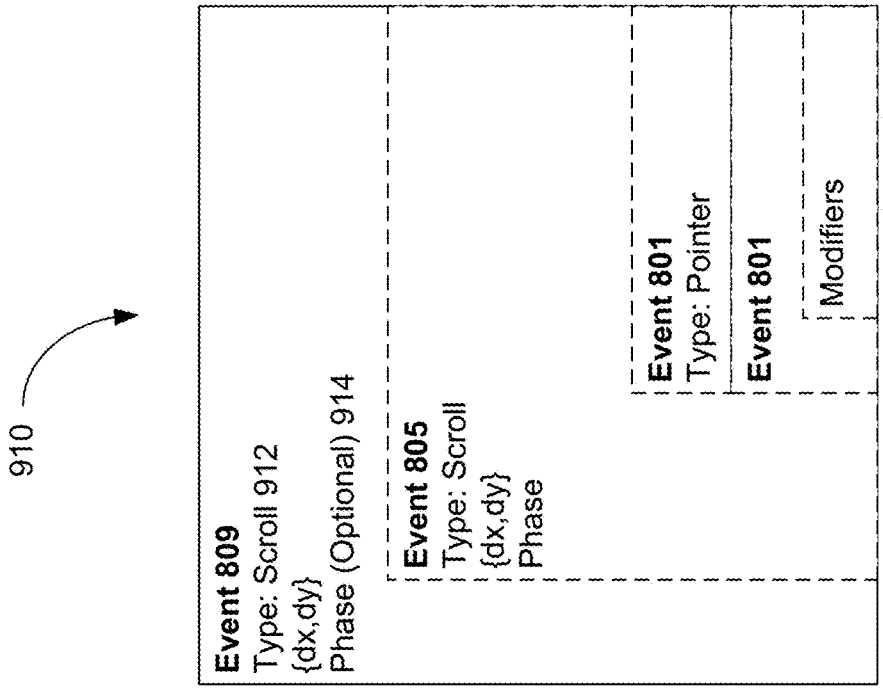
FIGS. 9A-9B illustrate exemplary data structures for providing touch input events, including hover-based and contact-based input events, to an application, in accordance with some embodiments.
Figure 9A:
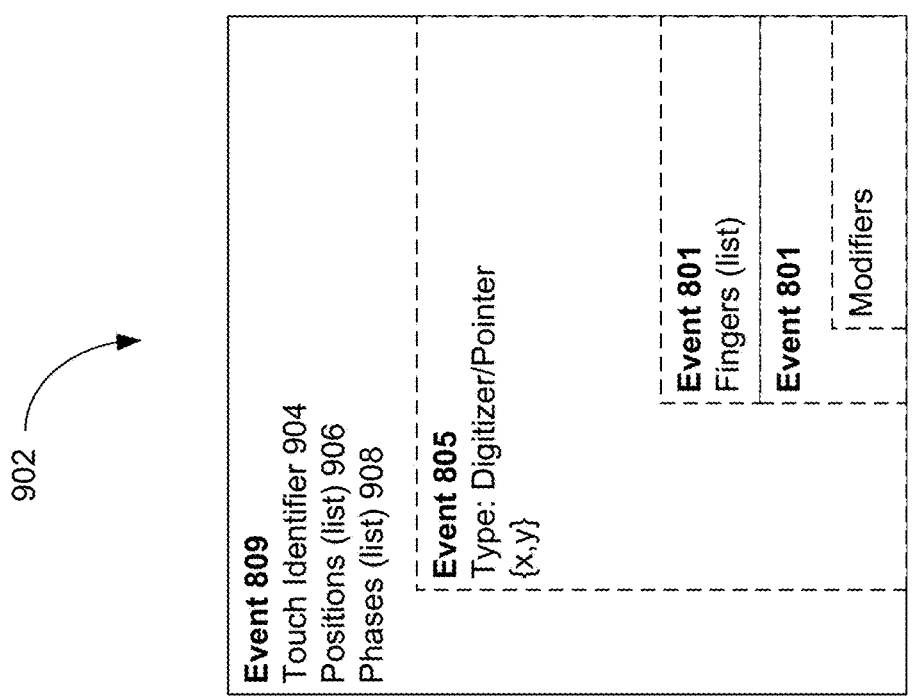
Figure 10:
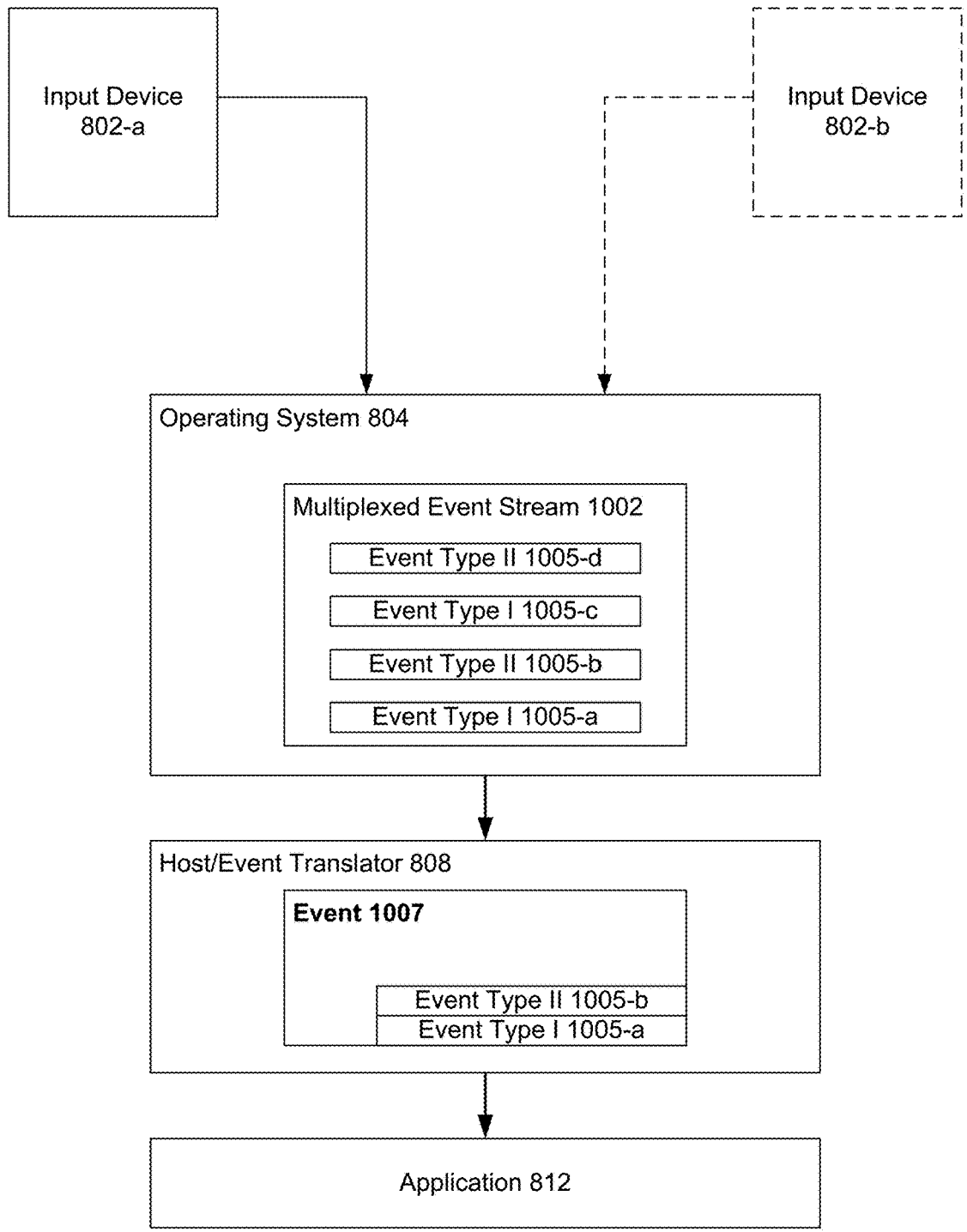
FIG. 10 is a diagram of an input/output processing stack that merges (e.g., de-multiplexes) input events from separate event streams and then provides a merged user input event to an application, in accordance with some embodiments.
Figure 13B:
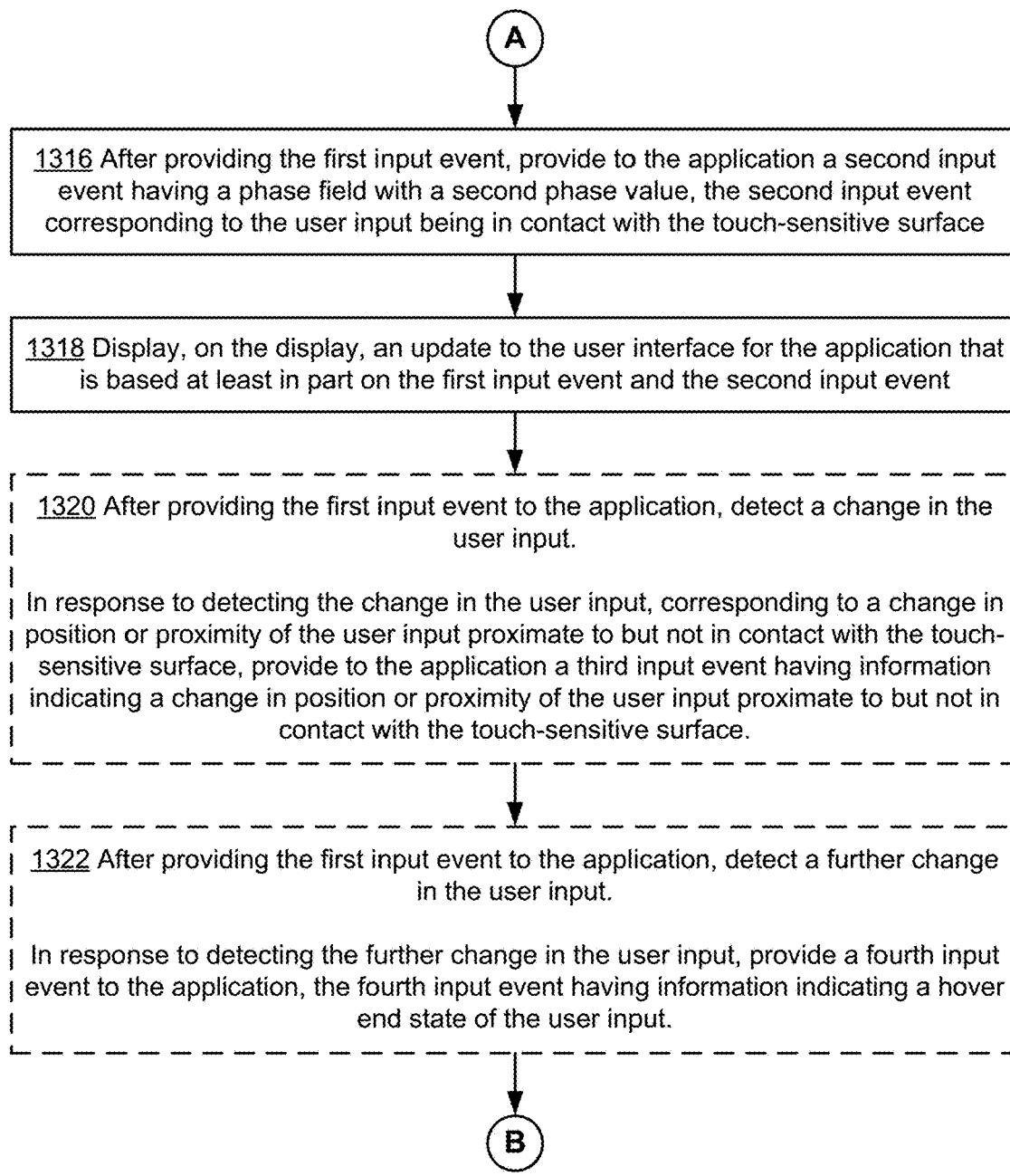
Figure 13C:
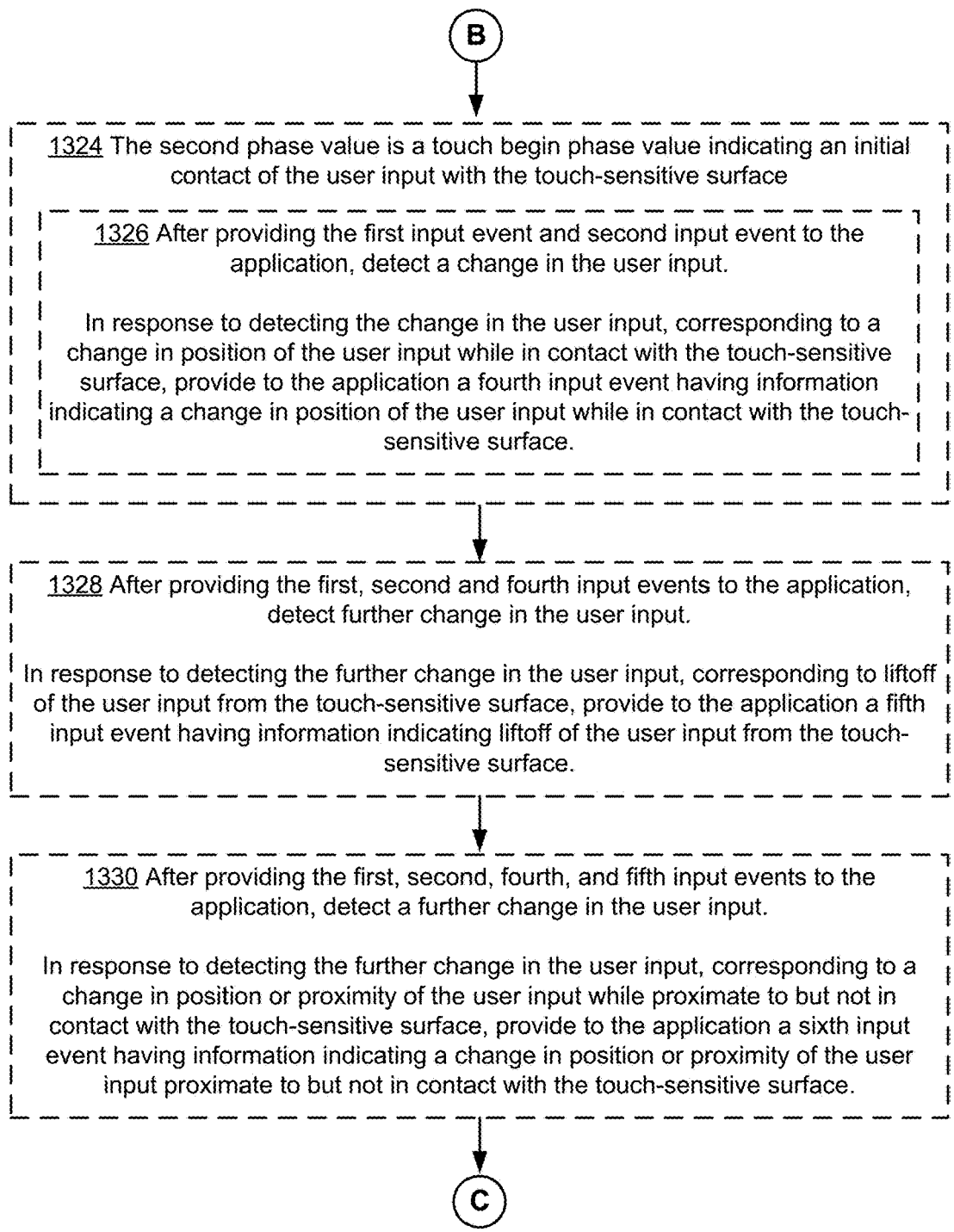
Figure 13D:
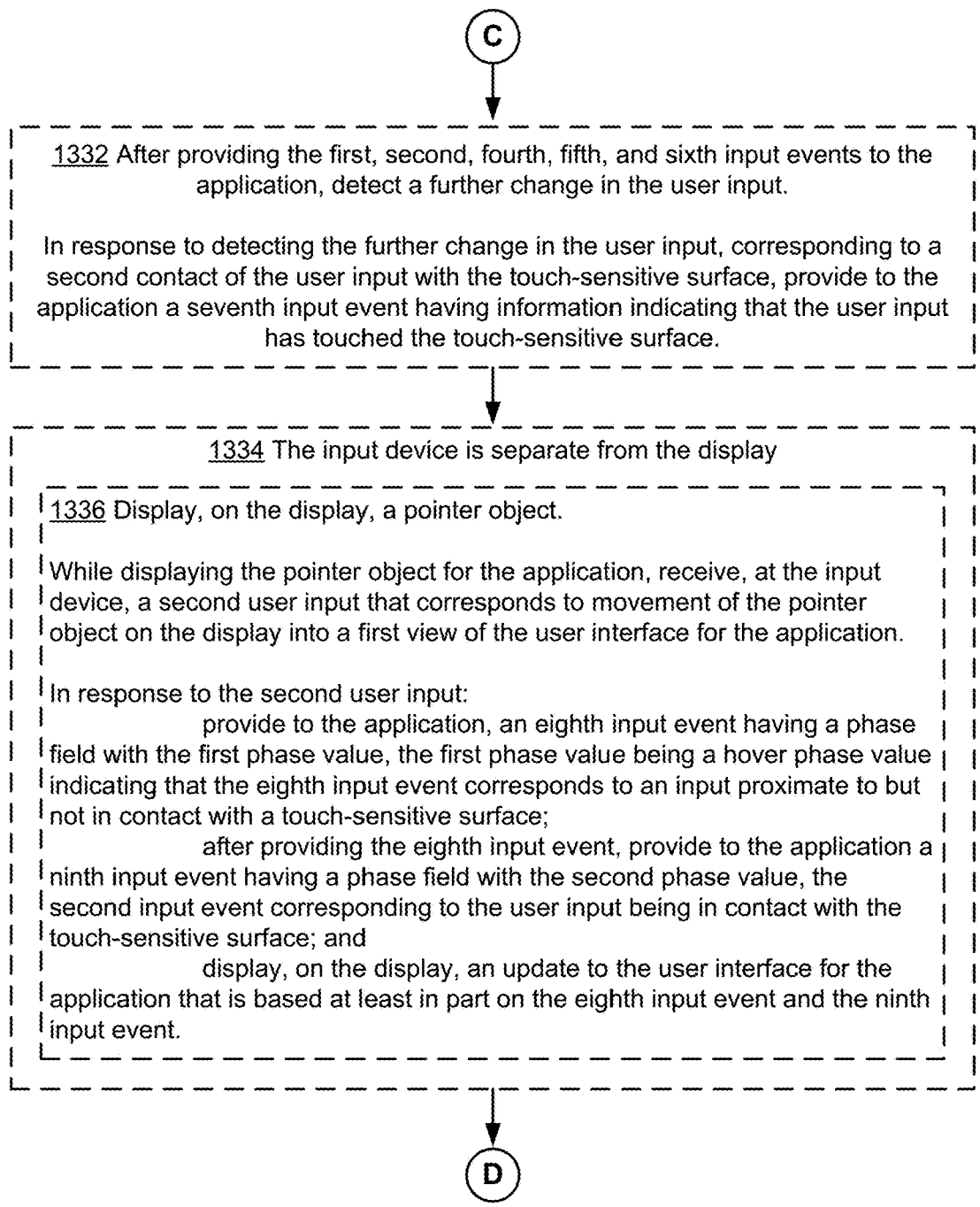

FIGS. 1A-1B, 2, and 3, as discussed below, illustrate exemplary devices. FIG. 4 illustrates an exemplary electronic stylus. FIGS. 5A-5B illustrate a positional state of a stylus relative to a touch-sensitive surface. FIGS. 6A-6B and FIGS. 7A-7Q illustrate exemplary user interfaces for interacting with a user interface object through user inputs. FIG. 8 and FIG. 10 illustrate exemplary input/output processing stacks for providing applications with input events based on the inputs shown in FIGS. 6A-6B and FIGS. 7A-7Q. FIGS. 9A-9B illustrate exemplary data structures for providing touch-based input events to an application based on the inputs shown in FIGS. 6A-6B and FIGS. 7A-7Q. FIGS. 11A-11D, FIGS. 12A-12C, and FIGS. 13A-13E illustrate methods of providing input events to an application based on the inputs shown in FIGS. 6A-6B and FIGS. 7A-7Q.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, a trackball and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" is a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch screen display in a portrait view or a landscape view based on an analysis of data received from the one or more accelerometers. Device 100 optionally includes a GPS (or GLONASS or other global navigation system) receiver (not shown) for obtaining information concerning the location of device 100.

In some embodiments, the software components stored in memory 102 include operating system 126, communication module (or set of instructions) 128, contact/motion module (or set of instructions) 130, position module (or set of instructions) 131, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one-finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensities of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criterion that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Position module 131, in conjunction with accelerometers 167, gyroscopes 168, and/or magnetometers 169, optionally detects positional information concerning the device, such as the device's attitude (roll, pitch, and/or yaw) in a particular frame of reference. Position module 130 includes software components for performing various operations related to detecting the position of the device and detecting changes to the position of the device. In some embodiments, position module 131 uses information received from a stylus being used with the device to detect positional information concerning the stylus, such as detecting the positional state of the stylus relative to the device and detecting changes to the positional state of the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
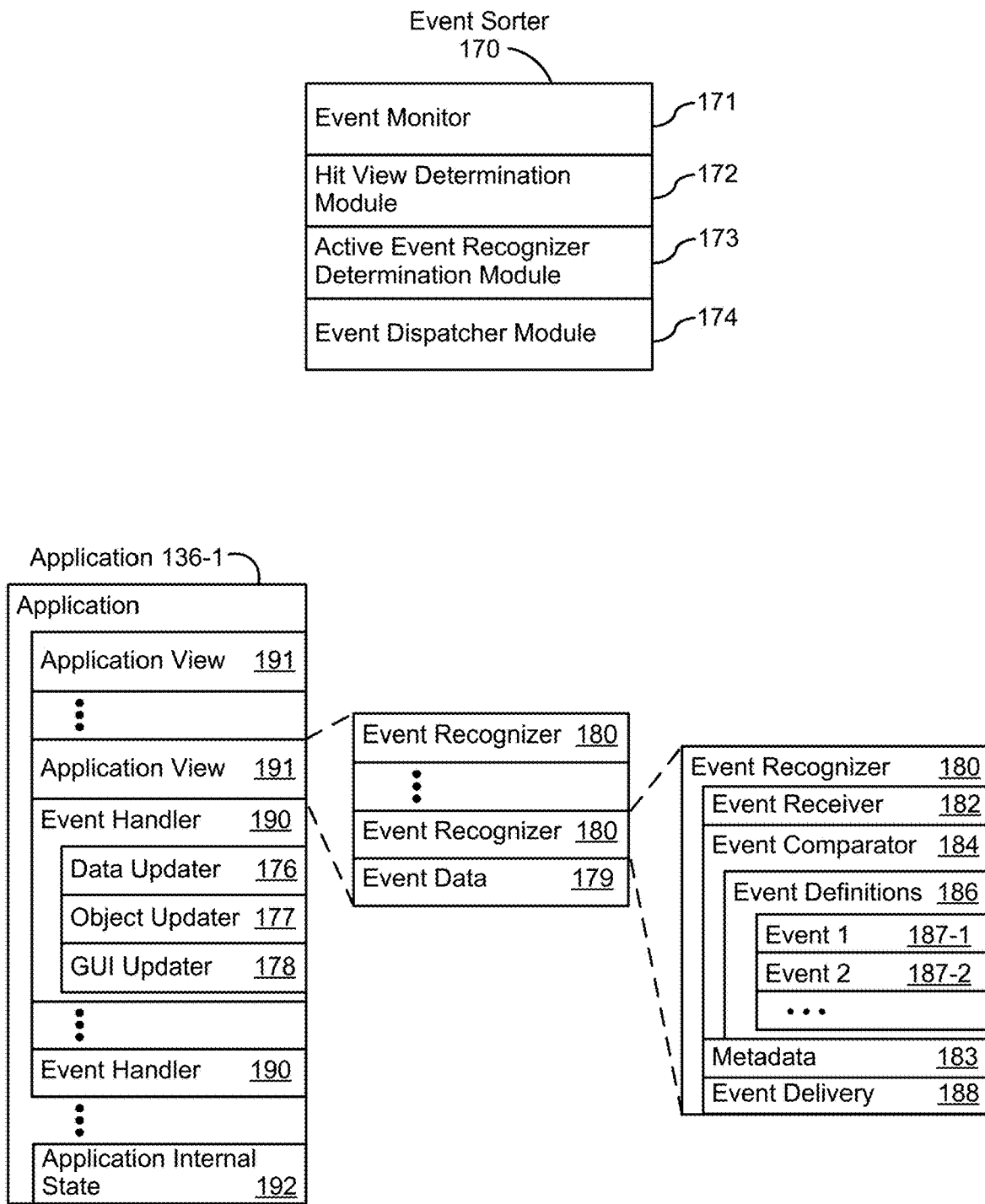
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripheral interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch screen display.

In some embodiments, device 100 includes the touch screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 163 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

FIG. 4 is a block diagram of an exemplary electronic stylus 203 in accordance with some embodiments. Electronic stylus 203 is sometimes simply called a stylus. Stylus 203 includes memory 402 (which optionally includes one or more computer readable storage mediums), memory controller 422, one or more processing units (CPUs) 420, peripherals interface 418, RF circuitry 408, input/output (I/O) subsystem 406, and other input or control devices 416. Stylus 203 optionally includes external port 424 and one or more optical sensors 464. Stylus 203 optionally includes one or more intensity sensors 465 for detecting intensities of contacts of stylus 203 on device 100 (e.g., when stylus 203 is used with a touch-sensitive surface such as touch-sensitive display system 112 of device 100) or on other surfaces (e.g., a desk surface). Stylus 203 optionally includes one or more tactile output generators 463 for generating tactile outputs on stylus 203. These components optionally communicate over one or more communication buses or signal lines 403.

In some embodiments, the term "tactile output," discussed above, refers to physical displacement of an accessory (e.g., stylus 203) of a device (e.g., device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of stylus 203) is, optionally, interpreted by the user as a "click" of a physical actuator button. In some cases, a user will feel a tactile sensation such as a "click" even when there is no movement of a physical actuator button associated with the stylus that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the device or a component thereof that will generate the described sensory perception for a typical (or average) user.

It should be appreciated that stylus 203 is only one example of an electronic stylus, and that stylus 203 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Memory 402 optionally includes high-speed random access memory and optionally also includes non-volatile memory, such as one or more flash memory devices, or other non-volatile solid-state memory devices. Access to memory 402 by other components of stylus 203, such as CPU(s) 420 and the peripherals interface 418, is, optionally, controlled by memory controller 422.

Peripherals interface 418 can be used to couple input and output peripherals of the stylus to CPU(s) 420 and memory 402. The one or more processors 420 run or execute various software programs and/or sets of instructions stored in memory 402 to perform various functions for stylus 203 and to process data.

In some embodiments, peripherals interface 418, CPU(s) 420, and memory controller 422 are, optionally, implemented on a single chip, such as chip 404. In some other embodiments, they are, optionally, implemented on separate chips.

RF (radio frequency) circuitry 408 receives and sends RF signals, also called electromagnetic signals. RF circuitry 408 converts electrical signals to/from electromagnetic signals and communicates with device 100 or 300, communications networks, and/or other communications devices via the electromagnetic signals. RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 408 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

I/O subsystem 406 couples input/output peripherals on stylus 203, such as other input or control devices 416, with peripherals interface 418. I/O subsystem 406 optionally includes optical sensor controller 458, intensity sensor controller 459, haptic feedback controller 461, and one or more input controllers 460 for other input or control devices. The one or more input controllers 460 receive/send electrical signals from/to other input or control devices 416. The other input or control devices 416 optionally include physical buttons (e.g., push buttons, rocker buttons, etc.), dials, slider switches, click wheels, and so forth. In some alternate embodiments, input controller(s) 460 are, optionally, coupled with any (or none) of the following: an infrared port and/or a USB port.

Stylus 203 also includes power system 462 for powering the various components. Power system 462 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

Stylus 203 optionally also includes one or more optical sensors 464. FIG. 4 shows an optical sensor coupled with optical sensor controller 458 in I/O subsystem 406. Optical sensor(s) 464 optionally include charge-coupled device (CCD) or complementary metal-oxide semiconductor (CMOS) phototransistors. Optical sensor(s) 464 receive light from the environment, projected through one or more lens, and converts the light to data representing an image.

Stylus 203 optionally also includes one or more contact intensity sensors 465. FIG. 4 shows a contact intensity sensor coupled with intensity sensor controller 459 in I/O subsystem 406. Contact intensity sensor(s) 465 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a surface). Contact intensity sensor(s) 465 receive contact intensity information (e.g., pressure information or a proxy for pressure information) from the environment. In some embodiments, at least one contact intensity sensor is collocated with, or proximate to, a tip of stylus 203.

Stylus 203 optionally also includes one or more proximity sensors 466. FIG. 4 shows proximity sensor 466 coupled with peripherals interface 418. Alternately, proximity sensor 466 is coupled with input controller 460 in I/O subsystem 406. In some embodiments, the proximity sensor determines proximity of stylus 203 to an electronic device (e.g., device 100).

Stylus 203 optionally also includes one or more tactile output generators 463. FIG. 4 shows a tactile output generator coupled with haptic feedback controller 461 in I/O subsystem 406. Tactile output generator(s) 463 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 463 receive tactile feedback generation instructions from haptic feedback module 433 and generates tactile outputs on stylus 203 that are capable of being sensed by a user of stylus 203. In some embodiments, at least one tactile output generator is collocated with, or proximate to, a length (e.g., a body or a housing) of stylus 203 and, optionally, generates a tactile output by moving stylus 203 vertically (e.g., in a direction parallel to the length of stylus 203) or laterally (e.g., in a direction normal to the length of stylus 203).

Stylus 203 optionally also includes one or more accelerometers 467, gyroscopes 468, and/or magnetometers 470 (e.g., as part of an inertial measurement unit (IMU)) for obtaining information concerning the location and positional state of stylus 203. FIG. 4 shows sensors 467, 469, and 470 coupled with peripherals interface 418. Alternately, sensors 467, 469, and 470 are, optionally, coupled with an input controller 460 in I/O subsystem 406. Stylus 203 optionally includes a GPS (or GLONASS or other global navigation system) receiver (not shown) for obtaining information concerning the location of stylus 203.

In some embodiments, the software components stored in memory 402 include operating system 426, communication module (or set of instructions) 428, contact/motion module (or set of instructions) 430, position module (or set of instructions) 431, and Global Positioning System (GPS) module (or set of instructions) 435. Furthermore, in some embodiments, memory 402 stores device/global internal state 457, as shown in FIG. 4. Device/global internal state 457 includes one or more of: sensor state, including information obtained from the stylus's various sensors and other input or control devices 416; positional state, including information regarding the stylus's position (e.g., position, orientation, tilt, roll and/or distance, as shown in FIGS. 5A and 5B) relative to a device (e.g., device 100); and location information concerning the stylus's location (e.g., determined by GPS module 435).

Operating system 426 (e.g., iOS, Darwin, RTXC, LINUX, UNIX, OS X, WINDOWS, or an embedded operating system such as VxWorks) includes various software components and/or drivers for controlling and managing general system tasks (e.g., memory management, power management, etc.) and facilitates communication between various hardware and software components.

Communication module 428 optionally facilitates communication with other devices over one or more external ports 424 and also includes various software components for handling data received by RF circuitry 408 and/or external port 424. External port 424 (e.g., Universal Serial Bus (USB), FIREWIRE, etc.) is adapted for coupling directly to other devices or indirectly over a network (e.g., the Internet, wireless LAN, etc.). In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 430 optionally detects contact with stylus 203 and other touch-sensitive devices of stylus 203 (e.g., buttons or other touch-sensitive components of stylus 203). Contact/motion module 430 includes software components for performing various operations related to detection of contact (e.g., detection of a tip of the stylus with a touch-sensitive display, such as touch screen 112 of device 100, or with another surface, such as a desk surface), such as determining if contact has occurred (e.g., detecting a touch-down event), determining an intensity of the contact (e.g., the force or pressure of the contact or a substitute for the force or pressure of the contact), determining if there is movement of the contact and tracking the movement (e.g., across touch screen 112 of device 100), and determining if the contact has ceased (e.g., detecting a lift-off event or a break in contact). In some embodiments, contact/motion module 430 receives contact data from I/O subsystem 406. Determining movement of the point of contact, which is represented by a series of contact data, optionally includes determining speed (magnitude), velocity (magnitude and direction), and/or an acceleration (a change in magnitude and/or direction) of the point of contact. As noted above, in some embodiments, one or more of these operations related to detection of contact are performed by the device using contact/motion module 130 (in addition to or in place of the stylus using contact/motion module 430).

Contact/motion module 430 optionally detects a gesture input by stylus 203. Different gestures with stylus 203 have different contact patterns (e.g., different motions, timings, and/or intensities of detected contacts). Thus, a gesture is, optionally, detected by detecting a particular contact pattern. For example, detecting a single tap gesture includes detecting a touch-down event followed by detecting a lift-off event at the same position (or substantially the same position) as the touch-down event (e.g., at the position of an icon). As another example, detecting a swipe gesture includes detecting a touch-down event followed by detecting one or more stylus-dragging events, and subsequently followed by detecting a lift-off event. As noted above, in some embodiments, gesture detection is performed by the device using contact/motion module 130 (in addition to or in place of the stylus using contact/motion module 430).

Position module 431, in conjunction with accelerometers 467, gyroscopes 468, and/or magnetometers 469, optionally detects positional information concerning the stylus, such as the stylus's attitude (roll, pitch, and/or yaw) in a particular frame of reference. Position module 431, in conjunction with accelerometers 467, gyroscopes 468, and/or magnetometers 469, optionally detects stylus movement gestures, such as flicks, taps, and rolls of the stylus. Position module 431 includes software components for performing various operations related to detecting the position of the stylus and detecting changes to the position of the stylus in a particular frame of reference. In some embodiments, position module 431 detects the positional state of the stylus relative to the device and detects changes to the positional state of the stylus relative to the device. As noted above, in some embodiments, device 100 or 300 determines the positional state of the stylus relative to the device and changes to the positional state of the stylus using position module 131 (in addition to or in place of the stylus using position module 431).

Haptic feedback module 433 includes various software components for generating instructions used by tactile output generator(s) 463 to produce tactile outputs at one or more locations on stylus 203 in response to user interactions with stylus 203.

GPS module 435 determines the location of the stylus and provides this information for use in various applications (e.g., to applications that provide location-based services such as an application to find missing devices and/or accessories).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 402 optionally stores a subset of the modules and data structures identified above. Furthermore, memory 402 optionally stores additional modules and data structures not described above.

FIGS. 5A-5B illustrate a positional state of stylus 203 relative to a touch-sensitive surface (e.g., touch screen 112 of device 100) in accordance with some embodiments. In some embodiments, the positional state of stylus 203 corresponds to (or indicates): a position of a projection of a tip (or other representative portion) of the stylus on the touch-sensitive surface (e.g., (x,y) position 504, FIG. 5A), an orientation of the stylus relative to the touch-sensitive surface (e.g., orientation 506, FIG. 5A), a tilt of the stylus relative to the touch-sensitive surface (e.g., tilt 512, FIG. 5B), and/or a distance of the stylus relative to the touch-sensitive surface (e.g., distance 514, FIG. 5B). In some embodiments, the positional state of stylus 203 corresponds to (or indicates) a pitch, yaw, and/or roll of the stylus (e.g., an attitude of the stylus relative to a particular frame of reference, such as a touch-sensitive surface (e.g., touch screen 112) or the ground). In some embodiments, the positional state includes a set of positional parameters (e.g., one or more positional parameters). In some embodiments, the positional state is detected in accordance with one or more measurements from stylus 203 that are sent to an electronic device (e.g., device 100). For example, the stylus measures the tilt (e.g., tilt 512, FIG. 5B) and/or the orientation (e.g., orientation 506, FIG. 5A) of the stylus and sends the measurement to device 100. In some embodiments, the positional state is detected in accordance with raw output, from one or more electrodes in the stylus, that is sensed by a touch-sensitive surface (e.g., touch screen 112 of device 100) instead of, or in combination with positional state detected in accordance with one or more measurements from stylus 203. For example, the touch-sensitive surface receives raw output from one or more electrodes in the stylus and calculates the tilt and/or the orientation of the stylus based on the raw output (optionally, in conjunction with positional state information provided by the stylus based on sensor measurements generated by the stylus).

FIG. 5A illustrates stylus 203 relative to a touch-sensitive surface (e.g., touch screen 112 of device 100) from a viewpoint directly above the touch-sensitive surface, in accordance with some embodiments. In FIG. 5A, z-axis 594 points out of the page (i.e., in a direction normal to a plane of touch screen 112), x-axis 590 is parallel to a first edge (e.g., a length) of touch screen 112, y-axis 592 is parallel to a second edge (e.g., a width) of touch screen 112, and y-axis 592 is perpendicular to x-axis 590.

FIG. 5A illustrates the tip of stylus 203 at (x,y) position 504. In some embodiments, the tip of stylus 203 is a terminus of the stylus configured for determining proximity of the stylus to a touch-sensitive surface (e.g., touch screen 112). In some embodiments, the projection of the tip of the stylus on the touch-sensitive surface is an orthogonal projection. In other words, the projection of the tip of the stylus on the touch-sensitive surface is a point at the end of a line from the stylus tip to the touch-sensitive surface that is normal to a surface of the touch-sensitive surface (e.g., (x,y) position 504 at which the tip of the stylus would touch the touch-sensitive surface if the stylus were moved directly along a path normal to the touch-sensitive surface). In some embodiments, the (x,y) position at the lower left corner of touch screen 112 is position (0,0) (e.g., (0,0) position 502) and other (x,y) positions on touch screen 112 are relative to the lower left corner of touch screen 112. Alternatively, in some embodiments, the (0,0) position is located at another position of touch screen 112 (e.g., in the center of touch screen 112) and other (x,y) positions are relative to the (0,0) position of touch screen 112.

Further, FIG. 5A illustrates stylus 203 with orientation 506. In some embodiments, orientation 506 is an orientation of a projection of stylus 203 onto touch screen 112 (e.g., an orthogonal projection of a length of stylus 203 or a line corresponding to the line between the projection of two different points of stylus 203 onto touch screen 112). In some embodiments, orientation 506 is relative to at least one axis in a plane parallel to touch screen 112. In some embodiments, orientation 506 is relative to a single axis in a plane parallel to touch screen 112 (e.g., axis 508, with a clockwise rotation angle from axis 508 ranging from 0 degrees to 360 degrees, as shown in FIG. 5A). Alternatively, in some embodiments, orientation 506 is relative to a pair of axes in a plane parallel to touch screen 112 (e.g., x-axis 590 and y-axis 592, as shown in FIG. 5A, or a pair of axes associated with an application displayed on touch screen 112).

In some embodiments, an indication (e.g., indication 516) is displayed on a touch-sensitive display (e.g., touch screen 112 of device 100). In some embodiments, indication 516 shows where the stylus will touch (or mark) the touch-sensitive display before the stylus touches the touch-sensitive display. In some embodiments, indication 516 is a portion of a mark that is being drawn on the touch-sensitive display. In some embodiments, indication 516 is separate from a mark that is being drawn on the touch-sensitive display and corresponds to a virtual "pen tip" or other element that indicates where a mark will be drawn on the touch-sensitive display.

In some embodiments, indication 516 is displayed in accordance with the positional state of stylus 203. For example, in some circumstances, indication 516 is displaced from (x,y) position 504 (as shown in FIGS. 5A and 5B), and in other circumstances, indication 516 is not displaced from (x,y) position 504 (e.g., indication 516 is displayed at or near (x,y) position 504 when tilt 512 is zero degrees). In some embodiments, indication 516 is displayed, in accordance with the positional state of the stylus, with varying color, size (or radius or area), opacity, and/or other characteristics. In some embodiments, the displayed indication accounts for thickness of a glass layer on the touch-sensitive display, so as to carry through the indication "onto the pixels" of the touch-sensitive display, rather than displaying the indication "on the glass" that covers the pixels. As used herein, "indication" may also be used to refer to a position that is not visible on the touch screen when describing the exemplary user interfaces.

FIG. 5B illustrates stylus 203 relative to a touch-sensitive surface (e.g., touch screen 112 of device 100) from a side viewpoint of the touch-sensitive surface, in accordance with some embodiments. In FIG. 5B, z-axis 594 points in a direction normal to the plane of touch screen 112, x-axis 590 is parallel to a first edge (e.g., a length) of touch screen 112, y-axis 592 is parallel to a second edge (e.g., a width) of touch screen 112, and y-axis 592 is perpendicular to x-axis 590.

FIG. 5B illustrates stylus 203 with tilt 512. In some embodiments, tilt 512 is an angle relative to a normal (e.g., normal 510) to a surface of the touch-sensitive surface (also called simply the normal to the touch-sensitive surface). As shown in FIG. 5B, tilt 512 is zero when the stylus is perpendicular/normal to the touch-sensitive surface (e.g., when stylus 203 is parallel to normal 510) and the tilt increases as the stylus is tilted closer to being parallel to the touch-sensitive surface.

Further, FIG. 5B illustrates distance 514 of stylus 203 relative to the touch-sensitive surface. In some embodiments, distance 514 is the distance from the tip of stylus 203 to the touch-sensitive surface, in a direction normal to the touch-sensitive surface. For example, in FIG. 5B, distance 514 is the distance from the tip of stylus 203 to (x,y) position 504.

Although the terms, "x-axis," "y-axis," and "z-axis," are used herein to illustrate certain directions in particular figures, it will be understood that these terms do not refer to absolute directions. In other words, an "x-axis" could be any respective axis, and a "y-axis" could be a particular axis that is distinct from the x-axis. Typically, the x-axis is perpendicular to the y-axis. Similarly, a "z-axis" is distinct from the "x-axis" and the "y-axis," and is typically perpendicular to both the "x-axis" and the "y-axis."

Further, FIG. 5B illustrates roll 518, a rotation about the length (long axis) of stylus 203.

Attention is now directed towards embodiments of user interfaces ("U") that are, optionally, implemented on portable multifunction device 100.

Figure 6A:
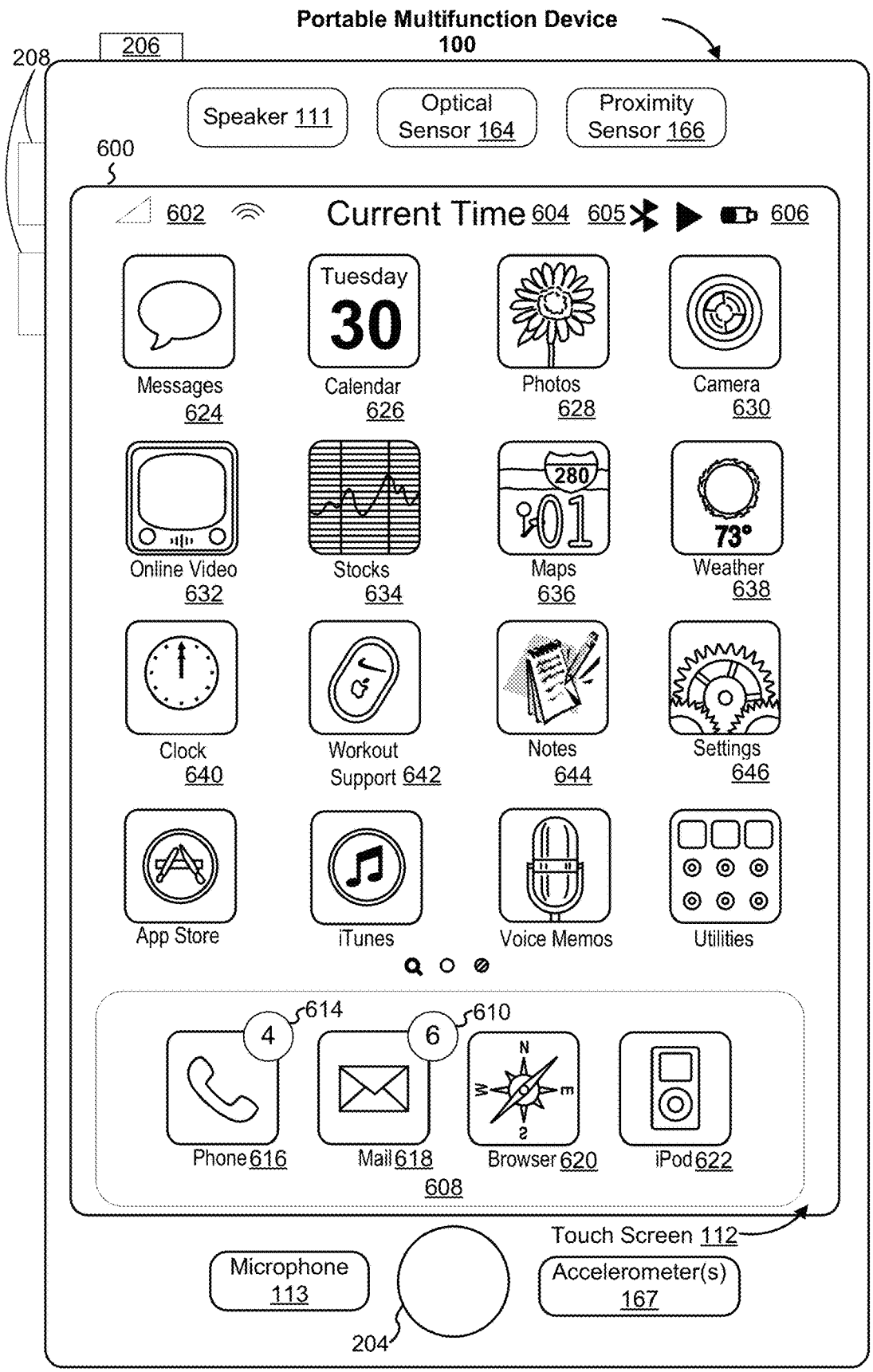
FIG. 6A illustrates an example user interface for a menu of applications on a portable multifunction device in accordance with some embodiments.

FIG. 6A illustrates an exemplary user interface for a menu of applications on portable multifunction device 100 in accordance with some embodiments. Similar user interfaces are, optionally, implemented on device 300. In some embodiments, user interface 600 includes the following elements, or a subset or superset thereof:

Signal strength indicator(s) 602 for wireless communication(s), such as cellular and Wi-Fi signals;
Time 604;
Bluetooth indicator 605;
Battery status indicator 606;
Tray 608 with icons for frequently used applications, such as:

Icon 616 for telephone module 138, labeled "Phone," which optionally includes an indicator 614 of the number of missed calls or voicemail messages;

Icon 618 for e-mail client module 140, labeled "Mail," which optionally includes an indicator 610 of the number of unread e-mails;

Icon 620 for browser module 147, labeled "Browser;" and

Icon 622 for video and music player module 152, also referred to as iPod (trademark of Apple Inc.) module 152, labeled "iPod;" and Icons for other applications, such as:

Icon 624 for IM module 141, labeled "Text;"

Icon 626 for calendar module 148, labeled "Calendar;"

Icon 628 for image management module 144, labeled "Photos;"

Icon 630 for camera module 143, labeled "Camera;"

Icon 632 for online video module 155, labeled "Online Video;"

Icon 634 for stocks widget 149-2, labeled "Stocks;"

Icon 636 for map module 154, labeled "Map;"

Icon 638 for weather widget 149-1, labeled "Weather;"

Icon 640 for alarm clock widget 169-6, labeled "Clock;"

Icon 642 for workout support module 142, labeled "Workout Support;"

Icon 644 for notes module 153, labeled "Notes;" and

Icon 646 for a settings application or module, which provides access to settings for device 100 and its various applications 136.

It should be noted that the icon labels illustrated in FIG. 6A are merely exemplary. For example, in some embodiments, icon 622 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 6B illustrates an exemplary user interface on a device (e.g., device 300, FIG. 3) with a touch-sensitive surface 651 (e.g., a tablet or touchpad 355, FIG. 3) that is separate from the display 650. Device 300 also, optionally, includes one or more contact intensity sensors (e.g., one or more of sensors 359) for detecting intensities of contacts on touch-sensitive surface 651 and/or one or more tactile output generators 357 for generating tactile outputs for a user of device 300.

FIG. 6B illustrates an exemplary user interface on a device (e.g., device 300, FIG. 3) with a touch-sensitive surface 651 (e.g., a tablet or touchpad 355, FIG. 3) that is separate from the display 650. In some embodiments, the touch-sensitive surface (e.g., 651 in FIG. 6B) has a primary-axis (e.g., 652 in FIG. 6B) that corresponds to a primary-axis (e.g., 653 in FIG. 6B) on the display (e.g., 650). In accordance with these embodiments, the device detects contacts (e.g., 660 and 662 in FIG. 6B) with the touch-sensitive surface 651 at locations that correspond to respective locations on the display (e.g., in FIG. 6B, 660 corresponds to 668 and 662 corresponds to 670). In this way, user inputs (e.g., contacts 660 and 662, and movements thereof) detected by the device on the touch-sensitive surface (e.g., 651 in FIG. 6B) are used by the device to manipulate the user interface on the display (e.g., 650 in FIG. 6B) of the multifunction device when the touch-sensitive surface is separate from the display. Some of the examples that follow will be given with reference to a device that detects inputs on a touch-sensitive surface that is separate from the display, as shown in FIG. 6B. Some of the examples that follow will be given with reference to inputs on touch screen display 112 (where the touch sensitive surface and the display are combined). It should be understood that similar methods are, optionally, used for other user interfaces described herein.

Additionally, while some of the following examples are given primarily with reference to finger inputs (e.g., finger contacts, finger tap gestures, finger press gestures, and finger swipe gestures, etc.), it should be understood that, in some embodiments, one or more of the finger inputs are replaced with input from another input device (e.g., a mouse based input or a stylus based input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 651 in FIG. 6B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or the touch screen in FIG. 6A) that enables direct interaction with user interface elements on the touch screen display, a detected contact on the touch screen acts as a "focus selector," so that when an input (e.g., a press input by the contact) is detected on the touch screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device). As used herein, a "focus selector" may be a visible "indication" or an invisible "indication" of a hovering input object (e.g., a finger or stylus).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 and/or 430 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some embodiments, a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures (e.g., FIGS. 7A-7Q) described below optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments, $IT_0$ is zero. In some embodiments, $IT_0$ is greater than zero. In some illustrations, a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and (optionally) one or more sensors to detect intensities of contacts with the touch-sensitive surface.

Figure 7A:
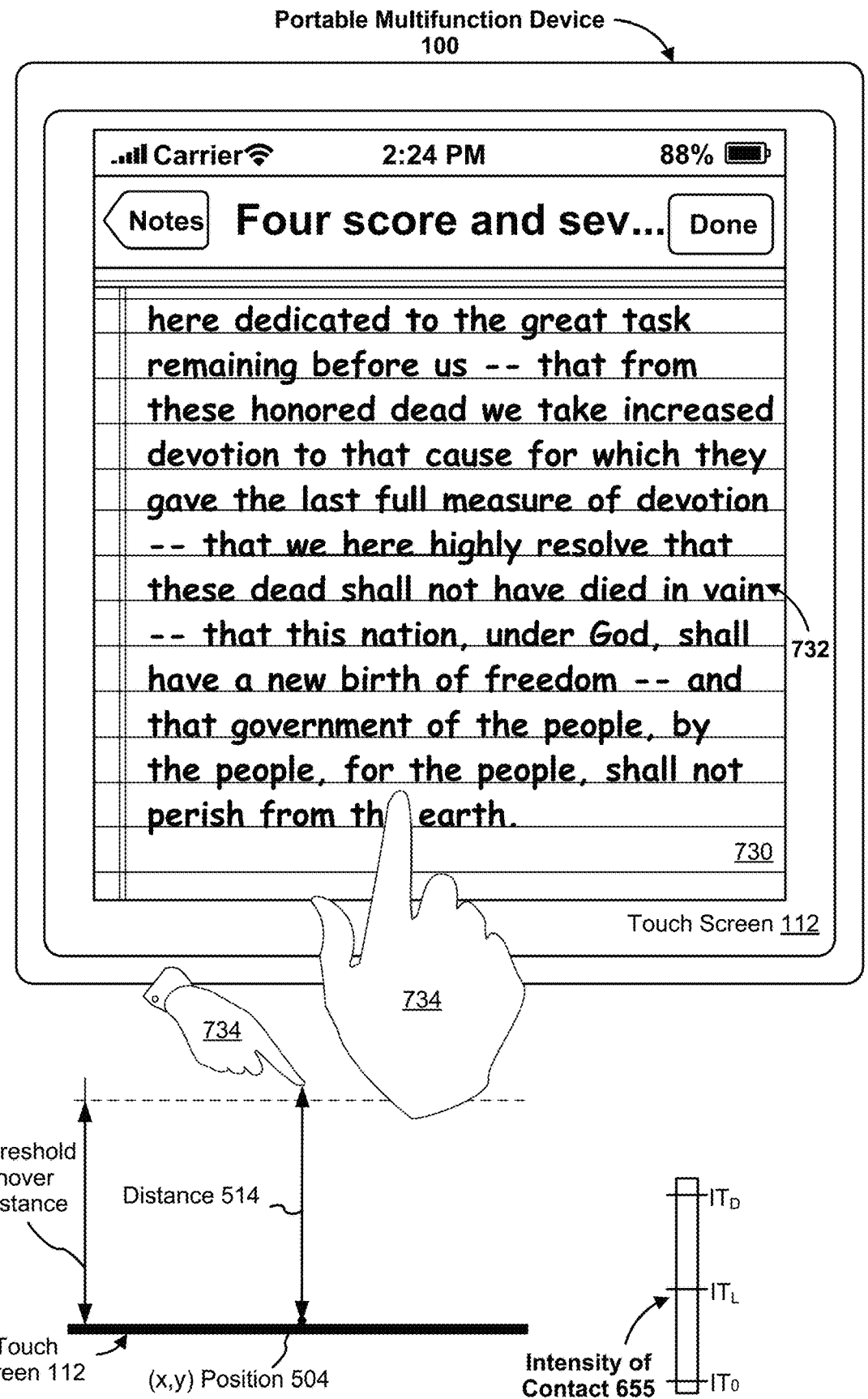
FIGS. 7A-7Q illustrate exemplary user interfaces for interacting with user interface objects through proximity-based (e.g., hover-based) and contact-based inputs (e.g., moving a cursor and selecting text) in accordance with some embodiments.
Figure 7B:
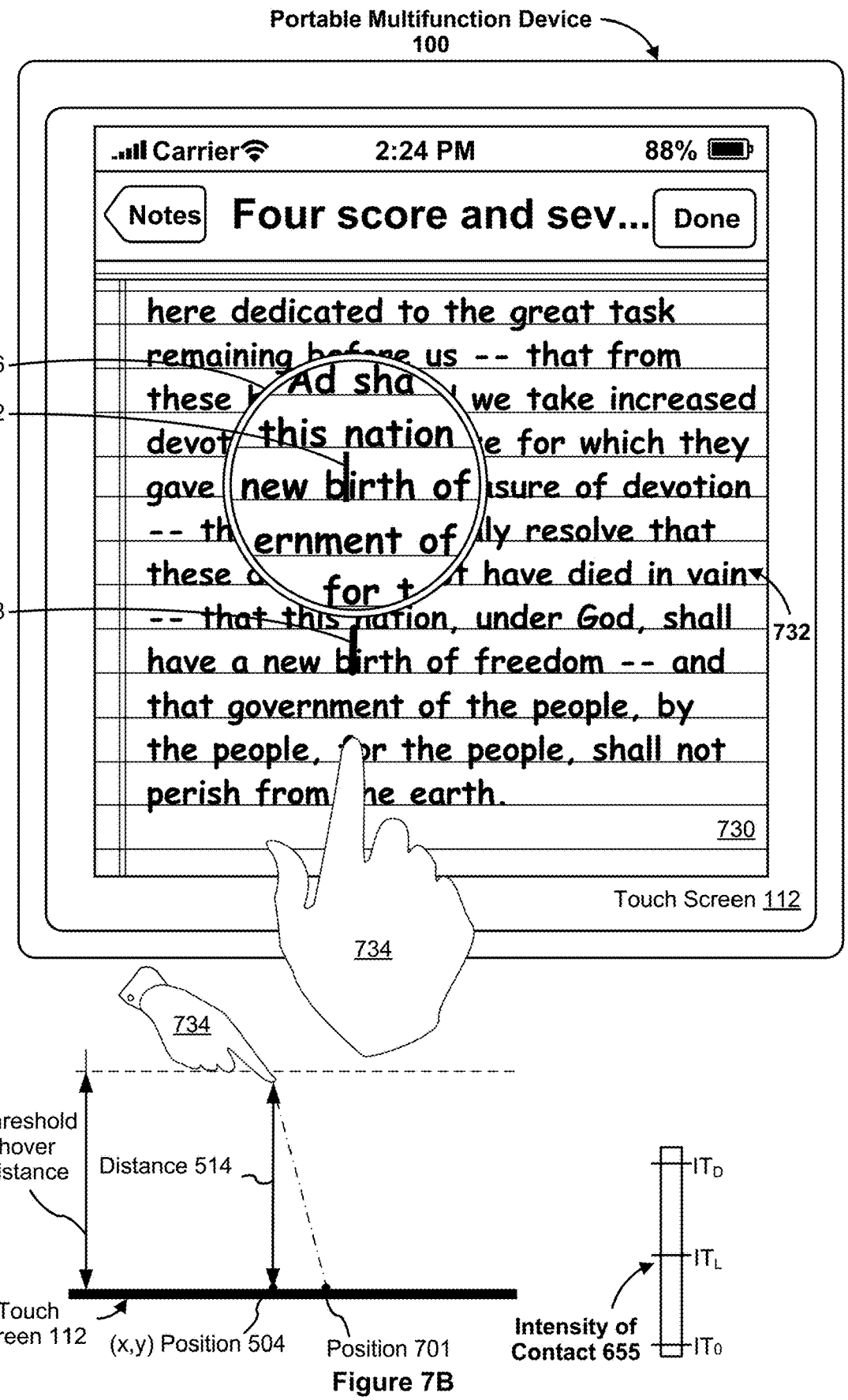
Figure 7Q:
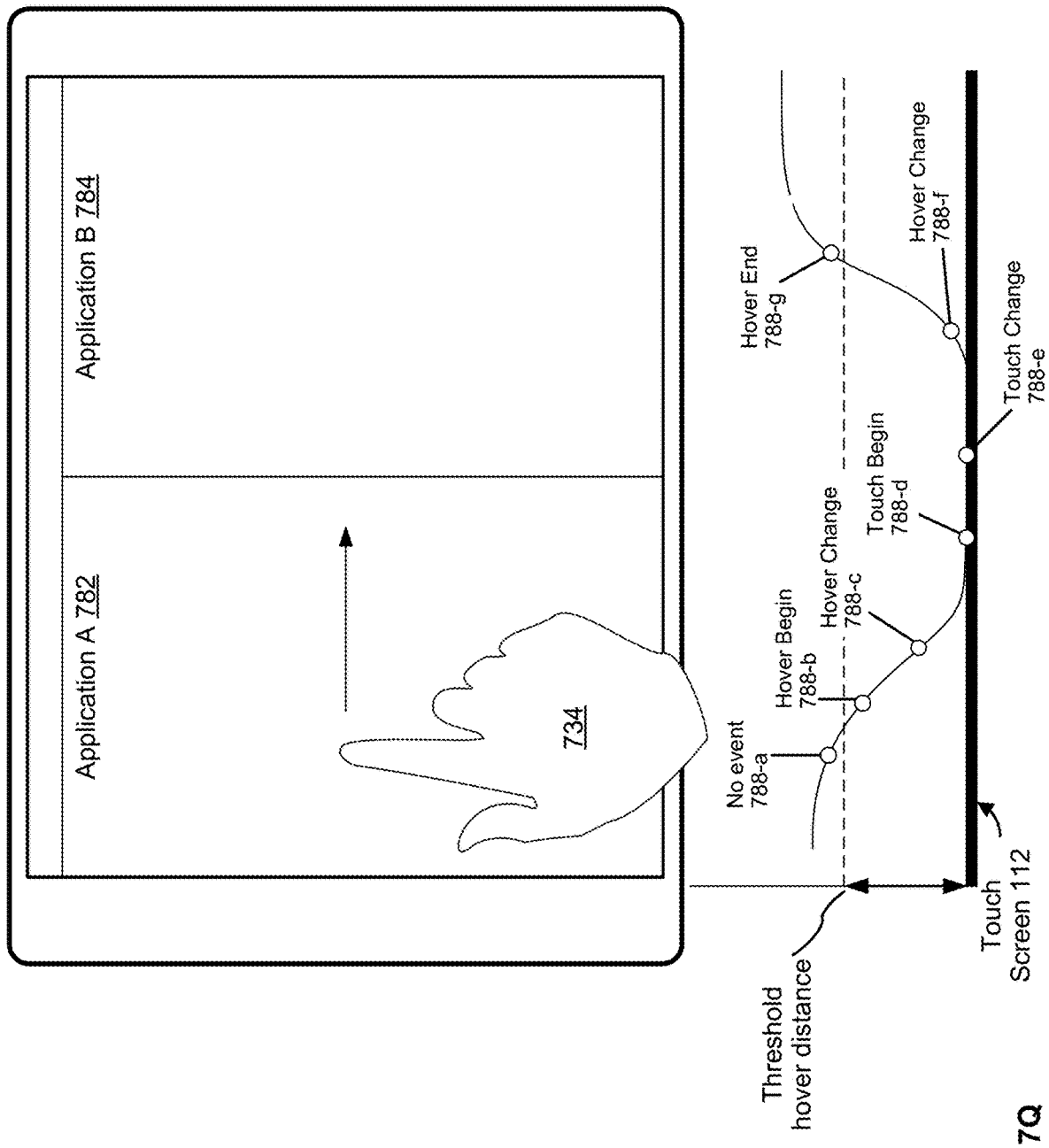

FIGS. 7A-7Q illustrate exemplary user interfaces for interacting with a user interface object through proximity-based inputs and contact-based inputs by an input object in accordance with some embodiments. The user interfaces in these figures are used to illustrate the processes described below, including the processes in FIGS. 11A-11D, FIGS. 12A-12C, and FIGS. 13A-13E.

FIGS. 7A-7K illustrate a process in which an input object (e.g., a finger or stylus) moves and positions a cursor within selectable text (e.g., editable or non-editable text) while the input object moves laterally in a hover state, and in which the input object selects text (e.g., expands text selection from the current cursor position) while the input object moves laterally in a contact state.

In FIG. 7A, a user interface (e.g., user interface 730) is displayed on touch screen 112. User interface 730 includes selectable text 732. When the input object, shown in these figures as a finger or hand 734 (but which could, alternatively, be a stylus or other object for which proximity and contact can be detected by touch screen 112), is above a threshold hover distance away from touch screen 112 (e.g., distance 514 is greater than the threshold hover distance), no indicator corresponding to the input object is displayed in user interface 730. Intensity 655 of contact at this point is zero, since the input object is not yet in contact with touch screen 112.

FIG. 7B illustrates that, when the input object (e.g., finger or hand 734) is within the threshold hover distance from touch screen 112, an indicator (e.g., cursor 738) is displayed within selectable text 732 at position 701 on touch screen 112 (e.g., at a location that corresponds to (x,y) position 504 on touch screen 112). The indicator being displayed within selectable text 732 is the result of a first hover event (e.g., a "hover begin" event, as described below) being provided to the application. In some embodiments, the first hover event is a normalized touch-event having a first hover phase value. Position 701 may be the same or offset from the lateral position, (x,y) position 504, of finger 734, and the amount of offset is optionally determined based on the hover distance (e.g., represented by distance 514) and/or a positional state (e.g., tilt) of finger 734. In some embodiments, in addition to cursor 738, device 100 also displays a magnifying loupe (e.g., magnifying loupe 736) over selectable text 732. Magnifying loupe 736 is displayed above cursor 738 in user interface 730, and moves with cursor 738 in user interface 730. Within magnifying loupe 736, magnified version of a portion of selectable text 732 is displayed, and a copy 742 of cursor 738 is also displayed at a position within the magnified text according to the position of cursor 738 within selectable text 732.

FIG. 7C illustrates that, as finger 734 moves laterally, relative to the position shown in FIG. 7B, while remaining within the hover range, cursor 738 moves within selectable text 732 in accordance with the lateral movement of finger 734. The movement of cursor 738 is the result of a second hover event (e.g., a "hover change" input event, that is, a hover-based touch event having a "hover change" phase, as described below) being provided to the application. In some embodiments, the second hover event is a normalized touch-event having a second hover phase value. In embodiments that include magnifying loupe 736, magnifying loupe 736 moves with cursor 738 and shows an updated portion of text 732 and updated position of cursor 738. FIG. 7C also illustrates that, the hover distance does not have to be maintained at a constant value during the movement of finger 734 in order to move cursor 738 within selectable text 732. However, in some embodiments, the "hover change" input event indicates a change in proximity (e.g., hover distance) as well as position of the finger 734.

FIG. 7D illustrates that, as finger 734 moves laterally, relative to the position shown in FIG. 7B, to another position on touch screen 112, cursor 738 is moved to a new position within selectable text 732. Touch-down of finger 734 is detected on touch screen 112 (e.g., intensity 655 of contact between finger 734 and touch screen 112 is above the contact detection threshold $IT_0$). Information about the touch-down is provided to the application as a first contact event. In some embodiments, the first contact event is a normalized touch-event having a first contact phase value (e.g., a touch begin phase value). Before finger 734 moves laterally while in contact with touch screen 112, cursor 738 is displayed at its current location within selectable text 732. In embodiments that include magnifying loupe 736, magnifying loupe 736 is displayed above cursor 738. A magnified version of the text surrounding copy 742 of cursor 738 is displayed within magnifying loupe 736, and position of cursor 738 within the selectable text 732 is represented by copy 742 of cursor 738 within the magnifying loupe.

FIG. 7E illustrates that, after finger 734 makes contact with touch screen 112, finger 734 moves laterally while remaining in contact with touch screen 112. The movement of the contact causes cursor 738 to move within selectable text 732, and movement of cursor 738 from its previous location (e.g., the cursor location at the time of the touch-down of finger 734 on touch screen 112) to its current location causes a portion of text between the cursor's previous location and current location to be selected (e.g., as indicated by selection 740). The movement of cursor 738 is the result of a second contact event (e.g., a "touch change" input event, that is, a contact-based touch event having a "touch change" phase, as described below) being provided to the application. In some embodiments, the second contact event is a normalized touch-event having a second contact phase value.

As movement of cursor 738 continues with the movement of contact between finger 734 and touch screen 112, selection 740 is expanded or contracted in accordance with the movement of cursor 738 (e.g., provided to the application as additional "touch change" input events). As shown in FIG. 7E, selection 740 is also represented (e.g., as selection 744) within magnifying loupe 736.

FIG. 7F illustrates that, after moving the contact between finger 734 and touch screen 112 and adjusting the ending boundary of selection 740 by the moving cursor 738, lift-off of finger 734 is detected (as indicated by distance 514 being greater than zero, and intensity 655 of contact equal to zero, in FIG. 7F). In some embodiments, information about the lift-off is provided to the application as a third hover event. In some embodiments, the third hover event is a normalized touch-event having the second hover phase value (e.g., the "hover changed" phase value).

After lift-off from touch screen 112, finger 734 is hovering above touch screen 112 again. While finger 734 hovers above touch screen 112, cursor 738 detaches from selection 740, and moves within selectable text 732 with the lateral movement of finger 734 while finger 734 remains within the hover range above touch screen 112. As shown in FIG. 7G, in some embodiments, selection 740 is maintained in text 732 after lift-off of contact between finger 734 and touch screen 112 is detected. Magnifying loupe continues to move with cursor 738, and displays a magnified version of the text surrounding copy 742 of cursor 738.

FIGS. 7H-7I illustrate that, when touch-down of finger 734 is detected again at a new location, selection 740 is canceled (selection 740 is no longer shown in FIG. 7H). Cursor 738 is displayed at the new location (e.g., position 701) that corresponds to the touch-down location (e.g., (x,y) position 504) of finger 734 on touch screen 112, as shown in FIG. 7H. In FIG. 7I, lateral movement of finger 734 across touch screen 112 is detected, and movement of cursor 738 from its previous location (e.g., location of cursor 738 at the time of the second touch-down of finger 734 in FIG. 7H) to its current location causes a portion of text between the previous location and the current location of cursor 738 to be selected (e.g., as shown by selection 746). Magnifying loupe 736 moves with cursor 738 and shows the current selection of text (e.g., represented by magnified copy 748 of selection 746).

FIG. 7J illustrates another lift-off from touch screen 112, during which time finger 734 is hovering above touch screen 112 again. While finger 734 hovers above touch screen 112, cursor 738 detaches from selection 746, and moves within selectable text 732 with the lateral movement of finger 734 while finger 734 remains within the hover range above touch screen 112. As shown in FIG. 7J, in some embodiments, selection 746 is maintained in text 732 after lift-off of contact between finger 734 and touch screen 112 is detected. Magnifying loupe continues to move with cursor 738, and displays a magnified version of the text surrounding copy 742 of cursor 738.

FIG. 7K illustrates that, when finger 734 is lifted out of the hover range (e.g., beyond the threshold hover distance above touch screen 112), magnifying loupe 736 is replaced with menu 750 (e.g., a "cut/copy/lookup" menu) and selection 746 changes appearance (e.g., replaced with selection object 752 with adjustable boundaries). Information about finger 734 being lifted out of hover range is provided to the application as a fourth hover event. In some embodiments, the fourth hover event is a normalized touch-event having a third hover phase value (e.g., a hover end phase value).

FIGS. 7L-7P illustrate an example of the same application as shown in FIG. 7A-7I, but where the application is running on a non-native device (e.g., a device with an input device separate from the display). In such embodiments, the hover-based input events and contact-based input events are simulated touch events, or are translated into simulated touch events, as described elsewhere in this document.

To that end, user interface (e.g., user interface 730) is displayed on a display 702 of an electronic device. User interface 730 is a user interface for the application shown in FIGS. 7A-7K. Display 702, however, is not a touch-sensitive display. Instead, the electronic device is coupled with a mouse 704, which controls the position and movement of a pointer 706 displayed on display 702. Thus, the application is non-native to the operating system framework for the computer system on which the application is executing in FIGS. 7L-7P. Rather than directly interpreting mouse events, the application receives simulated touch events that are translated from mouse events.

Display 702 also displays a user interface for a second application 708 that is distinct from the user interface 730 for the application (e.g., the application and the second application are distinct applications).

FIG. 7L illustrates a user input 710 that moves mouse 704. In response to the movement of mouse 704, as shown in FIG. 7M, pointer 706 moves over the user interface 730 for the application. When pointer 706 is over user interface 730 for the application, with no mouse buttons actuated, the device delivers simulated hover events to the application. These hover events have analogous phases and resulting user interface functionality as discussed above with reference to FIGS. 7A-7K. For example, in response to a hover begin event, as shown in FIG. 7M (e.g., when pointer 706 initially enters user interface 730), pointer 706 is replaced by cursor 738, which is analogous to cursor 738 being placed in response to the hover events described with reference to FIGS. 7A-7K. However, because display 702 may be larger than a touch screen on a portable multifunction device, in some embodiments, the loupe 736 (FIG. 7B) is not displayed.

FIG. 7N illustrates a user input 714 that actuates a predefined mouse button 716, sometimes herein called the left mouse button 716 (e.g., user input 714 is a left mouse click-and-hold). Note that, in some circumstances, rather than a mouse, the input device is a trackpad or other touch-sensitive surface that provides indirect manipulation of the pointer/cursor. For example, in some circumstances, instead of user input 714, a user input presses down on a trackpad (e.g., depresses a depressible trackpad or has an intensity above a predefined threshold corresponding to a "click"). In response to the left mouse click-and-hold 714, the device initially delivers a simulated contact touch-event (e.g., a touch begin input event, that is, a contact-based touch event having a "touch begin" phase) to the application. The touch begin input event is handled by the application in the same manner as the physical contact would be if the application were running on a touch screen device (e.g., as shown in FIG. 7D). That is, the device begins highlighting selected text. For example, an appearance of the cursor 738 at the initial location when the left mouse click-and-hold 714 was received is changed to indicate a start of text selection (e.g., by showing the concentric circles at the top of the cursor 738).

As shown in FIGS. 7N-7O, the application selects texts in response to movement 718 of the mouse 704 as long as the simulated contact is active (e.g., as long as the left mouse button 716 is held down). Note that movement 718 of the mouse 704 while the left mouse button 716 is actuated by user input 714 results in "touch change" input events being delivered to the appropriate view (e.g., the view corresponding to the location of the cursor 738 when the left mouse click-and-hold began).

FIG. 7P illustrates that the user has released the left mouse click-and-hold 714 (shown in FIGS. 7N-7O). In response, the device begins providing hover-based input events and resumes displaying the pointer 706. For example, an initial event after release of the left mouse click-and-hold 714 is a hover changed event.

Note that, in some embodiments, non-native applications need not be able to interpret hover-based touch events. In some embodiments, a host/event translator 808 (FIG. 8) provides the hover-based touch events, as described above, to all of the applications that it is servicing (e.g., providing simulated events to). Applications that were not developed to handle hover-based touch events may simply ignore them.

FIG. 7Q illustrates provision of touch input events as a finger 734 moves from one view (e.g., a user interface 782 for an application A) to a second, different view (e.g., a user interface 784 for an application B).

In some embodiments, when finger 734 is at position 788-a, with a location not in contact with the touch screen 112 and not within the threshold hover distance (e.g., not proximate to the touch screen 112), the device does not provide a touch event to any views.

In some embodiments, when the device initially detects finger 734's presence within the threshold hover distance at position 788-b, the device provides a first touch input event having a hover phase value indicating a user input proximate to but not in contact with the touch screen 112 (e.g., a "hover begin" phase value indicating a beginning of an input proximate to but not in contact with the touch screen 112). In some embodiments, the first input event is provided to the view (e.g., application user interface) corresponding to position 788-b (e.g., hover events are sent to view(s) based on a current position of the user input, which in this example would be view(s) of Application A 782). Note that, in some embodiments, hover-based touch events are delivered to whichever view(s) the cursor/finger is over, while (as described further below) contact-based touch events are sent to the view(s) corresponding to the "touch begin" location (e.g., the location where the contact initially occurred) even if the cursor/finger moves over a different view.

In some embodiments, when the device detects a change in finger 734's position (e.g., proximity or location, e.g., from position 788-b to position 788-c) while finger 734 is within the threshold hover distance, the device provides a second touch input event having a hover phase value indicating a user input proximate to but not in contact with the touch screen 112 (e.g., a "hover change" phase value indicating an update to proximity or location of a previous hover touch event). In some embodiments, the second input event is provided to the view(s) (e.g., application user interface) corresponding to position 788-c.

In some embodiments, when the device detects contact of finger 734 with the touch screen 112 at position 788-d, the device provides a third touch input event having a contact phase value indicating a user input in contact with the touch screen 112 (e.g., a "touch begin" phase value). In some embodiments, the third input event is provided to the view(s) (e.g., application user interface) corresponding to position 788-d (e.g., a "touch begin" input event is provided to the view(s) corresponding to the initial location of the contact).

In some embodiments, when the device detects movement of the contact of finger 734 with the touch screen 112 to position 788-e, the device provides a fourth touch input event having a contact phase value indicating a user input in contact with the touch screen 112 (e.g., a "touch change" phase value indicating an update to the location of a previous contact touch event). In some embodiments, the fourth touch input event is provided to the view(s) (e.g., application user interface) corresponding to position 788-d rather than position 788-e (e.g., "touch change" input events are provided to the view(s) corresponding to the location of the initial contact, e.g., the "touch begin" event).

In some embodiments, when the device detects lift off of the contact of finger 734 with the touch screen 112 while the position 788-f of finger 734 is within the threshold hover distance, the device provides a fifth touch input event. In some embodiments, the fifth touch input event has a "touch end" phase value, and, optionally, the fifth touch input event is provided to the same view(s) as the previous contact-based touch event. In some other embodiments, the fifth touch input has a "hover change" phase value, and, optionally, the fifth touch input event is provided to the view(s) (e.g., application user interface) corresponding to position 788-f (e.g., as with other hover events, the fifth touch input event is provided to the view(s) corresponding to the location of the hover event). In some embodiments, the device provides two touch input events in accordance with the device detecting liftoff of the contact of finger 734 with the touch screen while the position 788-f of finger 734 is within the threshold hover distance: A) a touch input event with a "touch end" phase value, which is provided to the same view(s) as the previous contact-based touch event, which in this example are view(s) of the user interface for Application A 782; and B) another touch input event with at "hover change" phase value that is provided to the view(s) (e.g., application user interface) corresponding to position 788-f, which in this example are view(s) of the user interface for Application B 784.

In some embodiments, when the device initially detects that finger 734 is no longer within the threshold hover distance at position 788-g, the device provides a sixth touch input event having a hover phase value indicating an end to the hover input (e.g., a "hover end" phase value). In some embodiments, the sixth input event is provided to the view (e.g., application user interface) corresponding to position 788-g (e.g., hover events are sent to view(s) based on a current position of the user input). In some embodiments, "hover end" input events (e.g., hover-based touch events having a "hover end" phase value) are sent to the view(s) that the immediately preceding event was sent to (e.g., to inform those view(s) that the user input has ended).

FIG. 8 is a diagram of an input/output processing stack 800 for an exemplary device (e.g., device 300, FIG. 3) with a display and one or more input device(s) 802 separate from the display, in accordance with some embodiments. It should be understood that divisions between layers of the input/output processing stack are generally arbitrary and are presented solely for the purposes of explanation.

The input/output processing stack 800 allows some applications to execute on devices for which the applications are non-native. In particular, input/output processing stack 800 allows an application 812 that is native to a touch screen operating system framework to execute on an operating system framework that relies on or makes use of input events from peripheral input devices that are not touch screens.

To that end, one or more input device(s) 802 are provided at the base layer of the input/output processing stack 800. Input devices 802 are separate from the display (e.g., not a touch screen). In some embodiments, the input device(s) 802 include one or more of a mouse, a scroll wheel (e.g., a component of a mouse), a keyboard, and/or a touch-sensitive surface separate from the display (e.g., a separate touchpad).

A driver or a set of drivers receive and process input data 801 from the input devices 802. An operating system 804, which communicates with the drivers, processes raw input data received from the drivers. In some embodiments, the drivers can be considered part of the operating system 804.

A first set of application programming interfaces (APIs) 806 (e.g., associated with the operating system) communicates with the operating system 804. In some embodiments, the first set of APIs 806 are also considered part of the operating system 804. The first set of APIs 806 includes a set of APIs designed for use by applications developed to run on the device. For example, the first set of APIs 806 include APIs for providing input events 805 from input devices 802 to applications running on the device (e.g., word processing applications, web browsers).

Input/output processing stack 800 includes host/event translator 808. In some embodiments, host/event translator 808 is an application running at the same layer of the input/output stack 800 as other native applications which are available to the user (e.g., word processing applications, web browsers). Unlike most other applications that interact with the first set of APIs 806, however, host event translator 808 acts as a service that bridges the gap between the operating system 804 and applications 812 that are not native to the operating system 804 (e.g., which have been developed for a different operating system (e.g., with different input devices, such as a touch screen)). To that end, host/event translator receives the input events 805 provided by first set of APIs 806 from the input devices 802, and in some embodiments, translates the input events into simulated touch events 809, which the application 812 is capable of interpreting. A second set of APIs 810 makes the simulated touch events 809 available to the application 812 (e.g., the second set of APIs 810 include APIs analogous to those that the application 812 expects to have available in its native framework).

FIGS. 9A-9B illustrate exemplary data structures for providing touch input events, including hover-based and contact-based input events, to an application, in accordance with some embodiments.

FIG. 9A illustrates an exemplary data structure for a "touch event" 902 (e.g., an event having a contact or hover phase), in accordance with some embodiments. FIG. 9B illustrates an exemplary data structure for a "scroll event," in accordance with some embodiments. In some circumstances, the touch-based input events 809 are generated from user inputs that are not received from a touch screen (e.g., the touch-based input events are simulated touch-based input events). More generally, however, the touch-based input events 809 are suitable for use in both a native operating system framework (e.g., on a device with a touch screen and an operating system designed to run on a device with a touch screen) as well as a non-native operating system framework (e.g., on a device with peripheral input devices separate from the display). In the latter case, in some embodiments, the touch-based input events 809 are provided by a host/event translator (e.g., host/event translator 808, FIG. 8).

To that end, touch event 902 is an exemplary data structure for a touch-based input event 809 that includes touches (e.g., the term "touch" as used herein includes contacts with a touch-sensitive display as well as inputs proximate to but not in contact with the touch-sensitive display).

The touch event 902 includes a touch identifier 904. The value of the touch identifier 904 is shared (e.g., the same) for all input events that are part of the same user input (e.g., gesture), as determined by the operating system (e.g., operating system 804, FIG. 8).

In some embodiments, the touch event 902 includes a list of one or more positions 906 of one or more touches on a touch-sensitive surface. In some embodiments, the touches are simulated touches and the touch-sensitive surface is a virtual touch-sensitive surface (e.g., the touch-sensitive surface does not exist physically, but, although the display is not a touch screen, the device interprets user input events from peripherals separate from the display as touch inputs on the display). In some embodiments, each touch (simulated or not) has a corresponding position 906 in a list of positions. In some embodiments, the positions 906 include two-dimensional (e.g., (x,y)) positions corresponding to coordinates on the touch-sensitive surface. In some embodiments, the positions 906 include three-dimensional (e.g., (x,y,z)) coordinates, where a third (e.g., "z") coordinate represents a distance relative to (e.g., above, or, if zero or other default value, in contact with) the touch-sensitive surface (e.g., used for hover phases).

The touch event 902 includes a list of phase values 908 of the one or more touches on the touch-sensitive surface. In some embodiments, each touch (simulated or not) has a corresponding phase value 908 in the list of phase values.

Each phase value 908 indicates a particular phase of the corresponding touch input, sometimes called the current phase of the touch input. The phase field of touch event 902 can take on various predefined values, such as: a "touch begin" phase value which indicates that the event being defined is an initial contact with a touch-sensitive surface, a "touch change" phase value that indicates that the event being defined is an update of a previous touch event whose position has moved from a position defined by the previous touch event; a "touch end" phase value that indicates that the contact with the touch-sensitive surface has ended (e.g., the user has lifted his/her finger from the touch-sensitive surface), or others.

In addition, in some embodiments, the phase values include one or more hover phase values, indicating characteristics of an input proximate to but not in contact with the touch-sensitive surface.

In some embodiments, the one or more hover phase values include a "hover begin" phase that indicates that the event being defined is an initial detection of an input proximate to but not in contact with the touch-sensitive surface (e.g., indicating that a finger or a stylus has moved within a threshold distance of the touch-sensitive surface). As described below, when the touches are simulated touches, other user interface events can trigger translation (e.g., by host/event translator 808, FIG. 8) to a touch event 902 with a touch begin phase, such as a mouse pointer moving over a respective view.

In some embodiments, the one or more hover phases include a "hover change" phase indicating a change in proximity to or change in position over the touch-sensitive surface (e.g., where the positions are as discussed above).

In some embodiments, the one or more hover phases include a "hover end" phase indicating that an input is no longer detected proximate to or in contact with the touch-sensitive surface.

In addition, for simulated touch input events, touch event 902 optionally includes information from or references back to one or more native input events 801/805 (e.g., input events from peripheral input devices) from which the simulated touch input event was generated. For example, touch event 902 optionally includes child events indicating modifiers (e.g., such as a depressed keyboard button) that were active at the time the input was received.

Note that the reference numbers for the child events 801/805 in FIGS. 9A-9B are merely meant to indicate that different child events may originate from different layers of the stack. In some embodiments, different child events may originate from the same layer of the stack. In addition, the stack (e.g., input/output processing stack 800, FIG. 8) may utilize additional event structures not described with reference to FIG. 8.

The following paragraphs provide several specific examples of translated (e.g., simulated) input events from input devices separate from the display, and their resulting data structures and child events. Thus, a touch screen-based application can process the simulated touch events as if the touch events were received from a touch screen.

Left Mouse Click Translated to Simulated Touch-Contact Event

In some embodiments, actuation of a predefined button (e.g., a physical button) on a peripheral device separate from a display is translated to a touch event having a contact phase (e.g., indicating contact with the display). The touch event includes location information corresponding to the location of a mouse pointer on the display. For example, a left mouse click (e.g., on a physical mouse that is separate from a display) is translated into a touch event corresponding to a finger or stylus that is in contact with the display (despite the fact that the display is not touch-sensitive). When the left mouse click is received by the drivers in the operating system 804 (FIG. 8), the operating system generates a digitizer/pointer event 805 having (x,y) coordinates that are based on the location of the mouse pointer at the time that the left mouse click is received. Here, the term "digitizer" refers to a software analogue of a physical digitizer, which is a component of a touch screen. The digitizer/pointer event 805 includes a child event 801 that provides context information from which touch identifier 904 can be determined and a child event that includes information about which modifiers (e.g., keyboard buttons), if any, were active at the time of the left mouse click. The host/event translator translates the digitizer/pointer event 805 into a touch event having a "touch begin" phase. The touch event includes, as a child event, the digitizer event (which may itself include additional child events).

An input event that moves a displayed pointer while the predefined button is actuated is translated into a touch event having a "touch change" phase. In some embodiments, input events having "touch change" phases are provided to the same view that received the corresponding initial "touch begin" input event. Thus, a user can click a mouse and drag the cursor outside of the view, and the input events are still delivered to the view.

Mouse Movement Translated to Simulated Touch-Hover Event

In some embodiments, an input event that moves a displayed pointer is translated into a touch event having a hover phase (e.g., when the predefined contact input button described above is not actuated, in which case the movement (e.g., movement of a mouse) is translated to movement of the contact). As noted above, the hover phase indicates an input proximate to but not in contact with the display (despite the fact that the display is not sensitive to inputs proximate to but not in contact with the display). Coordinates of the translated touch event having the hover phase are handled in an analogous manner to the "Left Mouse Click Translated to Simulated Touch-Contact Event" described above.

For example, in some embodiments, movement of a mouse that moves a pointer on the display is translated into a touch event having a hover phase (e.g., a "hover event," also referred to as a "touch-hover event" to signify that in some embodiments hover events are delivered using a normalized data structure that is also used for contact events). Whether the hover phase is a "hover begin" phase or a "hover change" phase depends on whether the hover event is an initial hover event delivered to a respective view. For example, when a mouse moves a pointer over a view (e.g., with no mouse buttons depressed), the initial event provided to the view is a hover event with a "hover begin" phase. Subsequent movements of the pointer by the mouse within the respective view are delivered to the respective view as a "hover change" event.

In some embodiments, hover events are delivered to the views corresponding to their current location (e.g., the current location of the pointer on the display). Thus, when a mouse pointer moves from one view to a different view, the hover events having positions within the different view are provided to the different view.

Magnify and Zoom Inputs Translated to Simulated Multi-Touch Input Events

In some embodiments, one or more user inputs on a device separate from the display are translated into simulated multi-touch input events (e.g., indicating a plurality of simulated touches). In some embodiments, a pointer object is displayed over a respective view of the display and the plurality of simulated touches are simulated to have a centroid that is over the respective view (e.g., at the location of the pointer object on the display).

For example, in some embodiments, a user input comprising actuation of a mouse's scroll wheel while a "control" button is held down on a separate keyboard is translated into a multi-touch pinch gesture (e.g., a pinch-to-zoom gesture) with a centroid at the location of the pointer on the display.

As another example, in some embodiments, a multi-touch gesture received on a touch-sensitive surface separate from the display (e.g., a touchpad) is translated into a simulated multi-touch gesture on the display. For example, a multi-touch pinch gesture (e.g., pinch-to-zoom gesture) received on the touch-sensitive surface separate from the display is translated into a simulated pinch-gesture on the display. As another example, a multi-touch rotation gesture (e.g., two-finger twisting gesture) on the touch-sensitive surface separate from the display is translated into a simulated multi-touch rotation gesture on the display. In some circumstances, the individual touches of the simulated multi-touch gesture have different characteristics from the actual touches received on the touch-sensitive surface separate from the display (e.g., different positions from the actual touches, but the same centroid, located at a midpoint or centroid of both the actual touches and the individual touches of the simulated multi-touch gesture). In some embodiments, as shown in FIG. 9A, the simulated touch event includes a reference back to (e.g., child event) the actual touch events (e.g., "fingers").

Scroll Events Translated to Simulated Touch-Based Scroll Events

FIG. 9B illustrates an exemplary data structure for a touch-based "scroll event" 910, in accordance with some embodiments. Scroll event 910 is similar to touch event 902, with the following differences. The scroll event 910 is identified as such by a "scroll" type 912. The scroll event 910 optionally includes phases (e.g., for when the scroll event is received from a touch-sensitive surface). In some embodiments, touch-based scroll events do not include a position (e.g., an (x,y) field), so translated (e.g., simulated) scroll events include a pointer child event 801 indicating the location of a pointer on the displayed on the display, allowing the scroll event to be routed to the proper view. Rather than a position field, scroll events generally include one or more delta position fields (e.g., having a value "dx" that signifies a magnitude of scrolling in a first direction and a value "dy" that signifies a magnitude of scrolling in a second direction perpendicular to the first direction).

In some embodiments, a plurality of scroll events from a scroll wheel are translated to a simulated touch-based scroll events 910. In some embodiments, the simulated touch-based scroll events correspond to movement of a simulated single contact on a touch-sensitive display. A layer of input/output processing stack 800 (FIG. 8) that is lower than application 812 determines which scroll events from the scroll wheel are part of a single user input.

FIG. 10 is a diagram of an input/output processing stack 1000 that merges (e.g., de-multiplexes) input events from separate event streams and then provides a merged user input event to an application, in accordance with some embodiments.

Input/output processing stack 1000 is analogous to input/output processing stack 800 (FIG. 8), with the following differences described below.

Operating system 804 generates a plurality of separate event streams from user inputs received from one or more input devices 802 coupled with the device. In some embodiments, operating system 804 generates a plurality of separate event streams from user inputs received from a single input device 802-a. For example, input device 802-a may be a mouse that receives user inputs that moves the position of a displayed pointer/cursor (e.g., pointer 706/cursor 738, FIGS. 7L-7P). The mouse includes activatable (e.g., depressible) mouse buttons (e.g., left mouse button 716, FIG. 7N). Operating system 804 generates a first event stream based on a user's movement of the mouse (e.g., to move the pointer/cursor) and generates a second, separate, event stream based on actuation of the mouse buttons.

In some embodiments, the device is coupled with a plurality of input devices (e.g., input devices 802-a and 802-b). For example, the optional input device 802-b is a keyboard coupled with the device, and the operating system 804 generates an event stream corresponding to actuation of individual keys on the keyboard.

In some embodiments, the operating system 804 multiplexes the separate event streams into a multiplexed event stream 1002 (e.g., an event queue). For example, input events 1005 in the event queue are normally provided to native applications via first set of APIs 806 (FIG. 8). Events 1005-a and 1005-c are events from a first event stream (e.g., labeled Type-I) and events 1005-b and 1005-d are events from a second, separate, event stream (e.g., labeled Type-II).

In some embodiments, the host/event translator 808 de-multiplexes the multiplexed event stream (e.g., merges information from the plurality of separate event streams to generate a stream of merged input events). For example, information corresponding to the location of a displayed pointer (e.g., determined from mouse movement inputs) is merged with information corresponding to actuation of an activatable mouse button to create a merged event 1007. In some embodiments, the information corresponding to the location of the displayed pointer is located in a child event pointing back to a first multiplexed event (e.g., event 1005-a is a child event of event 1007). In some embodiments, the information corresponding to actuation of the activated mouse button is located in a child event pointing back to a second multiplexed event (e.g., event 1005-b is also a child event 1007).

In some embodiments, the merged event 1007 is a simulated touch input event (e.g., an input event having the structure of event 809, described with reference to FIG. 9A) or a simulated touch-based scroll event (e.g., an input event having the structure of event 809 described with reference to FIG. 9B). Alternatively, in some embodiments, the merged event is subsequently translated into a simulated touch input event or a simulated touch-based scroll event (e.g., there is another layer of processing in the input/output stack).

FIGS. 11A-11D illustrate a flow chart for a method 1100 of providing simulated touch events to an application, in accordance with some embodiments. The method 1100 is performed at an electronic device (e.g., device 300, FIG. 3) with a display. The electronic device includes or is coupled with an input device separate from the display. In some embodiments, the input device separate from the display is a touch-sensitive surface. Other examples of input devices separate from the display are discussed above. In some embodiments, the electronic device includes one or more sensors to detect proximity of an input object (e.g., a finger or a stylus) above the touch-sensitive surface (e.g., proximity sensors (such as infrared sensors), capacitive sensors in the touch sensitive surface, or cameras next to the touch-sensitive surface) and/or one or more sensors to detect intensities of contact of the input object with the touch-sensitive surface. In some embodiments, the input device separate from the display is not a touch-sensitive surface (e.g., although the device may also optionally include or be coupled with a touch-sensitive surface). Some operations in method 1100 are, optionally, combined and/or the order of some operations is, optionally, changed. For simplicity, method 1100 is described with reference to device 300.

Portable multifunction devices (e.g., device 100, FIGS. 1A-1B) and laptop computers (e.g., device 300, FIG. 3) often use quite different input devices. For example, portable multifunction devices (e.g., smart phones or tablets) may include touch screens, whereas laptop computers may include physical keyboards, mice and/or touch-sensitive surfaces that are separate from displays. The result is that input events made available by a device's operating system (e.g., 1st APIs 806, FIG. 8) to the device's applications are largely dependent on the types of the input devices that the device includes. For this reason, software applications are often developed for a specific type of device (e.g., a portable multifunction device with a touch screen) and do not easily port over to different operating systems. Instead, application developers must re-write their software for different operating systems that run on different types of devices.

Method 1100 allows a first application developed for a first operating system framework (e.g., a touch screen framework) to interpret input events from a second operating system framework (e.g., a framework in which user inputs are received at an input device that is separate from a display). In some embodiments, method 1100 translates user inputs from one or more input devices separate from a display into simulated touch events, which the first application is capable of interpreting. In some embodiments, the translation occurs at a second application that is native to the second operating system framework. The second application is an input event translator that acts as a host for the first application. In this manner, the second application acts as an added layer in an input/output processing stack (e.g., host/ event translator 808, stack 800, FIG. 8). Thus, method 1100 solves the problem of how to convey disparate types of user input events to an application that is expecting (e.g., configured to receive) touch screen inputs, which increases cross-platform compatibility of applications configured to receive inputs from different hardware than the hardware (e.g., input devices) of the electronic device on which the applications are actually being executed.

Device 300 displays (1102), concurrently on the display, a user interface that includes a representation of a first application that includes a plurality of user interface objects and a pointer object (e.g., a displayed pointer or cursor). For example, FIG. 7L illustrates a user interface 730 for an application that displays selectable text 732 as well as several buttons (e.g., "notes"; "Done"). In addition, in FIG. 7L, pointer 706 is displayed.

In some embodiments, the input device is (1104) a mouse (e.g., keyboard/mouse 350, FIG. 3, mouse 704, FIGS. 7L-7P). In some embodiments, the input device is a scroll wheel (e.g., a scroll wheel that is part of a keyboard/mouse 350, FIG. 3, or mouse 704, FIGS. 7L-7P). In some embodiments, the input device is a keyboard (e.g., keyboard/mouse 350, FIG. 3). In some embodiments, the input device is a touchpad separate from the display (e.g., touch-sensitive surface 651, FIG. 6B). Translating user input events from any of these devices to simulated touch inputs increases the cross-platform compatibility of touch screen-based applications to different hardware systems.

While concurrently displaying the representation of the first application and the pointer object, device 300 receives (1106), at the input device separate from the display, a user input event directed to a respective location in the user interface at which the pointer object is displayed (e.g., a location in a view coordinate space). In some embodiments, the corresponding user interface position is determined using stored state information; for the mouse and keyboard input events, the stored location information is updated as the mouse moves or certain keys are pressed, and for trackpad inputs the state information includes an origin or offset, and a scale.

In response to detecting the user input event (1108), in accordance with a determination that the respective location in the user interface at which the pointer object is displayed is over the representation of the first application, device 300 performs operations 1110 through 1126, or a subset thereof.

In some embodiments, device 300 generates (1110) a digitized event in accordance with the user input event, the digitized event including the location in the user interface at which the pointer object is displayed and transforms the digitized event into a simulated touch event. In some embodiments, generating the digitized event is a first user input processing operation that is performed by a respective layer of an input/output processing stack (e.g., by drivers included in operating system 804, FIG. 8).

In some embodiments, the first user input processing operation generates digitized events, which are configured for use by applications configured to be executed in a first operating system framework (e.g., the operating system framework for a laptop computer), and the simulated touch events are configured for use by applications configured to be executed in a second operating system framework (e.g., the operating system framework for a smartphone or tablet) different from the first operating system framework. Translating digitized events for a first operating system framework into simulated touch events for a second operating system framework increases the cross-compatibility of applications.

In some embodiments, the digitized event comprises (1112) a pointer event paired with or having location information corresponding to the respective location in the user interface at which the pointer object is displayed. For example, in some embodiments, the pointer event (e.g., that would normally be available through the first set of APIs 806, FIG. 8) is a child event of the digitized event. In some embodiments. the digitized event is (1114) generated from a pointer event paired with or having location information corresponding to the respective location in the user interface at which the pointer object is displayed (e.g., the pointer event is not a child event of the digitized event but is used to determine a value of a position field in the digitized event). In some embodiments, generating the digitized event includes associating the respective location in the user interface at which the pointer object is displayed with a data structure for the digitized event.

Device 300 provides (1116), to the first application, information that describes the simulated touch event including information that describes locations of one or more simulated touches in the user interface (e.g., through the second set of APIs 810, FIG. 8).

In some embodiments, the one or more simulated touches have (1118) a centroid at the respective location in the user interface at which the pointer object is displayed. For example, in some embodiments, as described above, an input on an input device separate from a display is translated into a multi-touch gesture for a touch screen (a pinch-to-zoom or rotate gesture). In some embodiments, an input event from a multi-touch gesture on a touch sensitive-surface separate from a display is translated to a multi-touch gesture for a touch screen. In either case, the simulated touches of the multi-touch gesture are simulated so as to have a centroid located at the position of the displayed pointer object. Generating a simulated multi-touch gesture with a centroid at the location of a pointer object allows user input events from non-touch screen input devices to be used for touch screen-based applications, increasing the cross-platform compatibility of touch screen-based applications.

In some embodiments, the simulated touch event includes (1120) a plurality of fields having information including location information corresponding to the respective location in the user interface, and a phase value selected from a set of predefined phase values that includes at least a first predefined phase value that indicates a beginning phase of a simulated touch and a second predefined phase value that indicates that the simulated touch event is an update of a prior simulated touch event. In some embodiments, the set of predefined phase values includes (1122) at least a third predefined phase value that indicates a hover phase, the hover phase indicating a simulated touch proximate to but not in contact with the display. Providing touch events that include hover phase values increases the range of possible user inputs (e.g., by opening up the possibility of single gestures that include hover and contact phases), thus reducing the number of inputs needed to perform an operation and enhancing the operability of the device.

In some embodiments, the device provides to the first application information the describes a plurality of simulated touch events, sometimes referred to as a sequence of simulated touch events. The simulated touch events each include a field having a touch identifier field, and the plurality (e.g., sequence) of simulated touch events for a single gesture are assigned the same value for the touch identifier field. For example, the sequence of simulated touch events assigned the same touch identifier value may correspond to movement of a simulated single finger moving relative to a display, beginning with movement of the simulated single finger proximate to but not in contact with the display, followed by movement of the simulated single finger while in contact with the display, and optionally followed by lift off of the simulated single finger from the display and subsequent movement of the simulated single finger proximate to but not in contact with the display. An example of such a sequence of simulated touch events is described above with reference to FIG. 7Q.

In some embodiments, the input device includes (1124) a button (e.g., a depressible portion of a trackpad, mouse or other input device). The user input event includes a change in a state of the button (e.g., left mouse click-and-hold 714, FIGS. 7N-7O). In accordance with the change in the state of the button, the simulated touch event has the first predefined phase value that indicates a beginning phase of a simulated touch (e.g., as described with reference to FIG. 7N, a simulated "touch begin" input event is delivered to the application in response to the beginning of the left mouse click-and-hold 714).

In some embodiments, device 300 displays (1126), on the display, a change in the representation of the first application that is determined by the first application in response to the information that describes the simulated touch event (e.g., the device displays a response to the simulated touch event, such as selection of text, or placing a cursor, as described with reference to FIGS. 7L-7P).

In some embodiments, the change in the state of the button includes (1128) an activation of the button. In some embodiments, while displaying the pointer object, device 300 receives (1130), at the input device separate from the display, a second user input event that includes deactivation of the button. In response to detecting the second user input event, device 300 provides, to the first application, information that describes a second simulated touch event having a phase value that indicates that the second simulated touch event corresponds to an end of the simulated touch event. For example, as described with reference to FIGS. 7N-7O, release of left mouse click-and-hold 714 is delivered to the application as a simulated "touch end" input event. Translating button activations to simulated touch events allows applications developed for touch screen systems to be compatible with peripheral devices that are not touch screens.

While displaying the pointer object, device 300 receives (1132), at the input device separate from the display, a third user input that moves the pointer object from the respective location to a third location on the display. In response to detecting the third user input event, device 300 provides, to the first application, information that describes a third simulated touch event having the second predefined phase value that indicates that the third simulated touch event is an update of the simulated touch event. For example, in some embodiments, a user input that moves a pointer object while a predefined button is not actuated results in provision of a "hover change" input event to the application, whereas a user input that moves the pointer object while the predefined button is actuated results in a "touch change" input event.

In some embodiments, while displaying the pointer object, device 300 receives (1134), at the input device separate from the display, a fourth user input event directed to a third location at which the pointer object is displayed, the third location corresponding to a representation of a respective application distinct from the first application. In response to detecting the fourth user input event: in accordance with a determination that the respective application is configured to be executed in a first operating system framework, device 300 provides to the respective application information that describes a fourth simulated touch event including information that describes locations of one or more additional simulated touches; and in accordance with a determination that the respective application is not configured to be executed in the first operating system framework (e.g., in accordance with a determination that the respective application is configured to be executed in the second operating system framework distinct from the first operating system framework), device 300 forgoes provision, to the respective application, of information that describes a simulated touch event (e.g., device 300 provides a native, untranslated user input event instead of the simulated touch event). Providing simulated touch events only when an application is configured to receive touch events allows applications that are configured to receive different types of input events to operate with the same hardware.

In some embodiments, the input device is (1136) a first input device. The simulated touch event is a normalized touch event having a predefined event type and set of fields (e.g., touch event 902, FIG. 9A and/or touch event 910, FIG. 9B).

In some embodiments, device 300 receives (1138), at a second input device, a fifth user input event. In response to detecting the fifth user input event, device 300 provides, to the first application, information that describes a fifth simulated touch event, the fifth simulated touch event being a normalized touch event having a same predefined event type and set of fields as the simulated touch event. Thus, user inputs from multiple peripheral devices can be translated into simulated touch events on a simulated touch screen display, allowing applications developed for touch screens to receive inputs from two or more input devices, such as more than one of a mouse, keyboard, trackpad, trackball, etc.

In some embodiments, the input device is (1140) a respective input device of a plurality of input devices separate from the display (e.g., the electronic device has a plurality of input devices separate from the display and the input is one of those input devices). The user input event is a first user input event of a plurality of user input events received from the plurality of input devices separate from the display.

In some embodiments, device 300 generates (1142) a plurality of separate event streams in accordance with the plurality of user input events. Device 300 merges information from the plurality of event streams to generate a stream of merged user input events, wherein the information that describes the simulated touch event includes information that describes the stream of merged user input events. Generation of the separate event streams is described above with reference to FIG. 10, and merging (e.g., de-multiplexing) of event streams is described in greater detail below with reference to method 1200, FIGS. 12A-12C.

It should be understood that the particular order in which the operations in FIGS. 11A-11D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1200 and 1300) are also applicable in an analogous manner to method 1100 described above with respect to FIGS. 11A-11D. For example, the contacts, gestures, input devices, pointer events, touch events, simulated touch events, event streams, user interface features, intensity thresholds, position indicators, and data structures described above with reference to method 1100 optionally have one or more of the characteristics of the contacts, gestures, input devices, pointer events, touch events, simulated touch event, even streams, user interface objects, intensity thresholds, position indicators, and data structures described herein with reference to other methods described herein (e.g., methods 1200 and 1300). For brevity, these details are not repeated here.

The operations in the information processing methods described above are, optionally implemented by running one or more functional modules in information processing apparatus such as general purpose processors (e.g., as described above with respect to FIG. 3) or application specific chips.

The operations described above with reference to FIGS. 11A-11D are, optionally, implemented by components depicted in FIGS. 1A-1B and/or 3. For example, providing operation 1116 and displaying operations 1126 are, optionally, implemented by event sorter 170, event recognizer 180, and event handler 190. Event monitor 171 in event sorter 170 detects a user input event, and event dispatcher module 174 delivers the event information to application 136-1. A respective event recognizer 180 of application 136-1 compares the event information to respective event definitions 186, and determines whether a first contact (e.g., a simulated contact) at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1B and/or 3.

FIGS. 12A-12C illustrate a flow chart for a method 1200 of merging input events from separate event streams and providing a merged input event to an application, in accordance with some embodiments. The method 1200 is performed at an electronic device (e.g., device 300, FIG. 3) with a display. The electronic device includes or is coupled with an input device separate from the display. In some embodiments, the input device separate from the display is a touch-sensitive surface. In some embodiments, the electronic device includes one or more sensors to detect proximity of an input object (e.g., a finger or a stylus) above the touch-sensitive surface (e.g., proximity sensors (such as infrared sensors), capacitive sensors in the touch sensitive surface, or cameras next to the touch-sensitive surface) and/or one or more sensors to detect intensities of contact of the input object with the touch-sensitive surface. In some embodiments, the input device separate from the display is not a touch-sensitive surface (although the device may also optionally include or be coupled with a touch-sensitive surface). Some operations in method 1200 are, optionally, combined and/or the order of some operations is, optionally, changed. For simplicity, method 1200 is described with reference to device 300.

Through the use of different gestures, devices with touch-sensitive displays (e.g., touch screens) are capable of interpreting a wide-range of user inputs. For example, a one- or two-finger swipe on a touch screen may be interpreted as a scroll gesture, whereas a two-finger pinch may be interpreted as a zoom gesture. Devices that include input devices separate from their displays (e.g., peripherals) are equally capable of disambiguating a wide range of user inputs, but doing so involves additional challenges. For example, while disambiguation of gestures is often restricted to interpreting user inputs from a single input device (e.g., the touch screen), user inputs from one peripheral input device (e.g., a mouse, keyboard, or touchpad separate from the display) are often modified by user inputs from a different peripheral input device. For example, actuation of a scroll wheel may result in zooming when a "control" button on a separate keyboard is held down, and may result in scrolling when the "control" button on the keyboard is not held down.

The fact that a user input from one input device may be modified by a user input from a different user input device presents the problem of knowing when input events are related and should be interpreted together. Because touch screen devices rarely face this challenge, this problem is particularly acute for applications that have been developed for touch screens but that are nonetheless being executed on a device with an input device separate from the display (e.g., as described above with reference to method 1100). Method 1200 solves this problem by merging (e.g., de-multiplexing) input events from separate event streams into a single merged input event prior to providing the input events to the application. Thus, in some embodiments, the process of determining which input events are related is moved (e.g., delegated) from software applications (which may have been developed by third-parties) to a host or operating system, which is better situated for deciding which input events are related. The result of merging input events in this manner is that third-party applications interpret input events with greater consistency. For applications developed for touch screen frameworks, method 1200 increases cross-platform compatibility by solving a problem that developers for touch screen applications (i.e., applications configured to receive inputs from a touch screen) rarely have to consider in their native framework.

To that end, device 300 displays (1202), on the display, a user interface for an application, and receives (1204), at the one or more input devices separate from the display, user input events. For example, device 300 may receive inputs from a mouse or trackpad that move the location of a displayed pointer object. In addition, device 300 may receive user inputs corresponding to actuation of mouse buttons (e.g., left clicks, right clicks). For devices with trackpads having sensors to detect intensities of contacts, device 300 may detect a pressure value in addition to actuation of a depressible button.

Device 300 generates (1206) a plurality of separate event streams in accordance with the user input events. In some embodiments, the plurality of separate event streams is multiplexed into a multiplexed event stream (also referred to as an event queue).

Device 300 merges (1208) information from the plurality of separate event streams to generate a stream of merged user input events. In some embodiments, the merging is performed in accordance with a determination that merging criteria (sometimes called predefined merging criteria) are met. For example, in some embodiments, timing-based criteria for the user inputs events are used to determine whether to merge user input events. For example, in some embodiments, user input events are merged unless a predefined period of time elapses without receiving a user input event. In some embodiments, in accordance with a determination the merging criteria are no longer met, the device forgoes subsequent merging of user events, and, if not already provided to the application, provides a previously generated merged user input event to the application.

In some embodiments, the one or more input devices separate from the display include (1210) a first input device and a second input device distinct and separate from the first input device. The user input events include a first event received from the first input device and a second event received from the second input device. The stream of merged user input events comprises a user input event that includes information corresponding to the first event modified by information corresponding to the second event. For example, in some embodiments, the first event is actuation of a scroll wheel on a mouse. The second event is actuation of a "control" button on the keyboard. Because the actuation of the scroll wheel is modified by the control button, the merged event results in zooming of a user interface rather than scrolling or panning of the user interface. Merging (e.g., de-multiplexing) input events from different input devices allows applications that are expecting to react to single input events (e.g., applications for touch screens) to make use of the broad array of modifiers available from different peripheral devices, including mice and keyboards.

In some embodiments, the one or more input devices separate from the display include (1212) a first input device. The user input events include: a first event received from the first input device, the first event corresponding to movement of a pointer on the display; and a second event, distinct from the first event, corresponding to actuation of the first input device. The stream of merged user input events comprises a user input event that includes information corresponding to the first event and information corresponding to the second event.

In some embodiments, the stream of merged user input events comprises (1214) scroll events that include location information corresponding to a respective location in the user interface. For example, the separate event streams include an event stream from a mouse position (e.g., which is used to generate a location of a pointer object on the display) and actuation of a scroll wheel. De-multiplexing input events in this manner allows a single input event (e.g., scroll event 910, FIG. 9B) to be sent to an appropriate view of an application that expects individual input events to include all of the necessary information (e.g., an application configured to receive inputs from a touch screen, sometimes herein called a touch screen application).

In some embodiments, a respective scroll event includes a plurality of fields selected (1216) from the group consisting of: a field having a value indicating a first amount of scrolling; a field having a value indicating either a multiplier for the first amount of scrolling or a second amount of scrolling larger than the first amount of scrolling; a field having a value indicating the respective location in the user interface; and a field having a phase value selected from a set of predefined phase values that includes at least a first predefined phase value that indicates a beginning phase of the respective scroll event and a second predefined phase value that indicates that the respective scroll event is an update of a scroll event.

In some embodiments, each scroll event is (1218) a normalized event having a predefined event type and set of fields, wherein the scroll events are configured to be normalized from any of: a respective user input event received from a scroll wheel; a respective user input event corresponding to a first predefined gesture on a touch-sensitive display; and/or a respective user input event corresponding to a second predefined gesture, distinct from the first predefined gesture, on a touch-sensitive surface separate from a display. Normalizing scrolling events from different types of input devices allows touch screen-based applications (i.e., applications configured to receive inputs from a touch screen) to receive scrolling inputs from these different types of input devices.

Device 300 provides (1220), to the application, information that describes the stream of merged user input events. In some embodiments, the single merged user input event is represented as a single data structure that is provided to the application. In some embodiments, the single merged user input event includes optional child data structures (e.g., references to other data structures, such as data structures representing the individual events (or containing information about the individual events) that were merged to produce the single merged user input event).

Device 300 displays (1222), on the display, a response by the application that is based at least in part on the information that describes the stream of merged user input events. In some embodiments, the response by the application to the scroll events comprises (1224) panning at least a portion (e.g., a scrollable region) of the user interface. In some embodiments, the display is a touch-sensitive display and the application is configured to pan (1226) at least the portion of the user interface in response to touch inputs from the touch-sensitive display as well as scroll events from the stream of merged user input events.

It should be understood that the particular order in which the operations in FIGS. 12A-12C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1100 and 1300) are also applicable in an analogous manner to method 1200 described above with respect to FIGS. 12A-12C.

The operations described above with reference to FIGS. 12A-12C are, optionally, implemented by components depicted in FIGS. 1A, 1B and/or 3. For example, receiving operation 1204 and displaying operations 1222 are, optionally, implemented by event sorter 170, event recognizer 180, and event handler 190. Event monitor 171 in event sorter 170 detects a user input event, and event dispatcher module 174 delivers the event information to application 136-1. A respective event recognizer 180 of application 136-1 compares the event information to respective event definitions 186, and determines whether a first contact (e.g., a simulated contact) at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A, 1B and/or 3.

FIGS. 13A-13E illustrate a flow chart for a method 1300 of providing hover-based input events to an application, in accordance with some embodiments. The method 1300 is performed at an electronic device (e.g., device 100, FIGS. 1A-1B and/or device 300, FIG. 3) with an input device. The electronic device includes or is coupled with an input device separate from the display. In some embodiments, the input device separate from the display is a touch-sensitive surface.

In some embodiments, the electronic device includes one or more sensors to detect proximity of an input object (e.g., a finger or a stylus) above the touch-sensitive surface (e.g., proximity sensors (such as infrared sensors), capacitive sensors in the touch sensitive surface, or cameras next to the touch-sensitive surface) and/or one or more sensors to detect intensities of contact of the input object with the touch-sensitive surface. In some embodiments, the input device separate from the display is not a touch-sensitive surface (although the device may also optionally include or be coupled with a touch-sensitive surface). Some operations in method 1300 are, optionally, combined and/or the order of some operations is, optionally, changed. For simplicity, method 1300 is described with reference to device 100/300 (e.g., some operations of method 1300 make reference to a device 100 with a touch screen and some operations of method 1300 make reference to a device 300 with an input device separate from the display).

Some touch-sensitive surfaces are capable of detecting the proximity of an input object (e.g., a finger or a stylus) above the touch-sensitive surface. These so-called "hover" inputs can be used to manipulate user interface objects. However, hover inputs are generally treated as separate from other user inputs (e.g., contact-based user inputs) despite the fact that a hovering over a touch-sensitive surface may be intuitively part of the same gesture as a subsequent contact. Treating proximity-based input events and contact-based input events as being from disparate user inputs results in user interfaces that are cumbersome and non-intuitive for the user.

Method 1300 solves this problem by providing hover input events in a normalized touch input event format having the same data structure as that which is used by contact-based touch events. These input events, sometimes herein called touch input events, include a phase field that takes on a value describing, among other things, whether the input event is a hover event or a contact-based event (the phase value may also indicate whether the event is a change or an end of a previously-detected event). Hover input events that are related to contact-based input events are assigned the same input identifier, so when these events are provided to gesture recognizers, they can be interpreted as part of the same gesture. To aide cross-platform compatibility, as described above, some embodiments also provide simulated hover events based on user inputs from input devices that do not detect proximity of contacts above a touch-sensitive surface. For example, a mouse pointer entering a window may be interpreted as a hover event over that window, while a left-mouse click while the pointer is over the window may be interpreted as a contact-based event in that window. Provision of simulated touch events (including hover and contact input events) is discussed elsewhere in this document.

Device 100/300 displays (1302), on the display, a user interface for an application that includes a plurality of user interface objects. For example, the user interface 730 shown in FIG. 7A includes selectable text 732 as well as several virtual buttons (e.g., "notes," "done").

In some embodiments, the input device includes (1303) the aforementioned touch-sensitive surface. In some embodiments, the touch-sensitive surface is part of the display (e.g., the display is a touch screen display, such as touch screen 112). In some embodiments, the touch-sensitive surface is separate from the display (e.g., the touch-sensitive surface is a trackpad separate from the display). In some embodiments, the inputs described below are received from an input device that is not a touch-sensitive surface, and the touch input events described below are simulated touch input events (e.g., simulated as described with reference to FIGS. 7L-7P and method 1100, FIGS. 11A-11D).

While displaying the user interface for the application, device 100/300 receives (1304), at the input device, a user input. For example, a touch screen may receive a touch gesture that includes a first portion of the touch gesture for which the touch gesture (e.g., the finger or stylus) is proximate to but not in contact with the touch-sensitive surface (e.g., a hover gesture portion, as described with reference to FIGS. 7B-7C) and a second portion of the touch gesture for which the touch gesture is in contact with the touch-sensitive surface (e.g., a contact gesture portion, as described with reference to FIGS. 7D-7E). In some embodiments (e.g., where the device is not a touch screen), the user input is a mouse/trackpad input that moves a pointer object on the display (e.g., as described with reference to FIG. 7L). In some embodiments, the user input includes a first portion that moves a cursor over a respective view (e.g., while a predefined mouse button, such as the left mouse, is not actuated), and a second portion that includes actuation of the predefined mouse button. The first portion is translated to the first input event (described below) and the second portion is translated to the second input event (described below).

In response to the user input, device 100/300 performs (1306) operations 1308-1314 or a subset thereof.

Device 100/300 provides (1308) to the application a first input event having a phase field with a first phase value, the first input event corresponding to an input proximate to but not in contact with a touch-sensitive surface. In some embodiments, the first input event has a hover phase. In some embodiments, the first input event has a hover begin phase.

In some embodiments, the first input event corresponding to the user input proximate to but not in contact with the touch-sensitive surface is triggered (1310) by detecting an input within a predefined distance of the touch-sensitive surface (e.g., as shown in FIG. 7B, finger 734 crosses within the threshold hover distance, triggering a hover begin input event being provided to a view corresponding to user interface 730).

In some embodiments, the first input event and the second input event are provided (1312) to the application in a normalized touch event data structure that includes a phase field and an input identifier field (e.g., touch event data structure 902, FIG. 9A). The first input event and the second input event have a same value for the input identifier field. By having the same value for the input identifier field, the first input event (e.g., a hover touch input event) and the second input event (e.g., a contact touch input event) can be recognized as part of a single gesture. Providing single gestures with hover phases and contact phases improves the operability of the device by allowing the device to recognize more intuitive gestures (e.g., moving a cursor in accordance with a hover input and placing the cursor in accordance with a contact input). These considerations are particularly important in providing a full range of input capabilities for devices when screen size is limited and peripheral input devices are inconvenient (e.g., smart phones).

In some embodiments, the first phase value indicates (1314) that the first input event corresponds to a beginning of an input proximate to but not in contact with the touch-sensitive surface (e.g., a "hover begin" input event). Providing a "hover begin" input event allows the device to keep track of subsequent inputs as updates to the "hover begin" input event (e.g., through the use of the input identifier field, described above).

After providing the first input event, device 100/300 provides (1316) to the application a second input event having a phase field with a second phase value, the second input event corresponding to the user input being in contact with the touch-sensitive surface (e.g., a contact touch event). For example, in response to the contact with the touch screen 112 in FIG. 7D, the device provides a "touch begin" event to the view corresponding to user interface 730.

Device 100/300 displays (1318), on the display, an update to the user interface for the application that is based at least in part on the first input event and the second input event. In some embodiments, the device displays a first update based on the first input event (e.g., displaying a cursor, FIG. 7B) and a second update based on the second input event (e.g., beginning text selection, FIG. 7D). In some embodiments, the device displays a single update based on both the first input event and the second input event (e.g., the device provides the first input event and the second input event to a gesture recognizer, which recognizes the first input event and the second input event as part of a single gesture).

In some embodiments, after providing the first input event to the application, device 100/300 detects (1320) a change in the user input. In response to detecting the change in the user input, corresponding to a change in position or proximity of the user input proximate to but not in contact with the touch-sensitive surface, device 100/300 provides to the application a third input event having information (e.g., a phase field with a hover change phase value) indicating a change in position or proximity of the user input proximate to but not in contact with the touch-sensitive surface (e.g., a "hover change" input event). Providing input events indicating a change in position or proximity of the user input proximate to but not in contact with the touch-sensitive surface improves the operability of the device by allowing the device to track changing hover inputs as part of a single user input (e.g., allowing the user to move a cursor continuously around a user interface). These considerations are particularly important in providing a full range of input capabilities for devices when screen size is limited and peripheral input devices are inconvenient (e.g., smart phones).

In some embodiments, after providing the first input event to the application, device 100/300 detects (1322) a further change in the user input. In response to detecting the further change in the user input, device 100/300 provides a fourth input event to the application, the fourth input event having information (e.g., a phase field with a hover end phase value) indicating a hover end state of the user input (e.g., in FIG. 7K, a "hover end" input event is provided to the view corresponding to user interface 730 in response to finger 734 leaving the threshold hover distance). The hover end phase is used when the touch event is (A) the last touch event prior to the input moving out of range of the proximity sensor (e.g., when lift off of the input reaches a height or elevation beyond the range of the proximity sensor), or (B) the last touch event prior to the input moving outside a region (e.g., a view) of the user interface for the application. In the last case, as the input moves over another region of the user interface, a new stream of touch events may be provided to another view of the application, adjacent to the view to which the prior touch events were provided, or to another application having a user interface region adjacent to the application view to which the prior touch events were provided.

In some embodiments, providing a "hover end" input event improves the operability of the device by informing active gesture recognizers that a user input, or a portion of a user input, is complete, which helps the active gesture recognizers determine whether their corresponding gesture has passed, failed, or been canceled. Improving gesture recognizers improves the operability of the device by helping provide a full range of input capabilities for devices when screen size is limited and peripheral input devices are inconvenient (e.g., smart phones).

In some embodiments, the second phase value is (1324) a touch begin phase value indicating an initial contact of the user input with the touch-sensitive surface (e.g., in FIG. 7D a "touch begin" input event is provided to the view corresponding to user interface 730 in response to contact with the touch screen 112).

In some embodiments, after providing the first input event and second input event to the application, device 100/300 detects (1326) a change in the user input. In response to detecting the change in the user input, corresponding to a change in position of the user input while in contact with the touch-sensitive surface, device 100/300 provides to the application a fourth input event having information indicating a change in position of the user input while in contact with the touch-sensitive surface (e.g., a "touch change" input event as described with reference to FIG. 7J). Providing input events indicating a change in position of the user input while in contact with the touch-sensitive surface improves the operability of the device by allowing the device to track changing touch inputs as part of a single user input (e.g., allowing the user to move a cursor continuously around a user interface while selecting text), and also makes the operation of the device more efficient by providing to the application information indicating that the input event is a continuation of a gesture represented by one or more previously provided input events, thereby relieving the application of having to determine whether (and how) the provided input event is related to previously provided input events. These considerations are particularly important in providing a full range of input capabilities for devices when screen size is limited and peripheral input devices are inconvenient (e.g., smart phones).

In some embodiments, after providing the first, second and fourth input events to the application, device 100/300 detects (1328) a further change in the user input. In response to detecting the further change in the user input, corresponding to liftoff of the user input from the touch-sensitive surface, device 100/300 provides to the application a fifth input event having information (e.g., a phase field with a touch end phase value) indicating liftoff of the user input from the touch-sensitive surface (e.g., a "touch end" event, as described with reference to FIG. 7K). In some embodiments, providing a "touch end" input event improves the operability of the device by informing active gesture recognizers that a user input, or a portion of a user input, is complete, which helps the active gesture recognizers determine whether recognition of their corresponding gesture has passed, failed, or been canceled. Improving gesture recognizers improves the operability of the device by helping provide a full range of input capabilities for devices when screen size is limited and peripheral input devices are inconvenient (e.g., smart phones).

In some embodiments, after providing the first, second, fourth, and fifth input events to the application, device 100/300 detects (1330) a further change in the user input. In response to detecting the further change in the user input, corresponding to a change in position or proximity of the user input while proximate to but not in contact with the touch-sensitive surface, device 100/300 provides to the application a sixth input event having information (e.g., a phase field with a hover change phase value) indicating a change in position or proximity of the user input proximate to but not in contact with the touch-sensitive surface (e.g., provides a "hover change" event after the contact with the touch-sensitive surface has ended). In some embodiments, providing a "hover change" input event after the contact with the touch-sensitive surface has ended improves the operability of the device by allowing input gestures to continue after the contact has ended, which helps provide a full range of input capabilities for devices when screen size is limited and peripheral input devices are inconvenient (e.g., smart phones).

In some embodiments, after providing the first, second, fourth, fifth, and sixth input events to the application, device 100/300 detects (1332) a further change in the user input. In response to detecting the further change in the user input, corresponding to a second contact of the user input with the touch-sensitive surface, provide to the application a seventh input event having information (e.g., a phase field with a touch begin phase value) indicating that the user input has touched the touch-sensitive surface. For example, after detecting lift-off from the touch-sensitive surface, the device may detect one or more hover events followed by one or more additional contact events. Thus, the range of input gestures may be extended to gestures that include "touch-hover-touch" gestures, which helps provide a full range of input capabilities for devices when screen size is limited and peripheral input devices are inconvenient (e.g., smart phones).

In some embodiments, the input device is (1334) separate from the display. Performing method 1300 with an input device separate from the display is described above with reference to trackpad inputs and simulated touch inputs from devices that are not touch-sensitive surfaces.

In some embodiments, device 100/300 displays (1336) on the display, a pointer object. While displaying the pointer object for the application, device 100/300 receives, at the input device, a second user input that corresponds to movement of the pointer object on the display into a first view of the user interface for the application. In response to the second user input: device 100/300 provides to the application, an eighth input event having a phase field with the first phase value, the first phase value being a hover phase value indicating that the eighth input event corresponds to an input proximate to but not in contact with a touch-sensitive surface. After providing the eighth input event, device 100/300 provides to the application a ninth input event having a phase field with the second phase value, the second input event corresponding to the user input being in contact with the touch-sensitive surface. In some embodiments, the ninth input event is the initial input event generated upon the location of the second user input "entering" the second view. Device 100/300 displays, on the display, an update to the user interface for the application that is based at least in part on the eighth input event and the ninth input event. For example, as described with reference to FIGS. 7L-7P, when a pointer object is moved over a respective view, a hover input is provided to the respective view; and when a left mouse click-and-hold is detected, a contact input is provided to the respective view.

In some embodiments, the user interface for the application comprises (1338) a first view (e.g., user interface 730, FIGS. 7L-7P). The displaying includes displaying a second view (e.g., application 708, FIGS. 7L-7P). The first input event and second input event are directed to the first view of the first application.

In some embodiments, while displaying the first view and the second view, device 100/300 receives (1340) at the input device, a second user input having a location that moves from a first location that corresponds to the first view to a second location that corresponds to the second view. In response to the second user input, device 100/300 generates a ninth input event having a respective phase field with a respective phase value. The ninth input event includes information that corresponds to the second location. In accordance with a determination that the respective phase value for the ninth input event is a hover phase indicating a touch proximate to but not in contact with the touch-sensitive surface, device 100/300 provides the ninth input event to an application associated with the second view. In accordance with a determination that the respective phase value for the third input event is a touch phase indicating a touch in contact with the touch-sensitive surface, device 100/300 provides the ninth input event to an application associated with the first view. Thus, as described with reference to FIG. 7Q, in some embodiments, hover-based touch input events are delivered to the view corresponding to their current location (e.g., the location of the finger/stylus or the location of a displayed pointer object), while contact-based touch input events are delivered to the view corresponding to the location of the corresponding "touch begin" input event.

In some embodiments, method 1300 includes (1342) displaying, on the display, a pointer object, the second user input is received from an input device separate from the display, and the second user input corresponds to movement of the pointer object from the first location that corresponds to the first view to the second location that corresponds to the second view.

In some embodiments, the display is a touch-sensitive display that includes (1344) the touch-sensitive surface, the touch-sensitive display being sensitive to contacts proximate to but not in contact with the touch-sensitive display. The second user input is received from the touch-sensitive display, and the second user input corresponds to an input at the touch-sensitive display that moves from a location over the first location on the touch-sensitive display that corresponds to the first view to a location over the second location on the touch-sensitive display that corresponds to the second view. In some embodiments, the second view is (1346) a respective view of the application.

In some embodiments, the application is (1348) a first application, the first view is a respective view of the first application, and the second view is a respective view of a second application distinct from the first application. For example, selection of appropriate view(s) to which to deliver input events, as described with reference to FIG. 7Q, is performed the same way regardless of whether the separate views are from separate applications or the same application.

The operations described above with reference to FIGS. 13A-13E are, optionally, implemented by components depicted in FIGS. 1A-1B and/or 3. For example, providing operation 1308 and displaying operations 1318 are, optionally, implemented by event sorter 170, event recognizer 180, and event handler 190. Event monitor 171 in event sorter 170 detects a user input event, and event dispatcher module 174 delivers the event information to application 136-1. A respective event recognizer 180 of application 136-1 compares the event information to respective event definitions 186, and determines whether a first contact (e.g., a simulated contact) at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B and/or 3.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at an electronic device with a display and one or more input devices separate from the display:
   displaying, on the display, a user interface for an application;
   receiving, at the one or more input devices separate from the display, user input events;
   generating a plurality of separate event streams, including a first event stream and a second event stream separate from the first event stream, in accordance with the user input events;
   merging information from the plurality of separate event streams, including the first event stream and the second event stream, to generate a stream of merged user input events, the stream of merged user input events comprising a plurality of merged user input events that include a respective merged user input event that is based on information from the first event stream and information from the second event stream;
   providing, to the application, information that describes the stream of merged user input events, including the respective merged user input event that is based on information from the first event stream and information from the second event stream; and
   displaying, on the display, a response by the application that is based at least in part on the information, provided to the application, that describes the stream of merged user input events.

2. The method of claim 1, wherein:
   the stream of merged user input events comprises scroll events that include location information corresponding to a respective location in the user interface.

3. The method of claim 2, wherein a respective scroll event includes a plurality of fields selected from the group consisting of:
   a field having a value indicating a first amount of scrolling;
   a field having a value indicating either a multiplier for the first amount of scrolling or a second amount of scrolling larger than the first amount of scrolling;
   a field having a value indicating the respective location in the user interface; and
   a field having a phase value selected from a set of predefined phase values that includes at least a first predefined phase value that indicates a beginning phase of the respective scroll event and a second predefined phase value that indicates that the respective scroll event is an update of a scroll event.

4. The method of claim 2, wherein the response by the application to the scroll events comprises panning at least a portion of the user interface.

5. The method of claim 4, wherein the display is a touch-sensitive display and the application is configured to pan at least the portion of the user interface in response to touch inputs from the touch-sensitive display as well as scroll events from the stream of merged user input events.

6. The method of claim 2, wherein each scroll event is a normalized event having a predefined event type and set of fields, wherein the scroll events are configured to be normalized from any of:
   a respective user input event received from a scroll wheel;
   a respective user input event corresponding to a first predefined gesture on a touch-sensitive display; and
   a respective user input event corresponding to a second predefined gesture, distinct from the first predefined gesture, on a touch-sensitive surface separate from a display.

7. The method of claim 1, wherein:
   the one or more input devices separate from the display include a first input device and a second input device distinct and separate from the first input device; and
   the user input events include:
   a first event received from the first input device, the first event included in the first event stream;
   a second event received from the second input device, the second event included in the second event stream; and
   the stream of merged user input events comprises a user input event that includes information corresponding to the first event modified by information corresponding to the second event.

8. The method of claim 1, wherein:
   the one or more input devices separate from the display include a first input device;
   the user input events include:
   a first event received from the first input device, the first event corresponding to movement of a pointer on the display; and
   a second event, distinct from the first event, corresponding to actuation of the first input device; and
   the stream of merged user input events comprises a user input event that includes information corresponding to the first event and information corresponding to the second event.

9. The method of claim 1, wherein:
   the application is configured to receive touch inputs; and
   the stream of merged user input events comprises a stream of simulated touch input events that, when provided to the application, are processed by the application as touch inputs.

10. The method of claim 9, wherein the first event stream corresponds to inputs on a first input device of the one or more input devices separate from the display, the second event stream corresponds to inputs on a second input device separate from the first input device, and at least one of the first input device and the second input device is a physical keyboard.

11. The method of claim 9, wherein the first event stream corresponds to inputs on a first input device of the one or more input devices separate from the display, the second event stream corresponds to inputs on a second input device, separate from the first input device, of the one or more input devices separate from the display, and at least one of the first input device and the second input device is a mouse, scroll wheel or keyboard.

12. The method of claim 9, wherein the first event stream corresponds to inputs on a first input device of the one or more input devices separate from the display, and the second event stream corresponds to inputs on a second input device, separate from the first input device, of the one or more input devices separate from the display, and at least one of the first input device and the second input device is neither a touch-sensitive surface nor a touch screen.

13. An electronic device, comprising:
a display;
one or more input devices separate from the display;
one or more processors;
memory; and
one or more programs, wherein the one or more programs are stored in the memory and configured to be executed by the one or more processors, the one or more programs including instructions for:
   displaying, on the display, a user interface for an application;
   receiving, at the one or more input devices separate from the display, user input events;
   generating a plurality of separate event streams, including a first event stream and a second event stream separate from the first event stream, in accordance with the user input events;
   merging information from the plurality of separate event streams, including the first event stream and the second event stream, to generate a stream of merged user input events, the stream of merged user input events comprising a plurality of merged user input events that include a respective merged user input event that is based on information from the first event stream and information from the second event stream;
   providing, to the application, information that describes the stream of merged user input events, including the respective merged user input event that is based on information from the first event stream and information from the second event stream; and
   displaying, on the display, a response by the application that is based at least in part on the information, provided to the application, that describes the stream of merged user input events.

14. The electronic device of claim 13, wherein:
the stream of merged user input events comprises scroll events that include location information corresponding to a respective location in the user interface.

15. The electronic device of claim 14, wherein a respective scroll event includes a plurality of fields selected from the group consisting of:
a field having a value indicating a first amount of scrolling;
a field having a value indicating either a multiplier for the first amount of scrolling or a second amount of scrolling larger than the first amount of scrolling;
a field having a value indicating the respective location in the user interface; and
a field having a phase value selected from a set of predefined phase values that includes at least a first predefined phase value that indicates a beginning phase of the respective scroll event and a second predefined phase value that indicates that the respective scroll event is an update of a scroll event.

16. The electronic device of claim 14, wherein the response by the application to the scroll events comprises panning at least a portion of the user interface.

17. The electronic device of claim 16, wherein the display is a touch-sensitive display and the application is configured to pan at least the portion of the user interface in response to touch inputs from the touch-sensitive display as well as scroll events from the stream of merged user input events.

18. The electronic device of claim 14, wherein each scroll event is a normalized event having a predefined event type and set of fields, wherein the scroll events are configured to be normalized from any of:
a respective user input event received from a scroll wheel;
a respective user input event corresponding to a first predefined gesture on a touch-sensitive display; and
a respective user input event corresponding to a second predefined gesture, distinct from the first predefined gesture, on a touch-sensitive surface separate from a display.

19. The electronic device of claim 13, wherein:
the one or more input devices separate from the display include a first input device and a second input device distinct and separate from the first input device; and
the user input events include:
   a first event received from the first input device, the first event included in the first event stream;
   a second event received from the second input device, the second event included in the second event stream; and
the stream of merged user input events comprises a user input event that includes information corresponding to the first event modified by information corresponding to the second event.

20. The electronic device of claim 13, wherein:
the one or more input devices separate from the display include a first input device;
the user input events include:
   a first event received from the first input device, the first event corresponding to movement of a pointer on the display; and
   a second event, distinct from the first event, corresponding to actuation of the first input device; and
the stream of merged user input events comprises a user input event that includes information corresponding to the first event and information corresponding to the second event.

21. The electronic device of claim 13, wherein:
the application is configured to receive touch inputs; and
the stream of merged user input events comprises a stream of simulated touch input events that, when provided to the application, are processed by the application as touch inputs.

22. The electronic device of claim 21, wherein the first event stream corresponds to inputs on a first input device of the one or more input devices separate from the display, the second event stream corresponds to inputs on a second input device separate from the first input device, and at least one of the first input device and the second input device is a physical keyboard.

23. The electronic device of claim 21, wherein the first event stream corresponds to inputs on a first input device of the one or more input devices separate from the display, the second event stream corresponds to inputs on a second input device, separate from the first input device, of the one or more input devices separate from the display, and at least one of the first input device and the second input device is a mouse, scroll wheel or keyboard.

24. The electronic device of claim 21, wherein the first event stream corresponds to inputs on a first input device of the one or more input devices separate from the display, and the second event stream corresponds to inputs on a second input device, separate from the first input device, of the one or more input devices separate from the display, and at least one of the first input device and the second input device is neither a touch-sensitive surface nor a touch screen.

25. A non-transitory computer readable storage medium storing one or more programs, the one or more programs comprising instructions, which when executed by an electronic device with a display and one or more input devices separate from the display, cause the electronic device to:
- display, on the display, a user interface for an application;
- receive, at the one or more input devices separate from the display, user input events;
- generate a plurality of separate event streams, including a first event stream and a second event stream separate from the first event stream, in accordance with the user input events;
- merge information from the plurality of separate event streams, including the first event stream and the second event stream, to generate a stream of merged user input events, the stream of merged user input events comprising a plurality of merged user input events that include a respective merged user input event that is based on information from the first event stream and information from the second event stream;
- provide, to the application, information that describes the stream of merged user input events, including the respective merged user input event that is based on information from the first event stream and information from the second event stream; and
- display, on the display, a response by the application that is based at least in part on the information, provided to the application, that describes the stream of merged user input events.

26. The non-transitory computer readable storage medium of claim 25, wherein:
the stream of merged user input events comprises scroll events that include location information corresponding to a respective location in the user interface.

27. The non-transitory computer readable storage medium of claim 26, wherein a respective scroll event includes a plurality of fields selected from the group consisting of:
- a field having a value indicating a first amount of scrolling;
- a field having a value indicating either a multiplier for the first amount of scrolling or a second amount of scrolling larger than the first amount of scrolling;
- a field having a value indicating the respective location in the user interface; and
- a field having a phase value selected from a set of predefined phase values that includes at least a first predefined phase value that indicates a beginning phase of the respective scroll event and a second predefined phase value that indicates that the respective scroll event is an update of a scroll event.

28. The non-transitory computer readable storage medium of claim 26, wherein the response by the application to the scroll events comprises panning at least a portion of the user interface.

29. The non-transitory computer readable storage medium of claim 28, wherein the display is a touch-sensitive display and the application is configured to pan at least the portion of the user interface in response to touch inputs from the touch-sensitive display as well as scroll events from the stream of merged user input events.

30. The non-transitory computer-readable storage medium of claim 26, wherein each scroll event is a normalized event having a predefined event type and set of fields, wherein the scroll events are configured to be normalized from any of:
- a respective user input event received from a scroll wheel;
- a respective user input event corresponding to a first predefined gesture on a touch-sensitive display; and
- a respective user input event corresponding to a second predefined gesture, distinct from the first predefined gesture, on a touch-sensitive surface separate from a display.

31. The non-transitory computer-readable storage medium of claim 25, wherein:
the one or more input devices separate from the display include a first input device and a second input device distinct and separate from the first input device; and
the user input events include:
- a first event received from the first input device, the first event included in the first event stream;
- a second event received from the second input device, the second event included in the second event stream; and
the stream of merged user input events comprises a user input event that includes information corresponding to the first event modified by information corresponding to the second event.

32. The non-transitory computer-readable storage medium of claim 25, wherein:
the one or more input devices separate from the display include a first input device;
the user input events include:
- a first event received from the first input device, the first event corresponding to movement of a pointer on the display; and
- a second event, distinct from the first event, corresponding to actuation of the first input device; and
the stream of merged user input events comprises a user input event that includes information corresponding to the first event and information corresponding to the second event.

33. The non-transitory computer-readable storage medium of claim 25, wherein:
the application is configured to receive touch inputs; and
the stream of merged user input events comprises a stream of simulated touch input events that, when provided to the application, are processed by the application as touch inputs.

34. The non-transitory computer-readable storage medium of claim 33, wherein the first event stream corresponds to inputs on a first input device of the one or more input devices separate from the display, the second event stream corresponds to inputs on a second input device separate from the first input device, and at least one of the first input device and the second input device is a physical keyboard.

35. The non-transitory computer-readable storage medium of claim 33, wherein the first event stream corresponds to inputs on a first input device of the one or more input devices separate from the display, the second event stream corresponds to inputs on a second input device, separate from the first input device, of the one or more input devices separate from the display, and at least one of the first input device and the second input device is a mouse, scroll wheel or keyboard.

36. The non-transitory computer-readable storage medium of claim 33, wherein the first event stream corresponds to inputs on a first input device of the one or more input devices separate from the display, and the second event stream corresponds to inputs on a second input device, separate from the first input device, of the one or more input devices separate from the display, and at least one of the first input device and the second input device is neither a touch-sensitive surface nor a touch screen.

* * * * *